US012466869B2

(12) United States Patent  
Novina et al.

(10) Patent No.: US 12,466,869 B2  
(45) Date of Patent: Nov. 11, 2025

(54) TARGETING OF MULTIPLE ANTIGENS WITH MULTIPLEX CAR T CELLS IN SOLID AND LIQUID MALIGNANCIES

(71) Applicant: DANA-FARBER CANCER INSTITUTE, INC., Boston, MA (US)

(72) Inventors: Carl Novina, Newton, MA (US); Robert J. Distel, Framingham, MA (US); Alberto Nobili, Brookline, MA (US); Steven C. Neier, Waltham, MA (US)

(73) Assignee: DANA-FARBER CANCER INSTITUTE, INC., Boston, MA (US)

( * ) Notice: Subject to any disclaimer, the term of this patent is extended or adjusted under 35 U.S.C. 154(b) by 1115 days.

(21) Appl. No.: 17/254,472

(22) PCT Filed: Jun. 27, 2019

(86) PCT No.: PCT/US2019/039620  
§ 371 (c)(1),  
(2) Date: Dec. 21, 2020

(87) PCT Pub. No.: WO2020/006312  
PCT Pub. Date: Jan. 2, 2020

(65) Prior Publication Data  
US 2021/0137987 A1    May 13, 2021

Related U.S. Application Data

(60) Provisional application No. 62/697,526, filed on Jul. 13, 2018, provisional application No. 62/691,486, filed on Jun. 28, 2018.

(51) Int. Cl.  
*C07K 14/725* (2006.01)  
*A61K 40/11* (2025.01)  
*A61K 40/31* (2025.01)  
*A61K 40/42* (2025.01)  
*A61K 47/68* (2017.01)  
*C07K 16/32* (2006.01)

(52) U.S. Cl.  
CPC .......... *C07K 14/7051* (2013.01); *A61K 40/11* (2025.01); *A61K 40/31* (2025.01); *A61K 40/4202* (2025.01); *A61K 40/4205* (2025.01); *A61K 40/4217* (2025.01); *A61K 40/4222* (2025.01); *A61K 40/4258* (2025.01); *A61K 47/6865* (2017.08); *A61K 47/6867* (2017.08); *C07K 16/32* (2013.01); *A61K 2239/47* (2023.05); *A61K 2239/48* (2023.05); *A61K 2239/49* (2023.05); *C07K 2319/33* (2013.01)

(58) Field of Classification Search  
CPC ............................. A61K 35/17; A61K 39/395  
See application file for complete search history.

(56) References Cited

U.S. PATENT DOCUMENTS

| 9,315,585 | B2 | 4/2016 | Cheung et al. |
| 11,174,306 | B2 * | 11/2021 | Young ............... C07K 14/70521 |
| 2011/0288275 | A1 | 11/2011 | Rosenblum et al. |
| 2011/0306086 | A1 | 12/2011 | Nitta |
| 2016/0297885 | A1 * | 10/2016 | Kuo ........................ A61P 35/02 |
| 2017/0274095 | A1 | 9/2017 | Meyer et al. |
| 2018/0104354 | A1 | 4/2018 | Kim et al. |

FOREIGN PATENT DOCUMENTS

| CN | 108660113 A | 10/2018 |
| IN | 108490174 A | 9/2018 |
| WO | 2010104014 A1 | 9/2010 |
| WO | WO2012082841 A2 | 6/2012 |
| WO | 2014053491 A1 | 4/2014 |
| WO | WO2014100615 A1 | 6/2014 |
| WO | WO2015057852 A1 | 4/2015 |
| WO | WO2015168656 A2 | 11/2015 |
| WO | WO2016056228 A1 | 4/2016 |
| WO | WO2016154621 A1 | 9/2016 |
| WO | WO2016168766 A1 | 10/2016 |
| WO | WO2016168769 A1 | 10/2016 |
| WO | WO2017112877 A1 | 6/2017 |
| WO | 2017143094 A1 | 8/2017 |
| WO | WO2017133222 A1 | 8/2017 |
| WO | WO2017177149 A2 | 10/2017 |
| WO | WO2018075807 A1 | 4/2018 |
| WO | WO2018152451 A1 | 8/2018 |
| WO | WO2018160622 A1 | 9/2018 |
| WO | 2018200713 A1 | 11/2018 |

OTHER PUBLICATIONS

Pelegrin et al. Antibody-fluoroscein conjugates for photoimmunodiagnosis of human colon carcinoma in nude mice. Cancer 1991, 67;10:2529-2537. (Year: 1991).*

Shen et al. Binding of B-cell maturation antigen to B-cell activating factor induces survival of multiple myeloma cells by activating Akt and JNK signaling pathways. Cell Biochemistry & Function 2016, 34:104-110. (Year: 2016).*

Juette et al. Three-dimensional sub-100 nm resolution fluorescence microscopy of thick samples. Nature Methods 2008, 5;6:527-529. (Year: 2008).*

Corraliza-Gorjon et al. New strategies using antibody combinations to increase cancer treatment effectiveness. Frontiers in Immunology 2017, 8:1804. (Year: 2017).*

Nani et al. In Vivo Activation of Duocarmycin—Antibody Conjugates by Near-Infrared Light. ACS Central Science 2017, 3;4:329-337. (Year: 2017).*

(Continued)

*Primary Examiner* — Christopher M Babic  
*Assistant Examiner* — Jennifer S Spence  
(74) *Attorney, Agent, or Firm* — Baker Donelson

(57) ABSTRACT

Disclosed are compositions and methods for treating cancers characterized by the presence of solid tumors, which simultaneously target a plurality of targets on cancer cells using single CAR T construct.

20 Claims, 18 Drawing Sheets

Specification includes a Sequence Listing.

(56) References Cited

OTHER PUBLICATIONS

Oden et al. Potent anti-tumor response by targeting B cell maturation antigen (BCMA) in a mouse model of multiple myeloma. Molecular Oncology 2015, 9:1348-1358. (Year: 2015).*

Xu et al. Exploratory trial of a biepitopic CAR T-targeting B cell maturation antigen in relapsed/refractory multiple myeloma. Proceedings of the National Academy of Science 2019, 116; 19:9543-9551. (Year: 2019).*

Hsi et al. CS1, a Potential New Therapeutic Antibody Target for the Treatment of Multiple Myeloma. Clinical Cancer Research 2008, 14;9:2775-2784. (Year: 2008).*

Chen et al. A compound chimeric antigen receptor strategy for targeting multiple myeloma. Leukemia 2017, 32:402-412. (Year: 2017).*

Cao, Yu, et al., "Design of Switchable Chimeric Antigen Receptor T Cells Targeting Breast Cancer", Agnew. Chem. Int. Ed. 2016, vol. 55, pp. 1-6.

Changwei, Wang, et al. "MEDI 223: Design, synthesis and Preclinical Study of Novel Taxoid-Based Small Molecule Drug Conjugates (SMDCs) Using Folate/Dimethyltetrahydrofolate (DMTHF) as Tumor Targeting Module", 253rd ACS National Meeting / 2017, Session: Poster.

Chu, Wenqu, et al., "Bi-Specific Ligand-Controlled Chimeric Antigen Receptor T-Cell Therapy for Non-Small Cell Lung Cancer", BioScience Trends. 2018, vol. 12, No. 3, pp. 298-308.

Kim, Min Soo, et al., "Redirection of Genetically Engineered CART-T Cells Using Bifunctional Small Molecules", J. Am. Chem. Soc. 2015, vol. 137, pp. 2832-2835.

Ma, Jennifer S. Y., et al., "Versatile Strategy for Controlling the Specificity and Activity of Engineered T Cells", PNAS, Published online Jan. 12, 2016, pp. E450-E458.

Raj, Deepak, et al., "Switchable CAR-T Cells Mediate Remission in Metastatic Pancreatic Ductal Adenocarcinoma", BMJ, 2018, pp. 1-13.

Tamada, Koji, et al., "Redirecting Gene-Modified T Cells Toward Various Cancer Types Using Tagged Antibodies", American Association for Cancer Research, Dec. 1, 2012.

Yu, A., et al., "Anti-GD2 Antibody with GM-CSF, Interleukin-2, and Isotretinoin for Neuroblastoma", New Engl. Journal of Medicine, Sep. 30, 2010, vol. 363, No. 14, pp. 1324-1334.

Zhang, Erhao, et al., "Accurate Control of Dual-Receptor-Engineered T Cell Activity Through A Bifunctional Anti-Angiogenic Peptide", Journal of Hematology & Oncology, 2018.

Li, X. et al., "Cancer-Associated, Stimuli-Driven, Turn on Theranostics for Multimodality Imaging and Therapy", Adv. Mater., 2017, vol. 29; 1606857, pp. 1-24.

* cited by examiner

TARGETING OF MULTIPLE ANTIGENS WITH MULTIPLEX CAR T CELLS IN SOLID AND LIQUID MALIGNANCIES

RELATED APPLICATIONS

This application is a national stage application, filed under 35 U.S.C. § 371, of International Application No. PCT/US2019/039620, filed Jun. 27, 2019, which claims the benefit of priority under 35 U.S.C. § 119 (e) to U.S. Provisional Application No. 62/691,486, filed Jun. 28, 2018 and U.S. Provisional Application No. 62/697,526, filed Jul. 13, 2018, each of which are incorporated herein by reference in their entireties.

GOVERNMENT LICENSE RIGHTS

This invention was made with government support under DK105602, and AI007386 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Jul. 24, 2019 is named "52095-577001WO_ST25.txt" and is 3 KB in size.

BACKGROUND OF THE INVENTION

Clinical trials have demonstrated that cancer immunotherapies can induce durable responses in patients with advanced cancers. There have been numerous reports of successful treatment of B cell-derived leukemias, lymphomas, and multiple myeloma (MM) using chimeric antigen receptor (CAR) T cells. These genetically engineered T cells possess specificity for Cluster of Differentiation 19 (CD19), CD22, and B-cell maturation antigen (BCMA) receptor that is prevalent on the surface of cancerous B-cells, but which is also present on normal, non-cancerous B-cells. While the response rates for these cancers remains high, there remains a need for more controllable CAR T cell systems (Kochenderfer et al. J. Clin Oncol. 33:540-9 (2015), Maude et al., Blood 125:4017-23 (2015), Friedman et al., Hum Gene Ther. 29(5):585-601 (2018), Raje et al., N Engl J Med. 380(18):1726-37 (2019), Fry et al., Nat Med 24:20-8 (2018)).

Brain cancer stands as a particularly formidable foe to meaningful and lasting therapy. In the case of glioblastoma (GBM), for example, all currently available, FDA-approved treatments are essentially palliative. The combination of radiation and temozolomide chemotherapy, which was established as the current standard of care for newly-diagnosed patients over 13 years ago, (Stupp et al., N Engl J Med, 352:987-96 (2005)), yields a median survival of only 15 months while no salvage therapy prolongs survival among recurrent patients.

Remarkable insights have been gained into key genetic mutations and mediators of dysregulated cell signaling pathways that drive the growth of GBM tumors. However, biological therapies that block cancer-driving pathways have consistently failed to provide clinical benefit for GBM patients for several reasons including redundant mechanisms of pathway activation, intratumoral heterogeneity, acquired resistance and poor delivery through the blood-brain barrier into the central nervous system (CNS). Similarly, despite the fact that GBM is one of the most angiogenic cancers, effective inhibition of vascular endothelial growth factor does not improve patient survival, most likely due to compensatory upregulation of other proangiogenic factors as well as the ability of GBM tumors to adapt and progress in a hypoxic, nutrient deprived microenvironment that evolves following angiogenesis inhibition. Although disappointing, such results are not unprecedented for GBM, and thus underscore the complexity of this disease.

A variety of immunotherapy approaches, including immune checkpoint blockade, chimeric antigen receptor (CAR) T cells, vaccines, and oncolytic viruses have achieved exciting results across a spectrum of cancer indications. Unfortunately, recent results of large, randomized phase 3 trials evaluating such approaches for GBM patients have been negative. These include a vaccine targeting a single tumor-specific mutation (epidermal growth factor receptor variant III (EGFRvIII)) for newly diagnosed patients (Weller et al., Lancet Oncol, 18:1373-85 (2017)) and administration of anti-programmed death 1 (PD-1) antibody for recurrent patients (Reardon et al., World Federation of Neuro-Oncology Societies (WFNOS) Zurich, Switzerland: Oxford University Press (2017)).

A growing body of data indicates that the immunobiology of GBM is highly complex with multiple intrinsic and adaptive factors contributing to antagonize anti-tumor immune responses. Success of immunotherapy treatments for GBM patients will therefore require further discovery and greater understanding of key contributors to this complexity as well as the subsequent design of therapeutic strategies optimized to overcome these challenging factors.

High-grade pediatric gliomas, another type of brain cancer, are one of the most malignant tumors of childhood. Hundreds of clinical trials have been conducted in children with pediatric gliomas, but there have been limited improvements in response rates or long-term outcomes. This is especially true for diffuse intrinsic pontine glioma (DIPG), a glioma found within the pons of the brainstem. DIPG is typically diagnosed in patients between the ages of 4 and 6, and a majority of these children will succumb within a year of diagnosis.

To date, CAR T cell therapies have had only modest success against solid tumors, including brain tumors. Additionally, controlling CAR T cell activity could enhance the therapy of hematologic malignancies. Thus, a need remains for more effective CAR T cell-based anti-cancer therapies for hematologic cancers such as MM and solid tumors, especially GBM and DIPG and other forms of brain cancer.

SUMMARY OF THE INVENTION

A first aspect of the present invention is directed to a bifunctional compound comprising a small molecule, also referred to herein as a synthetic antigen that is covalently linked to a targeting moiety (also referred to herein as a targeting ligand) that binds a tumor associated antigen that is present on a tumor cell.

In some embodiments, the targeting moiety specifically binds a brain tumor associated antigen. In some embodiments, the tumor associated antigen is selected from the group consisting of disialoganglioside GD2 (GD2), cyclic adenosine diphosphate (ADP) ribose hydrolase (CD38), signaling lymphocytic activation molecule (SLAM) family member 7 (SLAMF7; CS1), interleukin-13 receptor α2 (IL13Rα2), human epidermal growth factor receptor 2 (HER2), platelet derived growth factor receptor alpha (PDGFRα), epidermal growth factor receptor variant III (EGFRvIII), chondroitin sulfate proteoglycan 4 (CSPG4), ephrin type-A receptor 2 (EphA2), prominin-1 (CD133), B-cell maturation antigen (BCMA), B-lymphocyte antigen CD20 (CD20), B-lymphocyte antigen CD19 (CD19), and B-cell receptor CD22 (CD22).

In some embodiments, the synthetic antigen is a fluorescent dye, such as fluorescein (FL). In other embodiments, the synthetic antigen is 4-[(6-methylpyrazin-2-yl) oxy] benzoate (MPOB), anthraquinone-2-carboxylate (AQ) or tetraxetan (DOTA).

In some embodiments, the synthetic antigen contains a protecting group which is removable e.g., under certain conditions such as the presence of light (visual (VIS), near infrared (NIR), or ultraviolet (UV)) or reactive oxygen or nitrogen species (ROS, RNS). In such embodiments, the synthetic antigen is referred to herein as a pro-antigen. The pro-antigen is not accessible to a binding entity such as an antibody or functional fragment thereof. Removal (e.g., by way of cleavage) of the protecting group renders the unmasked or uncaged synthetic antigen susceptible to such binding.

Another aspect of the present invention is directed to a pharmaceutical composition comprising a therapeutically effective amount of the bifunctional compound and a pharmaceutically acceptable carrier. In some embodiments, the pharmaceutical composition contains a plurality (two or more) of subpopulations of bifunctional compounds, wherein in each subpopulation, the synthetic antigen may be the same but the respective targeting moieties bind a different epitope of the same tumor associated antigen. In some embodiments, the pharmaceutical composition contains a plurality (two or more) of subpopulations of bifunctional compounds, wherein in each subpopulation, the synthetic antigen may be the same but the respective targeting moieties bind a different tumor associated antigen that is present on a tumor cell. Thus, the pharmaceutical composition may contain a first subpopulation of bifunctional compounds having a first targeting moiety that specifically binds a first tumor associated antigen, and a second subpopulation of bifunctional compounds each having a second targeting moiety that specifically binds a second tumor associated antigen, wherein the first and second targeting moieties bind different tumor associated antigens. In other embodiments, the plurality of subpopulations of bifunctional compounds contains a third, fourth, fifth, etc. subpopulation of bifunctional compounds, each of which binds a different tumor associated antigen that is present on a tumor cell. Thus, in some embodiments, a given composition may target one or more epitopes of the same tumor associated antigen. In other embodiments, the composition may target two or more tumor associated antigens (as well as two or more epitopes of any one or more of the two or more tumor associated antigens).

In some embodiments, the first and second targeting moieties specifically bind a brain tumor associated antigen. In some embodiments, the brain tumor associated antigen is selected from GD2, IL13Rα2, HER2, PDGFRα, EGFRvIII, CSPG4, EphA2, CD133, wherein the first and second targeting moieties bind brain tumor associated antigens.

In some embodiments, the first and second targeting moieties specifically bind a hematologic tumor associated antigen. In some embodiments, the hematologic tumor associated antigens targeted by the subpopulations of bifunctional compounds are selected from the group consisting of CD38, CS1, BCMA, CD20, CD19, CD22, CD30, CD38, CD138, CD40, CD56, CD70, and CD74.

In some embodiments, the first or second targeting moieties specifically bind to HER2 on HER2+ malignancies such as breast, lung, colorectal, brain, ovarian, and pancreatic cancer. Another aspect of the present invention is directed to a method of treating cancer, the method comprising co-administering to a subject in need thereof, a) a plurality of subpopulations of bifunctional molecules wherein the plurality comprises a1) a therapeutically effective amount of a first subpopulation of bifunctional compounds comprising a synthetic antigen covalently linked to a first targeting moiety that specifically binds a first tumor associated antigen; and a2) a therapeutically effective amount of a second subpopulation of bifunctional compounds comprising the synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens; and b) a therapeutically effective number of CAR-T cells, wherein the CAR-T cells comprise an extracellular ligand that specifically binds the synthetic antigen.

The therapeutically effective amounts of the plurality of subpopulations of bifunctional compounds is administered simultaneously or sequentially. In some embodiments, the subpopulations of bifunctional compounds are administered simultaneously where the targeting of multiple tumor antigens may result in increased efficacy due to nonhomogeneous expression of one or both of the tumor associated antigens (either within the same patient or among patients). In other embodiments, the plurality of subpopulations of bifunctional compounds are provided sequentially e.g., where the patient is no more responsive to the first (set) of bifunctional compounds and a second line of bifunctional compounds is required to maintain therapeutic efficacy.

In some embodiments, the cancer is characterized by the presence of a solid tumor. In some embodiments, the cancer is brain cancer, such as GBM or DIPG, and the targeting moieties of the bifunctional compounds present in the first and second subpopulations specifically bind a brain tumor associated antigen. In some embodiments, the brain tumor associated antigen is selected from GD2, IL13Rα2, HER2, PDGFRα, EGFRvIII, CSPG4, EphA2, and CD133, wherein the first and second targeting moieties bind different brain tumor associated antigens.

In some embodiments, the cancer is a HER2+ malignancy such as breast, lung, colorectal, brain, ovarian, and pancreatic cancer.

In some embodiments, the cancer is a hematological cancer. In some embodiments, the hematological cancer is multiple myeloma, leukemia and lymphoma, and the targeting moieties of the bifunctional compounds present in the first and second subpopulations specifically bind a hematologic tumor associated antigen. In some embodiments, the hematologic tumor associated antigen is selected from CD38, CS1, BCMA, CD20, CD19, CD22, CD30, CD138, CD40, CD56, CD70, and CD74 wherein the first and second targeting moieties bind different hematologic tumor associated antigens.

In some embodiments, the methods may involve more than one administration of the subpopulations of bifunctional compounds. In such cases, the respective targeting moieties in each of plurality (e.g., the first and second) of subpopulations of bifunctional compounds may be identical in that they bind to the same epitope on the target tumor associated antigen. In some other embodiments, any subpopulation of bifunctional compounds may be expanded upon or modified such the subpopulation includes or further includes a targeting moiety that binds a different epitope on the same target tumor associated antigen. Thus, embodiments of the invention may include a first administration of the subpopulations of bifunctional compounds and at least a second administration which differs from the first in that the targeting moiety of any one or more subpopulations binds to a different epitope of the same tumor associated antigen, wherein the first and second administrations may be simultaneous or sequential. This additional feature may mitigate against antigen loss/escape or ameliorate toxicities. In some embodiments, the method may entail administration of third, fourth, fifth, etc., subpopulations of bifunctional compounds wherein each subpopulation targets a different tumor associated antigen.

A further aspect of the present invention is directed to a system comprising the plurality of subpopulations of bifunctional compounds and the CAR T cells.

Yet a further aspect of the present invention is directed to a kit, comprising therapeutically effective amounts of a plurality of subpopulations of bifunctional compounds, wherein each bifunctional compound in a first subpopulation comprises a first synthetic antigen covalently linked to a first targeting moiety that specifically binds a first tumor associated antigen, and wherein each bifunctional compound in a second subpopulation comprises the first synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens; wherein the plurality of subpopulations of bifunctional compounds is disposed in the same or separate containers; and b) printed instructions for co-administering to a cancer patient the therapeutically effective amounts of a plurality of subpopulations of bifunctional compounds a therapeutically effective number of CAR-T cells, wherein the CAR-T cells comprise an extracellular ligand that specifically binds the synthetic antigen. As described above, in some embodiments, the pharmaceutical composition may contain a plurality (two or more) of subpopulations of bifunctional compounds, wherein in each subpopulation, the synthetic antigen may be the same, but the respective targeting moieties bind a different epitope of the same tumor associated antigen. Thus, in some embodiments, a given composition may target one or more epitopes of the same tumor associated antigen. In other embodiments, the composition may target two or more tumor associated antigens (as well as two or more epitopes of any one or more of the two or more tumor associated antigens).

As shown schematically in FIG. 1A-FIG. 1D the present invention may be described as a multiplexable and doseable CAR T cell platform. Unlike current CAR T cell approaches for cancers characterized by the presence of solid or hematologic tumors, including brain cancers such as DIPG and GBM or hematologic cancers such as multiple myelomas, leukemias, and lymphomas, the present invention may simultaneously target multiple tumor associated antigens with just one CAR T construct. In so doing, the present invention may provide enhanced cytotoxicity, reduce the likelihood of antigen escape and provide greater versatility with respect to clinically-used targets which in turn may increase the efficacy of CAR T cells across the diverse inter- and intra-patient heterogeneity observed in brain cancers or hematological cancers, especially GBM and multiple myeloma. In addition, it dispenses with the need for engineering CAR T cells for each and every tumor associated antigen that is a chosen target. Further, by combining multiple different tumor-targeting antibodies with distinct spatial distributions, the present invention may reduce or even eliminate toxicities to healthy tissues by distributing low-dose antigen throughout the body. Thus, this approach to treat solid or hematologic tumors may increase potency, increase duration of the therapy and reduce adverse side effects.

BRIEF DESCRIPTION OF THE DRAWINGS

FIG. 1A shows a system of anti-small molecule CAR T cells uncoupling tumor cell recognition from tumor cell killing in comparison to a traditional CAR T cell design. FIG. 1B shows multiplexing antibody-small molecule conjugates from the system shown in FIG. 1A. FIG. 1C shows that this system enables dosing by allowing the cells to work above inactivity and below toxicity levels. FIG. 1D shows that the present invention enables greater versatility to prevent and fight antigen escape variants. With an anti-small molecule CAR T cell, multiple antibodies can be provided simultaneously or sequentially to prevent cancer relapse. FIG. 1E shows that this system may enable controlling the route of administration of the antibody-small molecule conjugates and the CAR T cells separately.

FIG. 2A shows representative examples of two different CAR T cells (anti-MPOB and anti-FL CAR T cells) specifically killing their respective targets. FIG. 2B-FIG. 2D shows that small molecule CAR T cells can be re-routed towards many different targets expressed in different types of tumor-cells. FIG. 2E demonstrates CAR T cell dose responsive cytotoxicity with increasing concentrations of CAR T cells. FIG. 2F and FIG. 2G shows CAR T cell dose responsive cytotoxicity with increasing concentrations of small molecule-coupled antibodies and demonstrates that different CAR T cell designs provide similar increments in cytotoxicity with increasing amounts of small molecule-coupled antibodies. FIG. 2H demonstrates that the same CAR T cell can be repurposed to target one or more tumor types. The bar graph shows the comparison in the killing efficiencies of an anti-small molecule CAR T cell co-incubated with two tumor populations that do not express the same antigens: glioblastoma multiforme (GBM) and multiple myeloma (MM). When the tumor cells are completely coated with small-molecule conjugate antibodies, both populations can be targeted and killed.

FIG. 3A is a heat map that shows expression levels of GD2, PDGFRα, and IL13Rα2 in A172 (GBM cell line), BT145 and BT333 (H3.3 WT patient derived adult GBM lines), and BT869 (H3-K27M patient-derived pediatric DIPG cell line). FIG. 3B is a heat map that shows expression levels of CD38, CD20, and CS1 in multiple myeloma cell lines.

FIG. 4A is a chemical model showing binding of the anti-fluorescein antibody to unmasked fluorescein (PBD ID: 1X9Q). Anti-fluorescein antibody amino acid polar contacts are indicated by yellow dotted lines. The contacts with the amino acid side chains indicated in purple can be masked with a protective moiety to prevent binding. FIG. 4B is a graph showing in vitro cytotoxicity of human anti-fluorescein CAR T cells using tumor targeting antibodies coupled to "caged/masked" or "uncaged/unmasked" fluorescein derivatives, using a photoreactive o-nitrobenzyl protection group. CAR T cells specifically killed the target cells bound by commercial antibodies coupled to fluorescein isothiocyanate (FITC) or the ultraviolet (UV) "uncaged/unmasked" fluorescein derivative. However, CAR T cells were able to kill target cells bound by the "caged/masked" fluorescein derivatives.

DETAILED DESCRIPTION OF THE INVENTION

Unless defined otherwise, all technical and scientific terms used herein have the same meaning as is commonly understood by one of skill in art to which the subject matter herein belongs. As used in the specification and the appended claims, unless specified to the contrary, the following terms have the meaning indicated in order to facilitate the understanding of the present invention.

As used in the description and the appended claims, the singular forms "a", "an", and "the" include plural referents unless the context clearly dictates otherwise. Thus, for example, reference to "a composition" includes mixtures of two or more such compositions, reference to "an inhibitor" includes mixtures of two or more such inhibitors, and the like.

Unless stated otherwise, the term "about" means within 10% (e.g., within 5%, 2% or 1%) of the particular value modified by the term "about."

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

With respect to compounds of the present invention, and to the extent the following terms are used herein to further describe them, the following definitions apply.

The term "specific binding" as it relates to interaction between the targeting moiety and the solid tumor associated antigen refers to an inter-molecular interaction that is substantially specific in that binding of the targeting moiety with other proteinaceous entities present on the cell surface may be functionally insignificant.

The term "specific binding" as it relates to interaction between the synthetic antigen (or unmasked pro-antigen) and the extracellular ligand on the CAR T cells refers to an inter-molecular interaction that is substantially specific in that binding of these entities with any other endogenous protein may be functionally insignificant.

Bifunctional Compounds

Figure 1A:
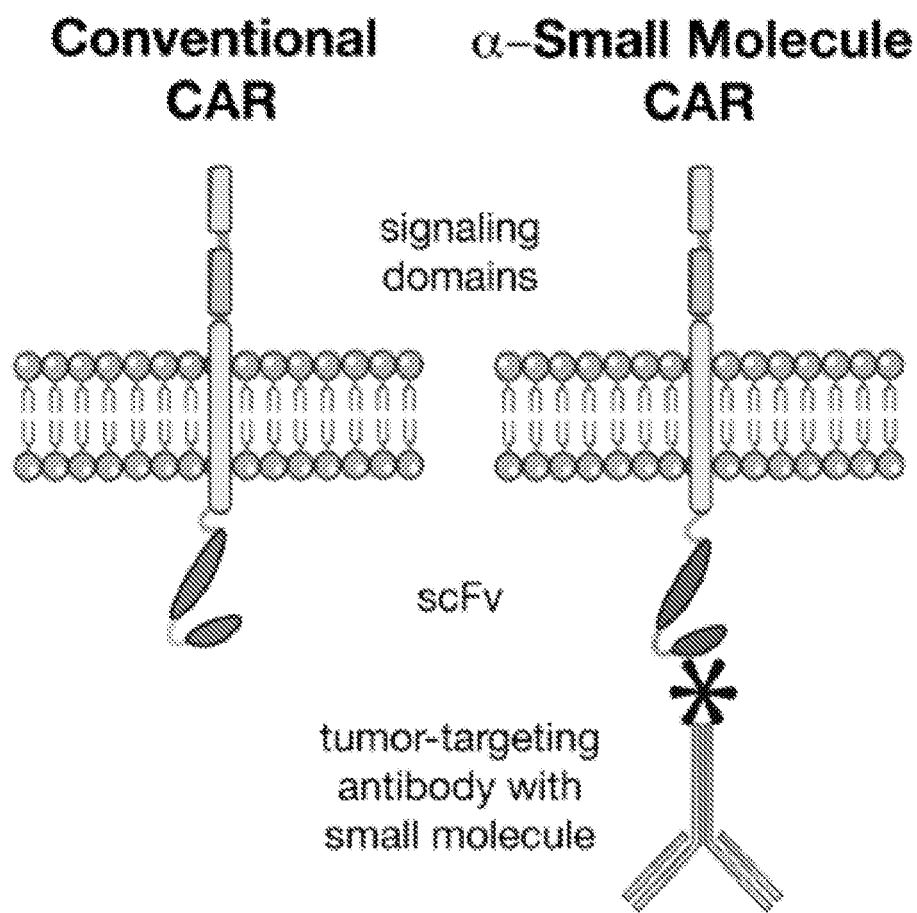
FIG. 1A-FIG. 1E is a series of diagrams that illustrate the advantages of doseable and multiplex anti-small molecules CAR T cells.

One key aspect of the present invention is the uncoupling of tumor cell targeting from tumor cell killing. As schematically shown in FIG. 1A, the CAR T cells kill the tumor cells without directly binding to the tumor cell. This is accomplished by use of bifunctional compounds where one functional moiety of which (the synthetic antigen or unmasked pro-antigen) is bound by the CAR T cell, and the second functional moiety of which specifically binds a solid tumor associated antigen.

Synthetic Antigens

The synthetic antigen is a small molecule or alternative epitope that serves as the target for the CAR-T cells. The antigen is synthetic in that it is not naturally present on any normal cells in the body, and antigenic in the sense that a CAR T cell can be designed to bind to it.

In general, a "small molecule" is understood in the art to be an organic molecule that is less than about 5 kilodaltons (kDa) in size. In some embodiments, the small molecule is less than about 4 kDa, about 3 kDa, about 2 kDa, or about 1 kDa. In some embodiments, the small molecule is less than about 800 daltons (Da), about 600 Da, about 500 Da, about 400 Da, about 300 Da, about 200 Da, or about 100 Da.

Representative examples of synthetic antigens that may be suitable for use in the present invention include a fluorescein, an anthracene, a rhodamine, a rhodol, an alexa fluor, an acridine, a xanthene, a pyrazine, an amphetamine, a benzodiazepine, a benzoylecgonine, a buprenorphine, an opioid, a cannabinoid, a phencyclidine, a tricyclic antidepressant, dextromethorphan, fentanyl, meprobamate, methadone, methamphetamine, oxycodone, tetrahydrocannabinol (THC), tramadol, zolpidem, ketamine, lysergic acid diethylamide (LSD), 3,4-methylenedioxymethamphetamine (MDMA), methaqualone, propoxyphene or norketimine, and 4-[(6-methylpyrazin-2-yl) oxy]benzoate (MPOB), anthraquinone-2-carboxylate (AQ), tetraxetan (DOTA) and any antigen of peptidic, glyosidic, or nucleotidic origin with low immunogenicity in humans (e.g. methyl L-α-aspartyl-L-phenylalaninate or aspartame, 13-[(2-O-β-D-glucopyranosyl-β-D-glucopyranosyl)oxy]-ent-kaur-16-en-19-oic acid β-D-glucopyranosyl ester or stevioside and a generic nucleotide such as nusinersen or spinraza). Further representative examples of synthetic antigens are known in the art.

Representative examples of fluoresceins (i.e., fluorescein and derivatives) that may be suitable for use in the present invention include 5-carboxyfluorescein, 6-carboxyfluorescein, 5-(iodoacetamido)fluorescein, 5-([4,6-dichlorotriazin-2-yl]amino)fluorescein hydrochloride, 5-(bromomethyl)fluorescein, fluorescein 5(6)-isothiocyanate, and fluorescein 5-carbamoylmethylthiopropanoic acid.

Thus, in some embodiments, wherein the synthetic antigen is a fluorescein, the bifunctional compound may have a structure represented by formulae (I) or (II) (with the linker (L), if present, and targeting moiety shown generically):

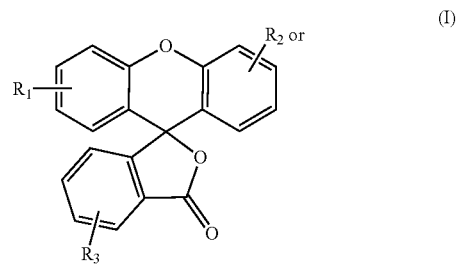

(I)

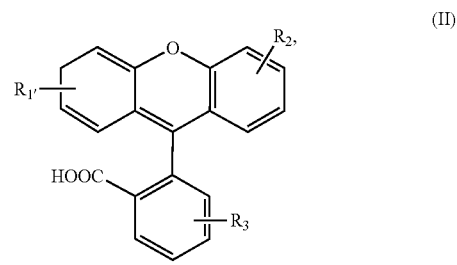

(II)

wherein $R_1$ and $R_2$ are each independently O, OH or H; $R_{1'}$ represents C=O, OH or H; and $R_3$ represents

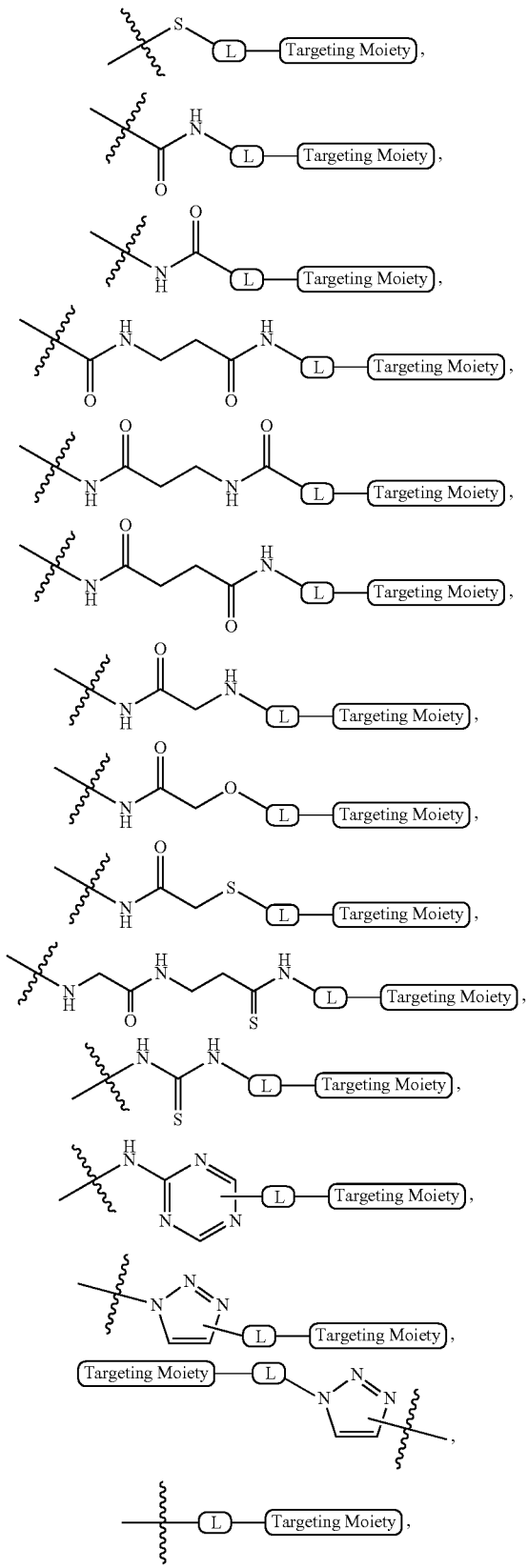

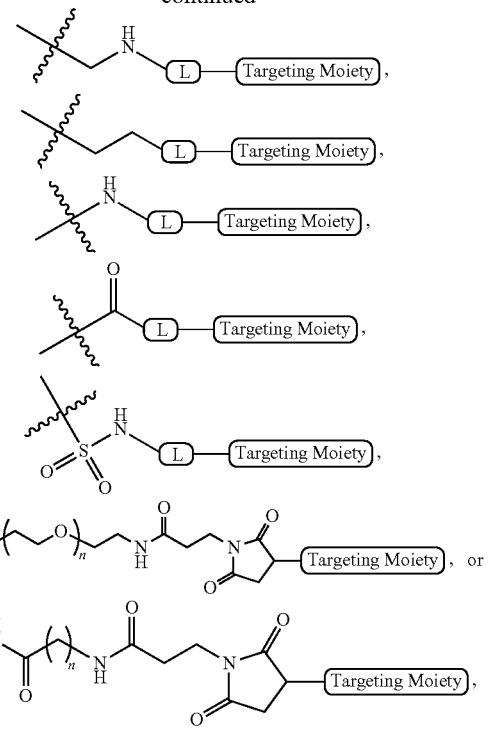

wherein Ⓛ is absent or a linker and n is 1-12; or a pharmaceutically acceptable salt or stereoisomer thereof.

Representative examples of anthracenes that may be suitable for use as synthetic antigens in the present invention include anthraquinone, anthraquinone-2-carboxylate, 2-aminoanthraquinone, 2-iodoanthraquinone, 2-chloroanthraquinone, 2-bromoanthraquinone, 2-ethynylanthraquinone, 2-cyanoanthraquinone, anthraquinone-2-sulfonate, anthraquinone-2-carbonyl chloride and 2-hydroxyanthraquinone.

In some embodiments, wherein the synthetic antigen is an anthracene, the bifunctional compound may have a structure represented by formula (III) (with the linker (L), if present, and targeting moiety shown generically):

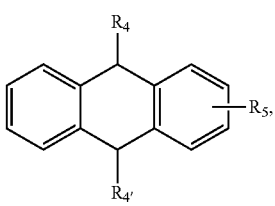

(III)

wherein each of $R_4$, $R_{4'}$ is independently O or OH; and $R_5$ is

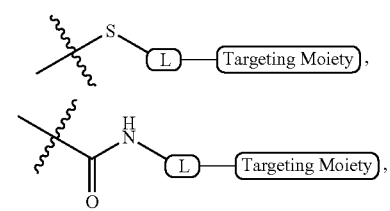

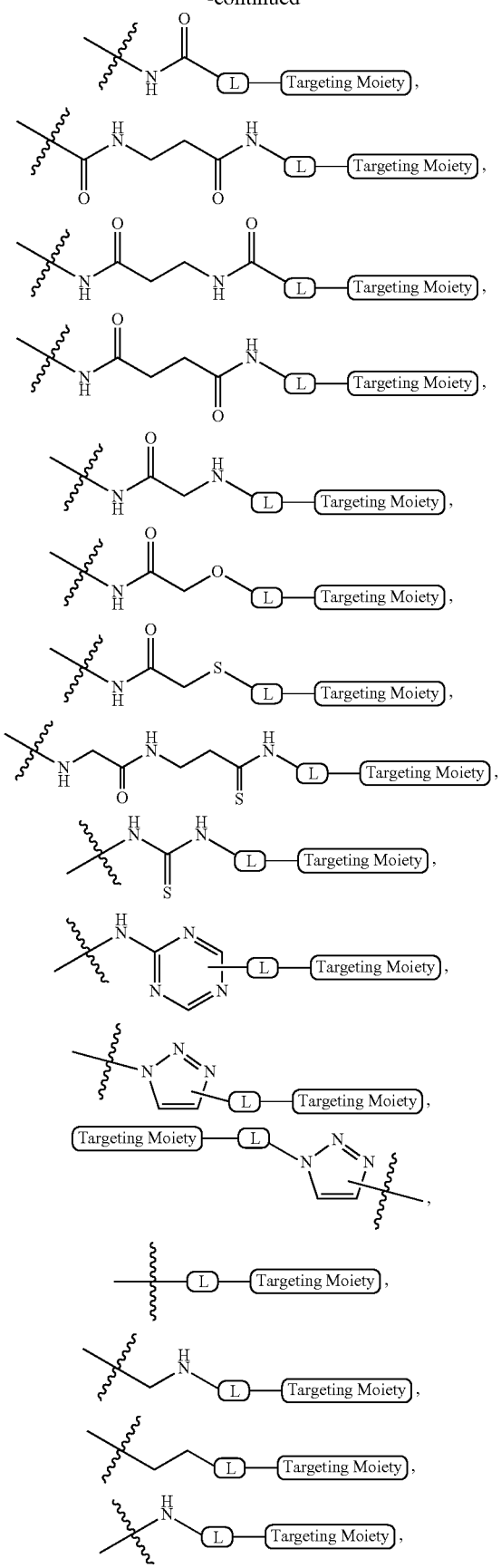

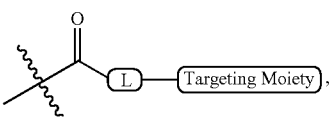

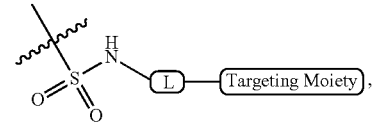

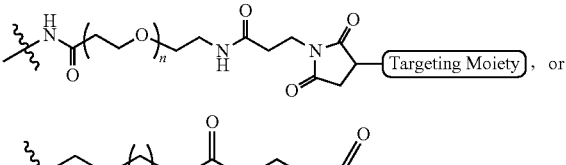

wherein L is absent or a linker and n is 1-12; or a pharmaceutically acceptable salt or stereoisomer thereof.

In some other embodiments wherein the small molecule is an anthracene, the bifunctional compound may have a structure represented by formula (III-1):

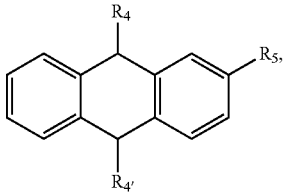

wherein each of $R_4$, $R_{4'}$ and $R_5$ are as defined above, or a pharmaceutically acceptable salt or stereoisomer thereof.

In some embodiments, wherein the synthetic antigen is MPOB, the bifunctional compound may have a structure represented by formula (IV):

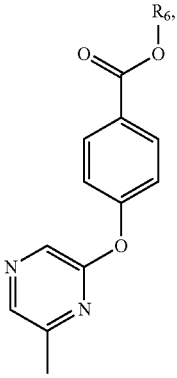

wherein $R_6$ is

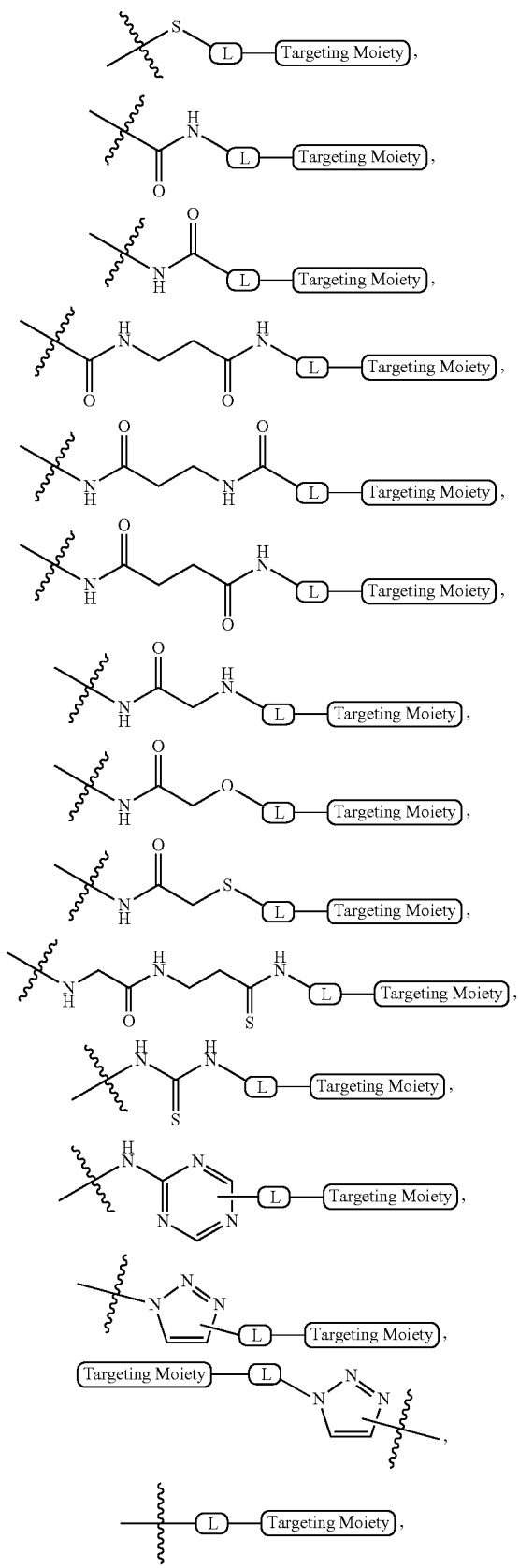

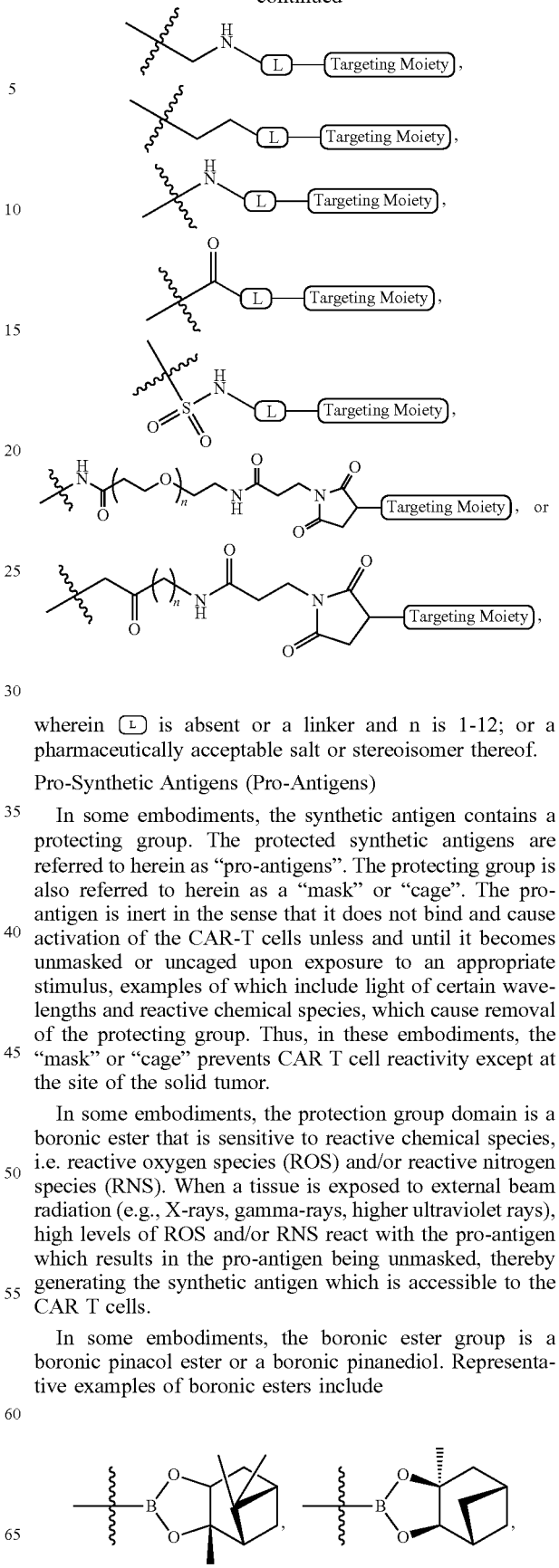

wherein L is absent or a linker and n is 1-12; or a pharmaceutically acceptable salt or stereoisomer thereof.

Pro-Synthetic Antigens (Pro-Antigens)

In some embodiments, the synthetic antigen contains a protecting group. The protected synthetic antigens are referred to herein as "pro-antigens". The protecting group is also referred to herein as a "mask" or "cage". The pro-antigen is inert in the sense that it does not bind and cause activation of the CAR-T cells unless and until it becomes unmasked or uncaged upon exposure to an appropriate stimulus, examples of which include light of certain wavelengths and reactive chemical species, which cause removal of the protecting group. Thus, in these embodiments, the "mask" or "cage" prevents CAR T cell reactivity except at the site of the solid tumor.

In some embodiments, the protection group domain is a boronic ester that is sensitive to reactive chemical species, i.e. reactive oxygen species (ROS) and/or reactive nitrogen species (RNS). When a tissue is exposed to external beam radiation (e.g., X-rays, gamma-rays, higher ultraviolet rays), high levels of ROS and/or RNS react with the pro-antigen which results in the pro-antigen being unmasked, thereby generating the synthetic antigen which is accessible to the CAR T cells.

In some embodiments, the boronic ester group is a boronic pinacol ester or a boronic pinanediol. Representative examples of boronic esters include -continued

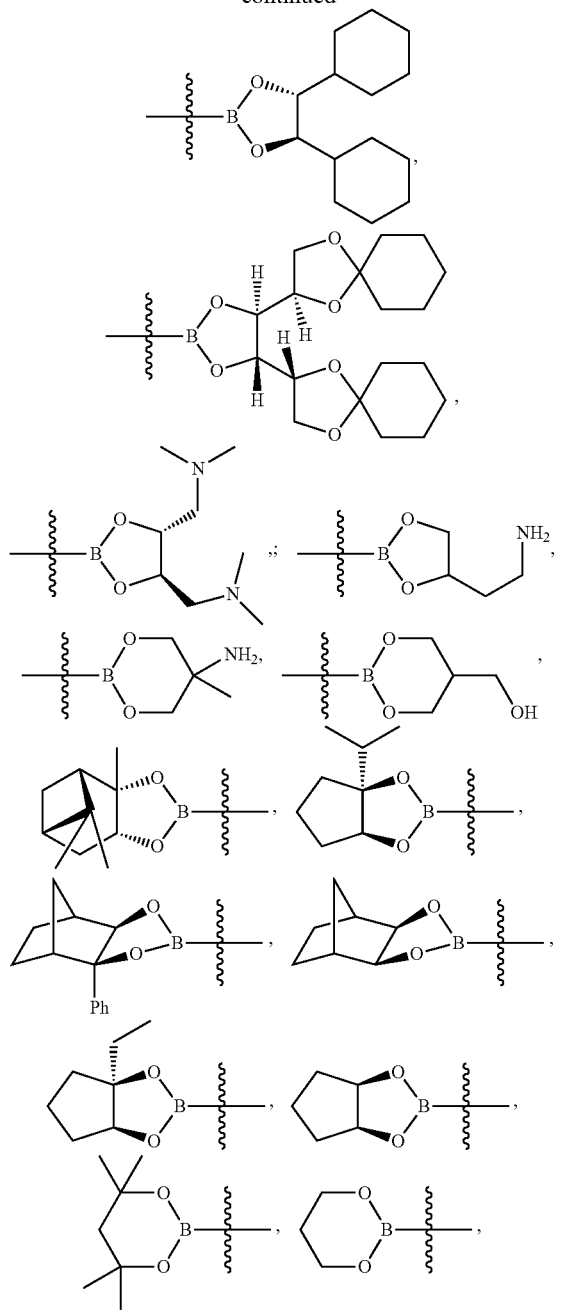

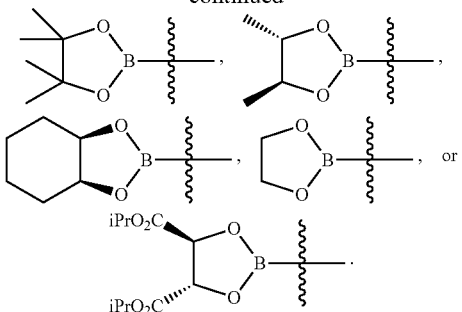

Thus, in some embodiments, wherein the pro-antigen is a fluorescein, the bifunctional compound may have a structure represented by formula (V) or (VI) (with the linker (L), if present, and targeting moiety shown generically):

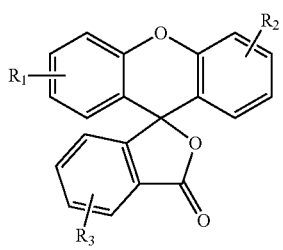

(V)

or

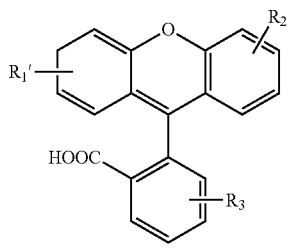

(VI)

wherein $R_1$ is independently O, OH or a protecting group, $R_{1'}$ is independently C=O, O, OH or a protecting group, $R_2$ is independently O, OH or a protecting group; and $R_3$ is

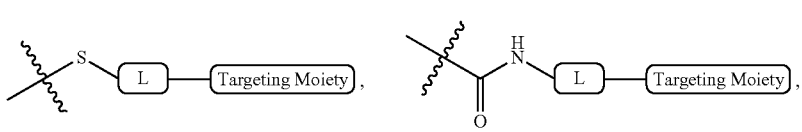

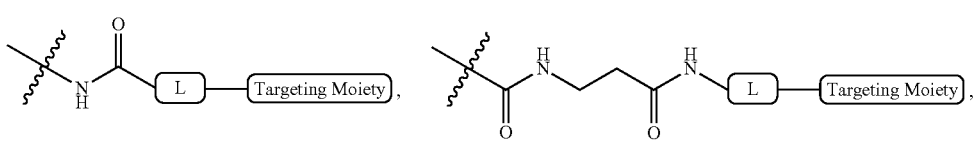

-continued

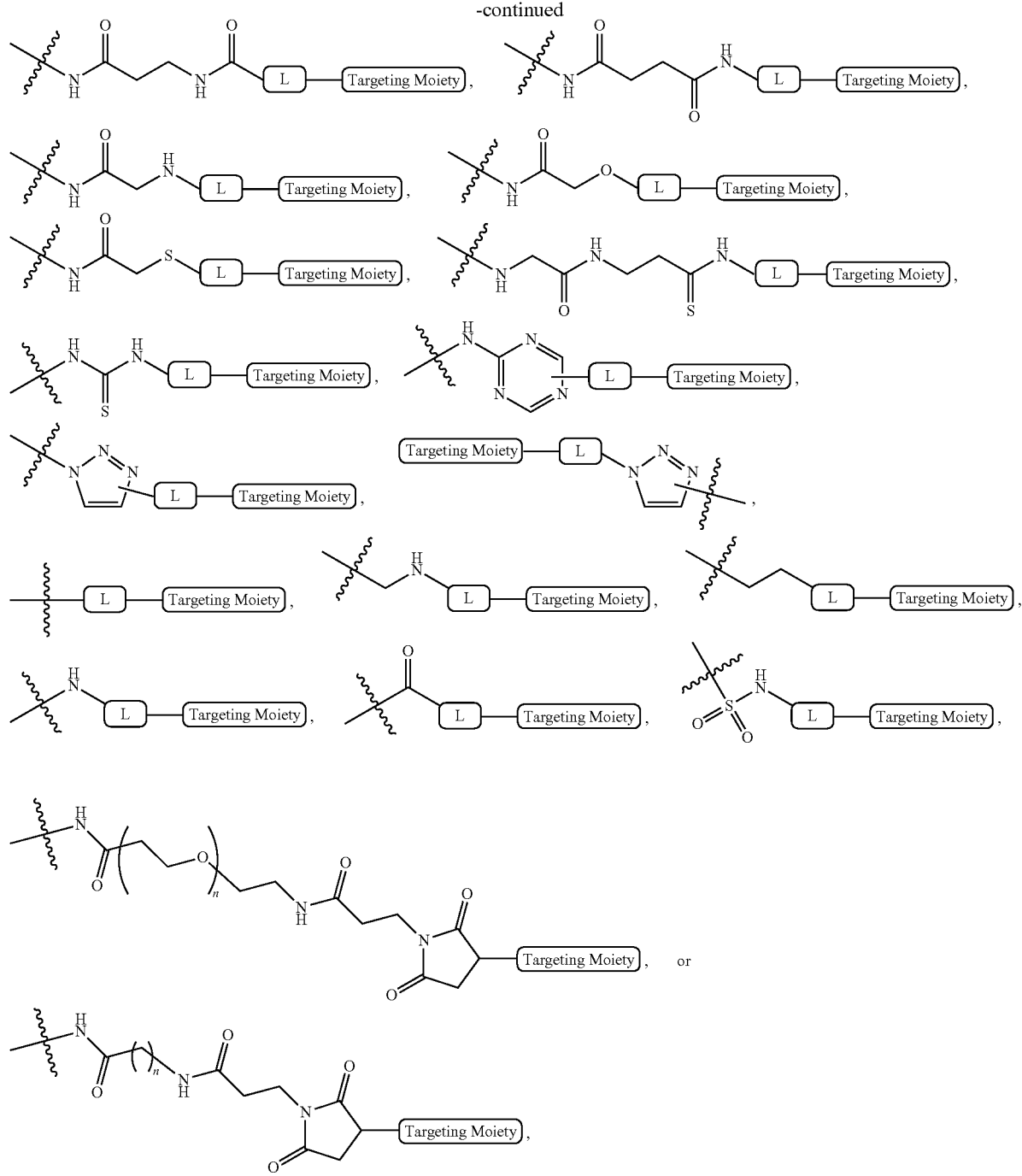

wherein Ⓛ is absent or a linker and n is 1-12; provided that at least one of $R_1$, $R_{1'}$, and $R_2$ is a protecting group; or a pharmaceutically acceptable salt or stereoisomer thereof. In some embodiments, both $R_1$ and $R_2$ or both $R_{1'}$ and $R_2$ are protecting groups.

In some embodiments, wherein the pro-antigen is a fluorescein that contains a boronic ester protecting group, the bifunctional compound may have a structure represented by formula (VII):

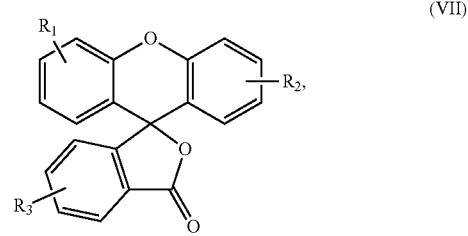

wherein $R_1$ is O, OH or a boronic ester protecting group;
$R_2$ is O, OH or a boronic ester protecting group; provided that at least one of $R_1$ and $R_2$ is a boronic ester protecting group; and
$R_3$ is
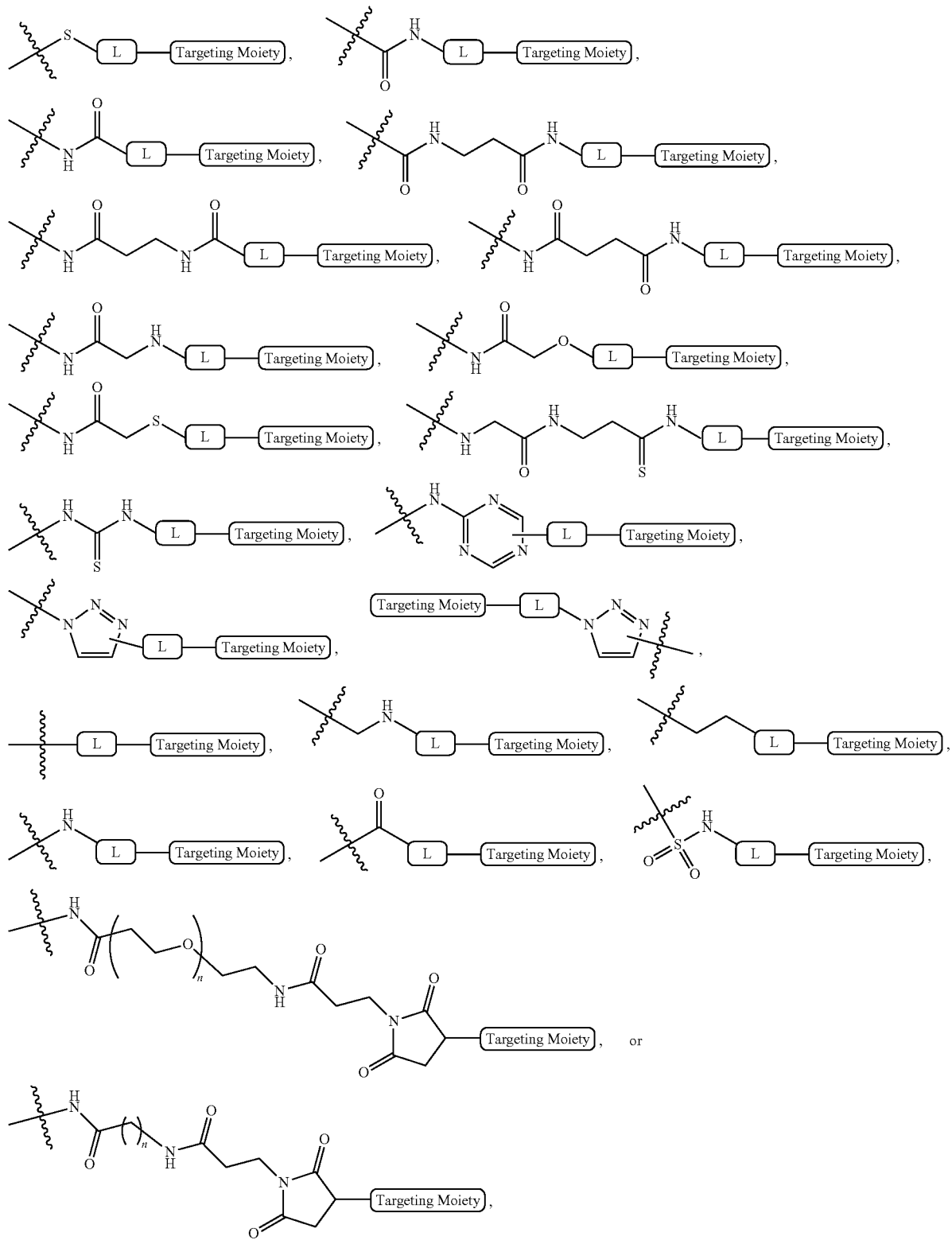

wherein ⓛ is absent or a linker and n is 1-12; wherein the boronic ester protecting group is

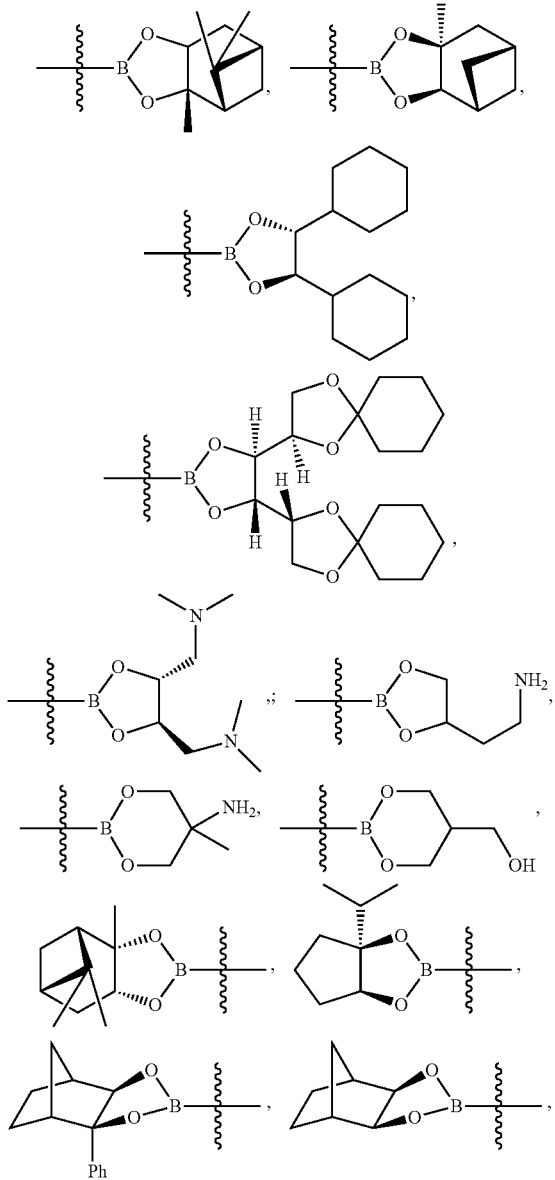

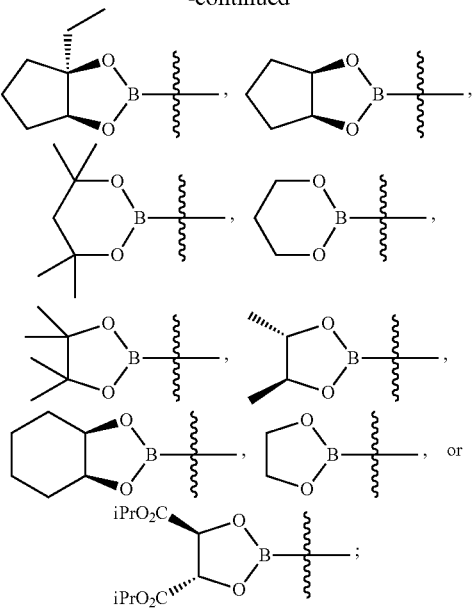

or a pharmaceutically acceptable salt or a stereoisomer thereof. In some embodiments, both $R_1$ and $R_2$ are boronic ester protecting groups.

In some embodiments, the bifunctional compound has a structure represented by formula (VIIa).

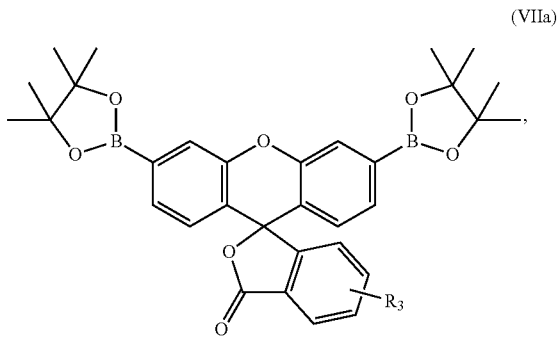

(VIIa)

or a pharmaceutically acceptable salt or stereoisomer thereof.

In some embodiments, the bifunctional compound has a structure represented by formula (VIIa1):

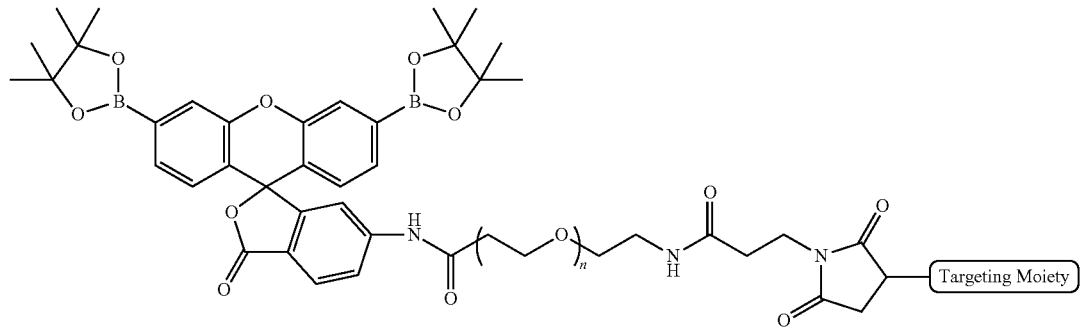

(VIIa1), or a pharmaceutically acceptable salt or stereoisomer thereof.

In some embodiments, the bifunctional compound has a structure represented by formula (VIIb):

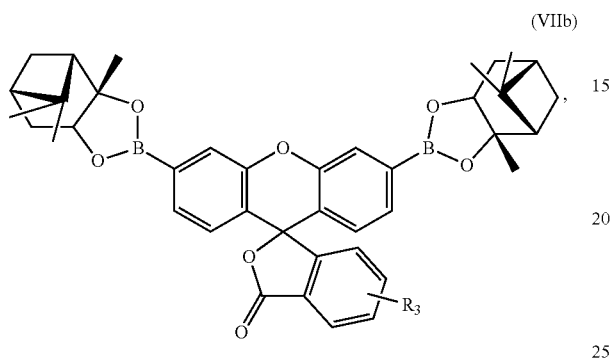

(VIIb)

or a pharmaceutically acceptable salt or stereoisomer thereof.

In some embodiments, the bifunctional compound has a structure represented by formula or a pharmaceutically acceptable salt or stereoisomer thereof.

In some embodiments, wherein the pro-antigen is an anthracene, the bifunctional compound may have a structure represented by formula (VIII) (with the linker (L), if present, and targeting moiety shown generically):

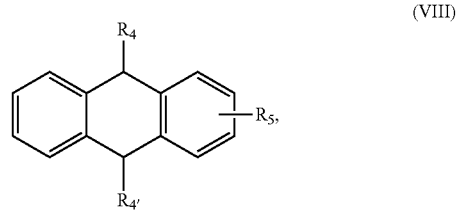

(VIII)

wherein each of $R_4$ and $R_{4'}$ is independently O or a protecting group, provided that at least one of $R_4$ and $R_{4'}$ is a protecting group; and (VIIb1)

$R_5$ is
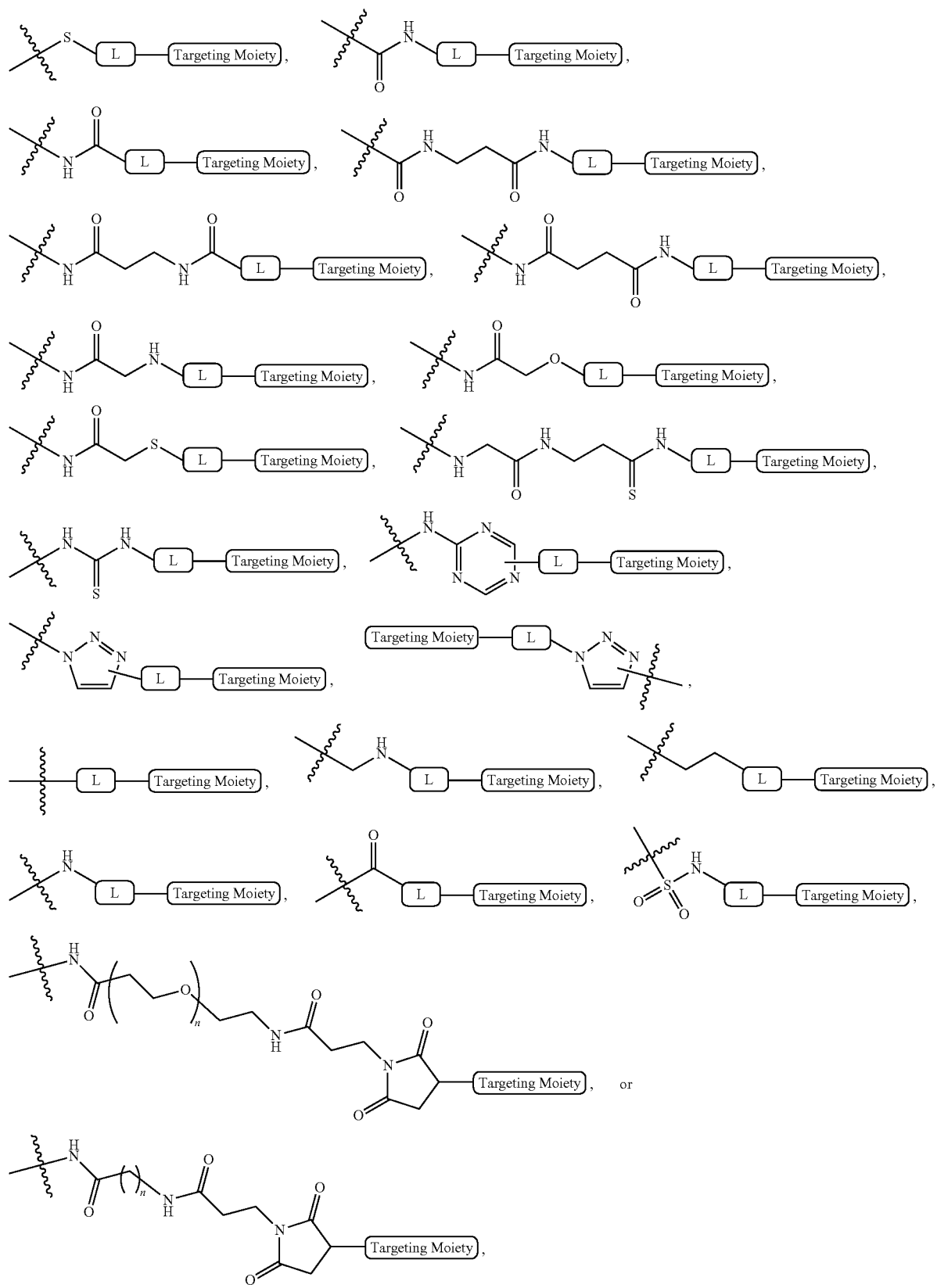

wherein L is absent or a linker and n is 1-12; or a pharmaceutically acceptable salt or stereoisomer thereof. In some embodiments, both $R_4$ and $R_{4'}$ are protecting groups.

In some embodiments, wherein the pro-antigen is an anthracene containing a boronic ester protecting group, the bifunctional compound may have a structure represented by formula (VIII-1):

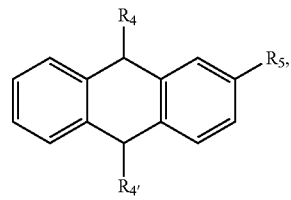
(VIII-1)

wherein each of $R_4$ and $R_{4'}$ is independently O or a boronic ester protecting group; provided that at least one of $R_4$ and $R_{4'}$ is a protecting group; and

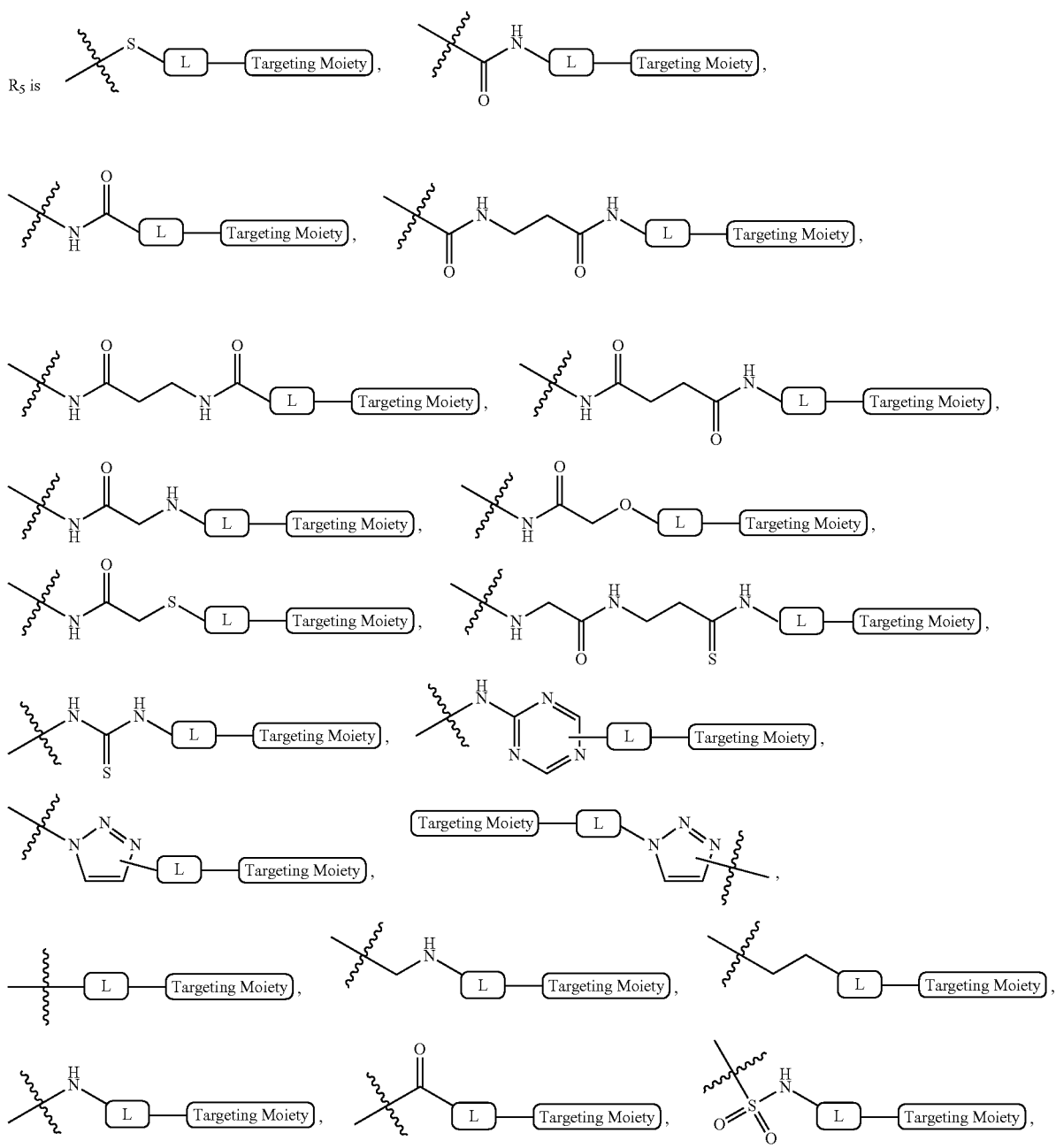

-continued
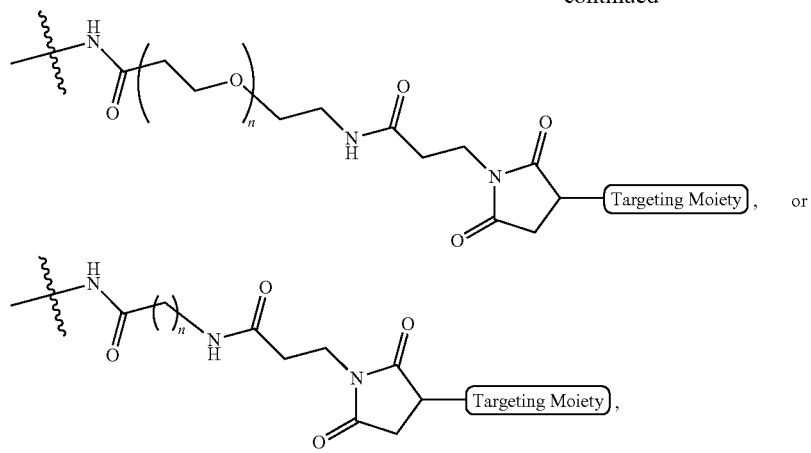
wherein ⓛ is absent or a linker and n is 1-12; wherein the boronic ester protecting group is
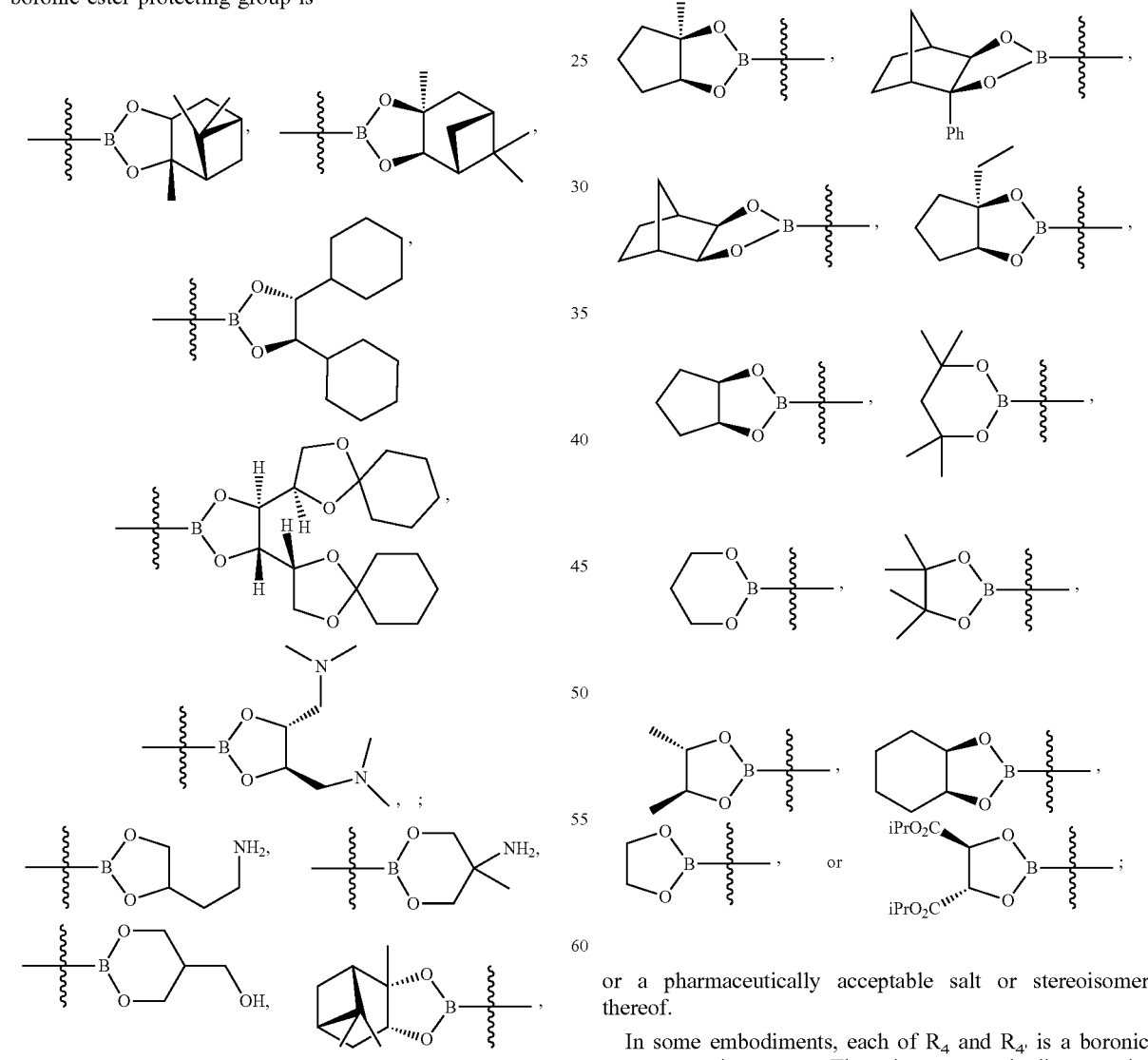
or a pharmaceutically acceptable salt or stereoisomer thereof.
In some embodiments, each of $R_4$ and $R_{4'}$ is a boronic ester protecting group. Thus, in some embodiments, the bifunctional compound has a structure represented by formula (VIII-1a):

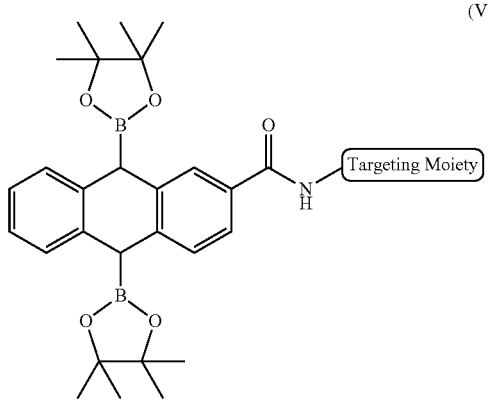

(VIII-1a)

or a pharmaceutically acceptable salt or stereoisomer thereof.

In some other embodiments, the bifunctional compound has a structure represented by formula (VIII-1b):

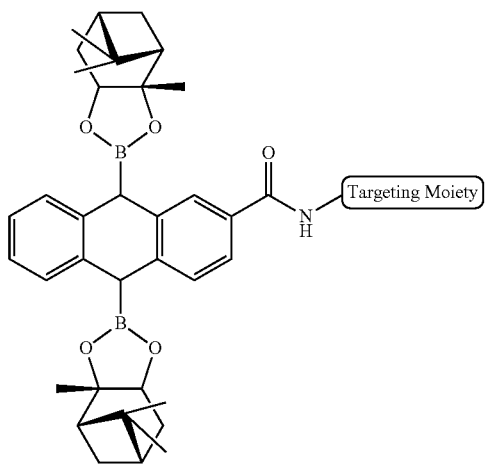

(VIII-1b)

or a pharmaceutically acceptable salt or stereoisomer thereof.

In some other embodiments, the protecting group is in whole or in part photosensitive, i.e. photocleavable. As used herein, the terms "photosensitive" and "photocleavable" are interchangeable. In some embodiments, the protection domain is composed of one or more photocleavable groups. When the photocleavable groups are exposed to light of an appropriate wavelength, the pro-antigen is unmasked thereby generating the synthetic antigen. Persons skilled in the art will be able to determine appropriate photoprotective groups and corresponding wavelength-selective deprotection in accordance with techniques known in the art. See, e.g., Hansen, et al., Chem. Soc. Rev. 44:3358-77 (2015).

Representative examples of photocleavable groups include ortho-nitrobenzyl based groups, phenacyl ester-based groups, 8-quinolinyl benzenesulfonate group, dicoumarin group, 6-bromo-7-alkoxycoumarin-4-ylmethoxycarbonyl group, bimane based groups, and bis-arylhydrazone based groups. General structures and cleavage conditions are as follows (dashed lines indicate sites of cleavage):

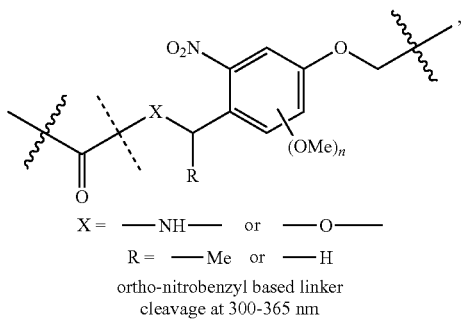

X = —NH— or —O—
R = —Me or —H
ortho-nitrobenzyl based linker
cleavage at 300-365 nm

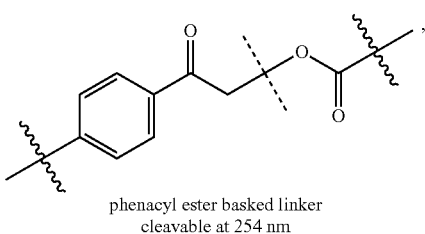

phenacyl ester basked linker
cleavable at 254 nm

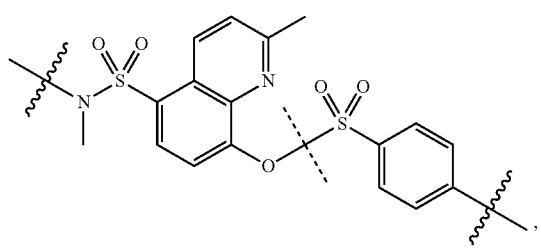

8-quinolinyl benzenesulfonate linker
cleavable at 313 nm

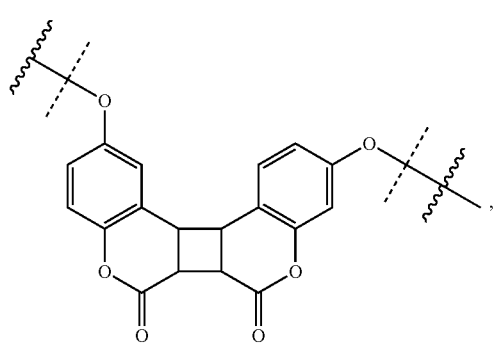

dicoumarin linker
cleavable at 532 nm

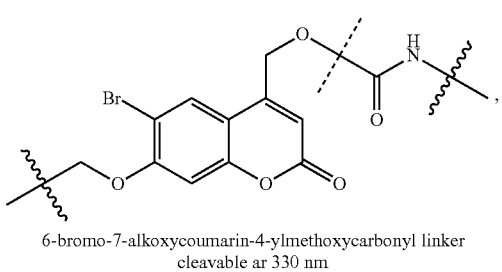

6-bromo-7-alkoxycoumarin-4-ylmethoxycarbonyl linker
cleavable ar 330 nm

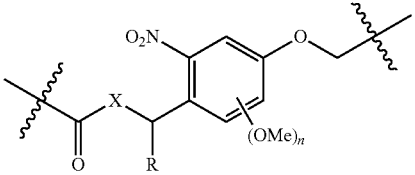

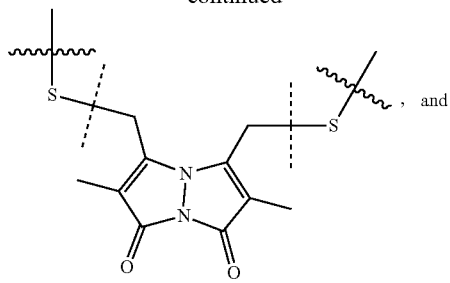

bimane based linker
cleaveable under MALDI conditions

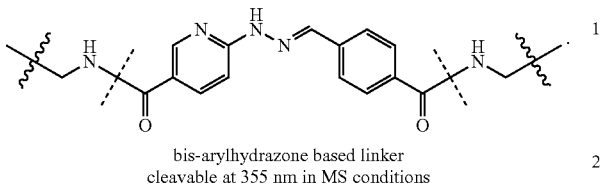

bis-arylhydrazone based linker
cleavable at 355 nm in MS conditions

In certain embodiments, the photocleavable protecting group is wherein X is NH or O, R is C1-4 alkyl or H and n is 0-3. In some embodiments, the ortho-nitrobenzyl based group is

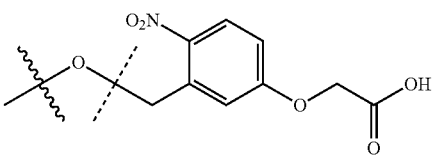

and cleaved at 300-365 nm.

In some embodiments, the bifunctional compound with a photocleavable protecting group has a structure represented by formula (IX):

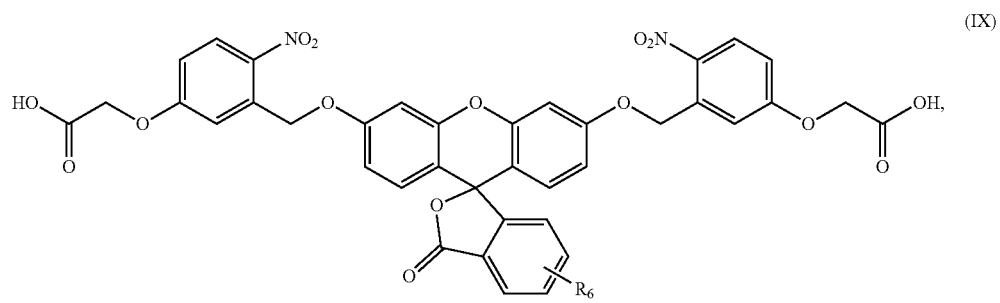

(IX)

wherein $R_6$ is

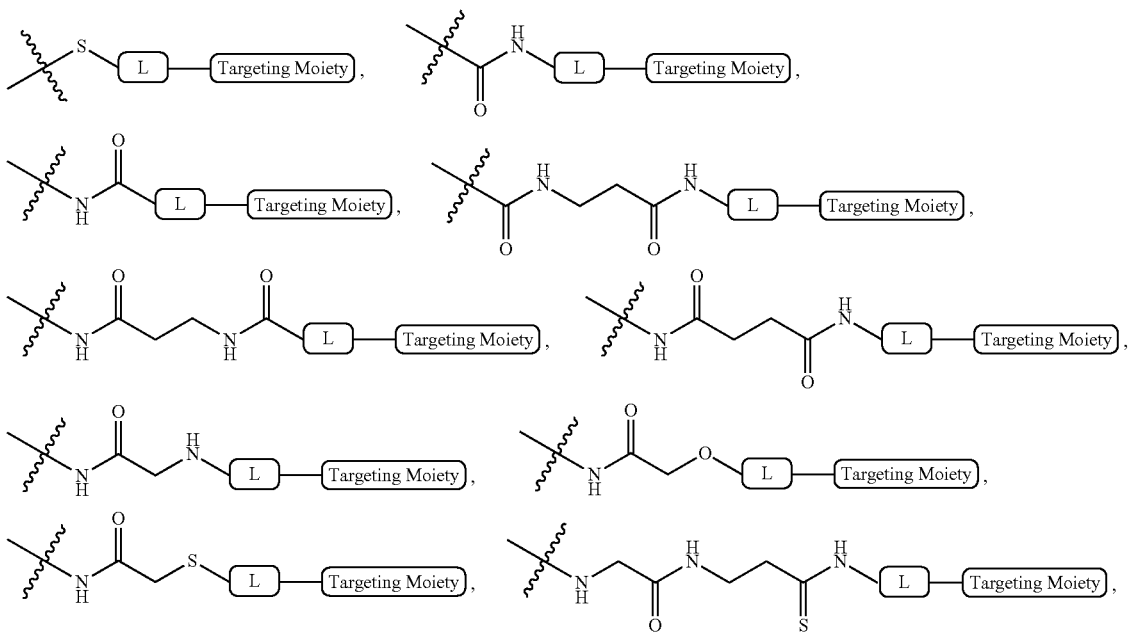

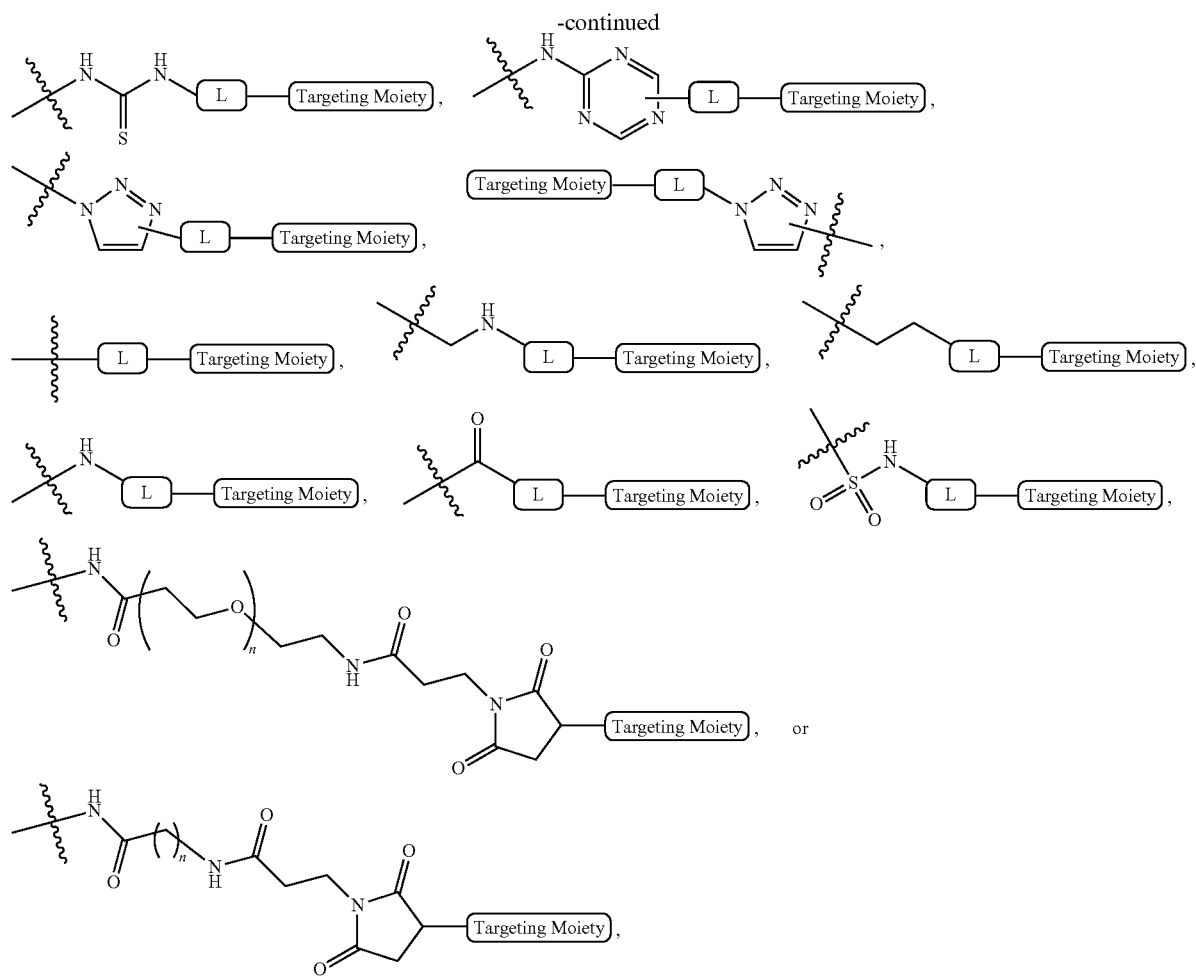

wherein L is absent or a linker and n is an integer from 1-12.

In some embodiments, the bifunctional compound with a photocleavable protecting group has a structure represented by formula (IX-1):

or a pharmaceutically acceptable salt or stereoisomer thereof.

Methods known in the art that may be useful in the syntheses of bifunctional compounds of the invention are described in Lin et al., Meth. Enzymol. 526:19-43 (2013)

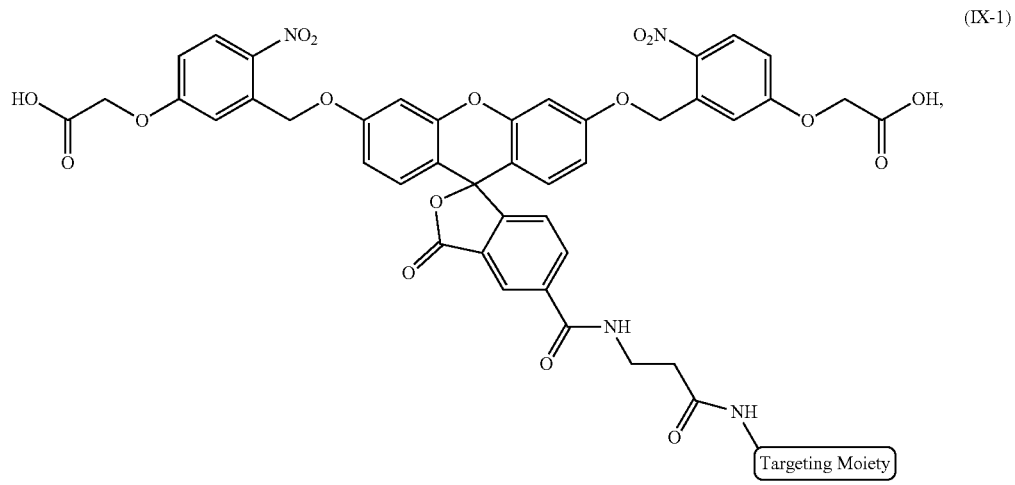 [SMILES: CNC(=O)CCNC(=O)c1ccc2c(c1)C(=O)OC21c2ccc(OCc3cc(OCC(=O)O)ccc3[N+](=O)[O-])cc2Oc2cc(OCc3cc(OCC(=O)O)ccc3[N+](=O)[O-])ccc21]

(and publications referenced therein); Chang et al., J. Am. Chem. Soc. 126(47):15392-3 (2004) (and publications referenced therein); Dickinson et al., J. Am. Chem. Soc. 132(16):5906-15 (2010) (and publications referenced therein); Debowska et al., Chemical Research in Toxicology 29(5):735-46 (2016); Rios et al, Free Radical Biology & Medicine 101:284-95 (2016); and Wang et al., ACS Applied Materials & Interfaces 7(43):24110-18 (2015).

Targeting Moiety

The targeting moiety, which constitutes one of the functional modalities of the bifunctional compounds of the present invention, specifically binds a solid tumor associated antigen.

Targeting moieties according to the invention have binding specificity for solid tumor associated antigens that may be present on a tumor cell. These tumor associated antigens may be over-expressed in tumor cells relative to their expression in normal, non-diseased cells. The lower expression on normal tissues more efficiently reduces the availability of the synthetic antigen on normal tissues. Thus, the present invention increases the number of targetable antigens "on target, on-tumor" but also allows for greater control by reducing "on-target, off-tumor" toxicities.

In some embodiments, a tumor antigen is a cell surface molecule that is inappropriately synthesized in the cancer cell, for instance, a molecule that contains deletions, additions or mutations in comparison to the molecule expressed on a normal cell. In some embodiments, the tumor associated antigen is a major histocompatibility complex (MHC) presented peptide. Normally, peptides derived from endogenous proteins fill the pockets of MHC class I molecules and are recognized by T cell receptors (TCRs) on CD8+T lymphocytes. The MHC class I complexes are constitutively expressed by all nucleated cells. In cancer, virus-specific and/or tumor-specific peptide/MHC complexes represent a unique class of cell surface targets for immunotherapy. In some embodiments, a tumor antigen is a cell surface molecule that is overexpressed in a cancer cell in comparison to a normal cell, for instance, 1-fold over expression, 2-fold overexpression, 3-fold overexpression or more in comparison to a normal cell.

Representative examples of targeting moieties include antibody molecules and functional (i.e., antigen-binding) fragments thereof, receptor ligands, peptides, haptens, aptamers, affimers, T-cell receptor tetramers and other targeting molecules known to those skilled in the art. For example, the targeting moiety may include a nucleic acid, polypeptide, glycoprotein, carbohydrate, or lipid.

In certain embodiments, the targeting moiety is an antibody or antibody fragment. Representative examples of antibodies include monoclonal antibodies, polyclonal antibodies, Fv, Fab, Fab' and F(ab')$_2$ immunoglobulin fragments, synthetic stabilized Fv fragments, e.g., single chain Fv fragments (scFv), disulfide stabilized Fv fragments (dsFv), single variable region domains (dAbs) minibodies, combibodies, and multivalent antibodies such as diabodies and multi-scFv, single domains from camelids or engineered human equivalents. The term "antibody" also includes any protein having a binding domain which is homologous or largely homologous to an immunoglobulin binding domain. Such proteins may be derived from natural sources, or partly or wholly synthetically produced.

In certain embodiments, the targeting moiety is an affimer. Affimer proteins are composed of a scaffold which is a stable protein based on the cystatin protein fold. They display two peptide loops and an N-terminal sequence that can be randomized to bind different target proteins with high affinity and specificity similar to antibodies. Stabilization of the peptide upon the protein scaffold constrains the possible conformations which the peptide may take, thus increasing the binding affinity and specificity compared to libraries of free peptides.

In certain embodiments, a targeting moiety is a nucleic acid molecule (e.g. an aptamer) that binds to a cell type specific marker. Aptamers are short synthetic single-stranded oligonucleotides that specifically bind to various molecular targets such as small molecules, peptides, proteins, nucleic acids, and even cells and tissues. These small nucleic acid molecules can form secondary and tertiary structures capable of specifically binding proteins or other cellular targets and are essentially a chemical equivalent of antibodies. Aptamers are highly specific, relatively small in size, and non-immunogenic. Aptamers are generally selected from a biopanning method known as SELEX (Systematic Evolution of Ligands by Exponential enrichment) (Ellington et al. Nature 346(6287):818-822 (1990); Tuerk et al., Science 249(4968):505-510 (1990); Ni et al., Curr Med Chem. (2011); 18(27):4206-14. Methods of generating an aptamer for any given target are well known in the art.

In some embodiments, a targeting moiety is a naturally occurring or synthetic ligand for a cell surface receptor.

In some embodiments, the targeting moiety is a carbohydrate. Carbohydrates may be natural or synthetic. A carbohydrate may be a derivatized natural carbohydrate. In some embodiments, the carbohydrate comprises monosaccharide or disaccharide, including but not limited to, glucose, fructose, galactose, ribose, lactose, sucrose, maltose, trehalose, cellbiose, mannose, xylose, arabinose, glucoronic acid, galactoronic acid, mannuronic acid, glucosamine, galatosamine, or neuramic acid. In some embodiments, the carbohydrate is a polysaccharide, such as, but not limited to, pullulan, cellulose, microcrystalline cellulose, hydroxypropyl methylcellulose (HPMC), hydroxycellulose (HC), methylcellulose (MC), dextran, cyclodextran, glycogen, starch, hydroxyethylstarch, carageenan, glycon, amylose, chitosan, N,O-carboxylmethylchitosan, algin and alginic acid, starch, chitin, konjac, glucommannan, pustulan, heparin, hyaluronic acid, curdlan, and xanthan. In some embodiments, the carbohydrate is a sugar alcohol, such as, but not limited to mannitol, sorbitol, xylitol, erythritol, maltitol, or lactitol.

In certain embodiments, the targeting moiety is directed to a TAA expressed by solid tumors that generate elevated levels of ROS and/or RNS. Elevated production of reactive chemical species (ROS/RNS) have been detected in almost all cancers, where they promote many aspects of tumor development and progression (Liou et al., Free Radic. Res. 44: 479-496 (2010); Trachootham et al., Nat. Rev. Drug Discov. 8: 579-591 (2009)). Altered cellular metabolism is considered a hallmark of cancer and is fast becoming an avenue for therapeutic intervention. Mitochondria have recently been viewed as an important cellular compartment that fuels the metabolic demands of cancer cells, as mitochondria are the major source of ATP and metabolites necessary to fulfill the bioenergetics and biosynthetic demands of cancer cells. Furthermore, mitochondria are central to cell death and the main source for generation of reactive oxygen species (ROS; Chowdhury, et al., Oxid. Med. Cell. Longev. 2018:1-10 (2018); Zhang, et al., Oxid. Med. Cell. Longev. 2016:1616781 (2016)). An extensive analysis of tumor cell lines in vitro has shown that they are regularly characterized by i) extracellular superoxide anion generation and ii) expression of membrane-associated catalase that protects the cells against intercellular ROS signaling and apoptosis.

Representative examples of targeting moieties and their corresponding receptors on tumor cells are set forth in Table 1:

TABLE 1

| TAA | Targeting Moiety | Source |
| --- | --- | --- |
| ACVR1 | mAb C-5 | Santa Cruz Biotechnology |
| ALK | Antibody or fragment thereof | Mino-Kenudson et al., Clin. Cancer Res. 16(5):1561-1571 (2010) |
| B7H3 (also known as CD276) | MGA271 | Macrogenics |
| BCMA | Antibody or fragment thereof | Friedman et al., Hum. Gene Ther. 29(5):585-601 (2018), Raje et al., N Engl. J. Med., 380(18):1726-1737 (2019), WO2010104949A2 and WO2003014294A2 |
| BST2 (also known as CD317) | Anti-CD317 antibody, Monoclonal [3H4] | Antibodies-Online |
| BST2 (also known as CD317) | Anti-CD317 antibody, Monoclonal [696739] | R&D Systems |
| CAIX | antibody clone 303123 | R&D Systems |
| CD5 | Antibody or fragment thereof | Mamonkin et al., Blood, 126:983-993 (2015). Chen et al., Leukemia, 31(10):2151-2160 (2017) |
| CD123, also known as IL3Rα | Antibody or fragment thereof | Luo et al., Blood, 126:3778 (2015) |
| CD133 | Antibody or fragment thereof | Biolegend, eBioscience, Miltenyi Biotec |
| CD138, also known as Syndecan 1 | Antibody or fragment thereof, Indatuximab | Schönfeld et al., J. Hematol. Oncol. 10:13 (2017). Jagannath et al., Clin. Lymphoma Myeloma Leuk. doi.org/10.1016/j.clml.2019.02.006 (2019). WO2009080829A1 |
| CD171 | Antibody or fragment thereof | Hong et al., J. Immunother. 37(2)93-104 (2014) |
| CD19 | Antibody or fragment thereof, Blinatumomab | WO2005052004A2 |
| CD20 | Antibody or fragment thereof, Ofatumumab | WO2004056312A2 |
| CD22 | Antibody or fragment thereof | Haso et al., Blood, 121(7): 1165-1174 (2013); Wayne et al., Clin. Cancer Res. 16(6):1894-1903 (2010); Kato et al., Leuk Res 37(1):83-88 (2013); Creative BioMart (creativebiomart.net): MOM-18047-S(P). U.S. Pat. No. 5,484,892 |
| CD24 | Antibody or fragment thereof | Maliar et al., Gastroenterology 143(5):1375-1384 (2012) |
| CD30 | Antibody or fragment thereof | U.S. Pat. Nos. 7,090,843, and EP0805871 |
| CD300LF | Anti-CMRF35-like molecule 1 antibody, Monoclonal [UP-D2] | BioLegend |
| CD300LF | Anti-CMRF35-like molecule 1 antibody, Monoclonal [234903] | R&D Systems |
| CD33 | Gemtuzumab Ozogamicin, or hP67.6 | Bross et al., Clin. Cancer Res. 7(6): 1490-1496 (2001) |
| CD33 | Lintuzumab or HuM195 | Caron et al., Cancer Res. 52(24):6761-6767 (1992) |
| CD33 | AVE9633 | Lapusan et al., Invest New Drugs 30(3):1121-1131 (2012) |
| CD38 | Antibody or fragment thereof, Daratumumab | WO2011154453A1 |
| CD40 | Antibody or fragment thereof, Lucatumumab, Dacetuzumab, | Bensinger et al., Br J Haematol; 159: 58-66 (2012). Hussein et al., Haematologica, 95: 845-848 (2010). WO2012075111A1 and WO2016069919A1 |
| CD44v6 | Antibody or fragment thereof | Casucci et al., Blood 122(20):3461-3472 (2013) |
| CD70 | Antibody or fragment thereof | Shaffer et al., Blood, 117:4304-4314 (2011), WO2004073656A2 |
| CD74 | Antibody or fragment thereof | Kaufman et al., Br J Haematol. 163: 478-486 (2013). WO2003074567A2 |
| CD97 | Antibody or fragment thereof | U.S. Pat. No. 6,846,911; de Groot et at., J. Immunol. 183(6):4127-4134 (2009) |

TABLE 1-continued

| TAA | Targeting Moiety | Source |
|---|---|---|
| CD97 | MAB3734 | R&D |
| CD99 | mAb 3B2/TA8, MEM-131; mAb DN16 | Invitrogen ™; Bio-Rad |
| CEA | Antibody or fragment thereof | Chmielewski et al., Gastoenterology 143(4): 1095-1107 (2012) |
| CLDN6 | antibody IMAB027 | Ganymed Pharmaceuticals; clinicaltrial.gov/show/NCT02054351 |
| CS1 | Antibody or fragment thereof, Elotuzumab | WO2004100898A2 |
| CYP1B1 | Antibody or fragment thereof | Maecker et al., Blood 102(9): 3287-3294 (2003) |
| EGFR | cetuximab, panitumumab, zalutumumab, nimotuzumab, or matuzumab | Commercial sources |
| EMR2 (also known as CD312) | Anti-CD312 antibody, Monoclonal [LS-B8033] | Lifespan Biosciences |
| EMR2 (also known as CD312) | Anti-CD312 antibody, Monoclonal [494025] | R&D Systems |
| EPCAM | MT110, EpCAM-CD3 bispecific Ab | clinicaltrials.gov/ct2/show/NCT00635596) |
| EPCAM | Edrecolomab; 3622W94; ING-1; and adecatumumab (MT201) | Commercial sources |
| EphA2 | Antibody or fragment thereof | Yu et al., Mol Ther 22(1):102-111 (2014) |
| Ephrin B2 | Antibody or fragment thereof | Abengozar et al., Blood 119(19):4565-4576 (2012) |
| ERBB2 (HER2/neu) | trastuzumab, or pertuzumab | Commercial sources |
| FAP | Antibody or fragment thereof | Ostermann et al., Clinical Cancer Research 14:4584-4592 (2008) |
| FAP | sibrotuzumab | Hofheinz et al., Oncology Research and Treatment 26:44-48 (2003); and Tran et al., J. Exp. Med. 210(6):1125-1135 (2013) |
| FCAR | CD89/FCAR Antibody (Catalog #10414-H08H) | Sino Biological Inc. |
| Folate receptor alpha | Antibody IMGN853 | Commercial sources |
| Folate receptor alpha | Antibody or fragment thereof | US20120009181; U.S. Pat. No. 4,851,332 and U.S. Pat. No. 5,952,484 |
| Fos-related antigen 1 | Antibody 12F9 | Novus Biologicals |
| Fucosyl GM1 | Antibody or fragment thereof | US20100297138; or WO2007/067992 |
| GD2 | Antibody or fragment thereof | Mujoo et al., Cancer Res. 47(4):1098-1104 (1987); Cheung et al., Cancer Res 45(6):2642-2649 (1985), Cheung et al., J. Clin. Oncol. 5(9):1430-1440 (1987), Cheung et al., J. Clin. Oncol. 16(9):3053-3060 (1998), Handgretinger et al., Cancer Immunol. Immunother. 35(3):199-204 (1992); US Publication No.: 20100150910 or PCT Publication No.: WO2011160119 |
| GD2 | mAb 14.18, 14G2a, ch14.18, hu14.18, 3F8, hu3F8, 3G6, 8B6, 60C3, 10B8, ME36.1, and 8H9; or fragments thereof | WO2012033885, WO2013040371, WO2013192294, WO2013061273, WO2013123061, WO2013074916, and WO201385552 |
| GD3 | Antibody or fragment thereof | U.S. Pat. No. 7,253,263; U.S. Pat. No. 8,207,308; US 20120276046; EP1013761; WO2005035577; and U.S. Pat. No. 6,437,098 |
| GD3 | Antibody or fragment thereof | U.S. Pat. No. 7,253,263; U.S. Pat. No. 8,207,308; US 20120276046; EP1013761 A3; 20120276046; WO2005035577; or U.S. Pat. No. 6,437,098 |
| GloboH | Antibody or fragment thereof | Kudryashov et al., Glycoconj J. 15(3):243-9 (1998), Lou et al., Proc. Natl. Acad. Sci. USA. 111(7):2482-2487 (2014) |
| GloboH | Antibody MBr1 | Bremer et al., J. Biol. Chem. 259:14773-14777 (1984) |
| GM3 | antibody CA 2523449 (mAb 14F7) | Commercial sources |
| Gp100 | antibody HMB45, NKIbetaB | Commercial sources |
| Gp100 | Antibody or fragment thereof | WO2013165940 or US20130295007 |

TABLE 1-continued

| TAA | Targeting Moiety | Source |
|---|---|---|
| GPC3 | Antibody hGC33 | Nakano et al., Anticancer Drugs 21(10):907-916 (2010) |
| GPC3 | Antibody MDX-1414, HN3, or YP7 | Feng et al., FEBS Lett. 588(2):377-382 (2014) |
| GPRC5D | antibody FAB6300A | R&D Systems |
| GPRC5D | Antibody LS-A4180 | Lifespan Biosciences |
| HER2 | Antibody or fragment thereof, Trastuzumab, Pertuzumab | US8591897B2, WO2001000245A2 |
| HMWMAA | mAb9.2.27 | Kmiecik et al., Oncoimmunology 3(1):e27185 (2014) |
| HMWMAA | Antibody or fragment thereof | U.S. Pat. No. 6,528,481; WO2010033866; or US 20140004124 |
| Human telomerase reverse transcriptase | Antibody cat no: LS-B95-100 | Lifespan Biosciences |
| IGF-1 | Antibody or fragment thereof | U.S. Pat. No. 8,344,112 B2; EP2322550 A1; WO2006/138315, or PCT/US2006/022995 |
| IL-11Rα | Antibody or fragment thereof | Abcam ® (cat #ab55262) or Novus Biologicals (cat #EPR5446) |
| IL-11Rα | Peptide | Huang et al., Cancer Res. 72(1):271-281 (2012) |
| IL-13Rα2 | Antibody or fragment thereof | WO2008/146911, WO2004087758, several commercial catalog antibodies, and WO2004087758 |
| Intestinal carboxyl esterase | Antibody 4F12: cat no: LS-B6190-50 | Lifespan Biosciences |
| KIT (also known as CD117) | Antibody or fragment thereof | U.S. Pat. No. 7,915,391, US20120288506, and several commercial catalog antibodies |
| LewisY | Hu3S193 Ab (scFvs) | Kelly et al., Cancer Biother. Radiopharm. 23(4):411-423 (2008) |
| LewisY | NC10 scFv | Dolezal et al., Protein Engineering 16(1):47-56 (2003) |
| LMP2 | Antibody or fragment thereof | U.S. Pat. No. 7,410,640, or US20050129701 |
| MAD-CT-2 | Antibody or fragment thereof | PMID: 2450952; U.S. Pat. No. 7,635,753 |
| MAGE-A1 | Antibody or fragment thereof | Willemsen et al., J. Immunol. 174(12):7853-7858 (2005) |
| MelanA/MART1 | Antibody or fragment thereof | EP2514766 A2; or U.S. Pat. No. 7,749,719 |
| Mesothelin | Antibody or fragment thereof | Morello et al., Cancer Discov. 6:133-46 (2016) |
| MUC1 | Antibody SAR566658 | Commercial sources |
| MUC1c | Antibody or fragment thereof | Kufe Oncogene, 32:1073-1081 (2013) |
| Mut hsp70-2 | Monoclonal: cat no: LS-C133261-100 | Lifespan Biosciences |
| NCAM also known as CD56 | antibody clone 2-2B: MAB5324, Lorvotuzumab | EMD Millipore |
| NY-BR-1 | Antibody or fragment thereof | Jager et al., Appl. Immunohistochem. Mol. Morphol. 15(1):77-83 (2007) |
| o-acetyl-GD2 | antibody 8B6 | Commercial sources |
| PDGFR-β | ab32570 | Abcam ® |
| PDGFRα | mAb APA5; mAb 16A1, Olaratumab | Invitrogen ™; Biolegend, US8128929B2 |
| PLAC1 | Antibody or fragment thereof | Ghods et al., Biotechnol. Appl. Biochem. 61(3):363-369 (2013) |
| Polysialic acid | Antibody or fragment thereof | Nagae et al., J. Biol. Chem. 288(47):33784-33796 (2013) |
| PRSS21 | Antibody or fragment therof | U.S. Pat. No. 8,080,650 |
| PSCA | scFv 7F5 | Morgenroth et al., Prostate 67(10):1121-1131 (2007) |
| PSCA | scFv C5-II | Nejatollahi et al., J. of Oncology article ID 839831 (2013) |
| PSCA | Antibody or fragment thereof | U.S. Pat. Publication No. 20090311181 |
| PSMA | Antibody or fragment thereof | Parker et al., Protein Expr. Purif. 89(2):136-145 (2013) |
| PSMA | J591 ScFv | US 20110268656 |
| PSMA | scFvD2B | Frigerio et al., European J. Cancer 49(9):2223-2232 (2013) |
| PSMA | mAbs 3/A12, 3/E7 and 3/F11 and single chain antibody fragments scFv AS and D7 | WO2006125481 |
| RAGE-1 | Antibody MAB5328 | EMD Millipore |

TABLE 1-continued

| TAA | Targeting Moiety | Source |
| --- | --- | --- |
| ROR1 | Antibody or fragment thereof | Hudecek et al., Clin. Cancer Res. 19(12):3153-3164 (2013); WO 2011159847; and US20130101607 |
| Sarcoma translocation breakpoints | Antibody or fragment thereof | Luo et al., EMBO Mol. Med. 4(6):453-461 (2012) |
| sLe | antibody G193 (for lewis Y) | Scott et al., Cancer Res. 60:3254-3261 (2000); Neeson et al., J. Immunol. May 2013 190 (Meeting Abstract Supplement) 177.10 |
| Sperm protein 17 | Antibody or fragment thereof | Song et al., Target Oncol. 9(3):263-272 (2013); Song et al., Med Oncol 29(4):2923-2931 (2012) |
| SSEA-4 | Antibody MC813 | Cell Signaling; or other commercially available antibodies |
| TAG72 | Antibody or fragment thereof | Hombach et al., Gastroenterology 113(4):1163-1170 (1997) |
| TAG72 | Ab691 | Abcam ® |
| TEM1/CD248 | Antibody or fragment thereof | Marty et al., Cancer Lett. 235(2)298-308 (2006); Zhao et al., J. Immunol. Methods 363(2):221-232 (2011) |
| Tie2 | Antibody AB33 | Cell Signaling Technology |
| Tn antigen | Antibody or fragment thereof | U.S. Pat. No. 8,440,798, Brooks et al., PNAS 107(22):10056-10061 (2010), and Stone et al., OncoImmunology 1(6):863-873(2012) |
| TRP-2 | Antibody or fragment thereof | Wang et al., J. Exp. Med. 184(6):2207-2216 (1996) |
| TSHR | Antibody or fragment thereof | U.S. Pat. No. 8,603,466; U.S. Pat. No. 8,501,415; or U.S. Pat. No. 8,309,693 |
| Tyrosinase | Antibody or fragment thereof | U.S. Pat. No. 5,843,674; or U.S. Ser. No. 19/950,504048 |
| VEGFR2 | Antibody or fragment therof | Chinnasamy et al., J. Clin. Invest. 120(11):3953-3968 (2010) |
| WT-1 | Antibody 176ra33 | Dao et al., Sci. Transl. Med. 5(176):176ra33 (2013) |
| WT-1 | Antibody or fragment thereof | WO2012/135854 |

In some embodiments, the targeting ligand binds a hematologic tumor associated antigen. For example, tumor associated antigens present on multiple myeloma cells that may be targeted by the present bifunctional compounds include any and all combinations of CD38, CS1, BCMA, CD20, CD19, CD22, CD30, CD138, CD40, CD56, CD70, and CD74, e.g., combinations of two or more of CD38, CS1, BCMA, CD20, CD19, CD22, CD30, CD138, CD40, CD56, CD70, and CD74.

Figure 1B:
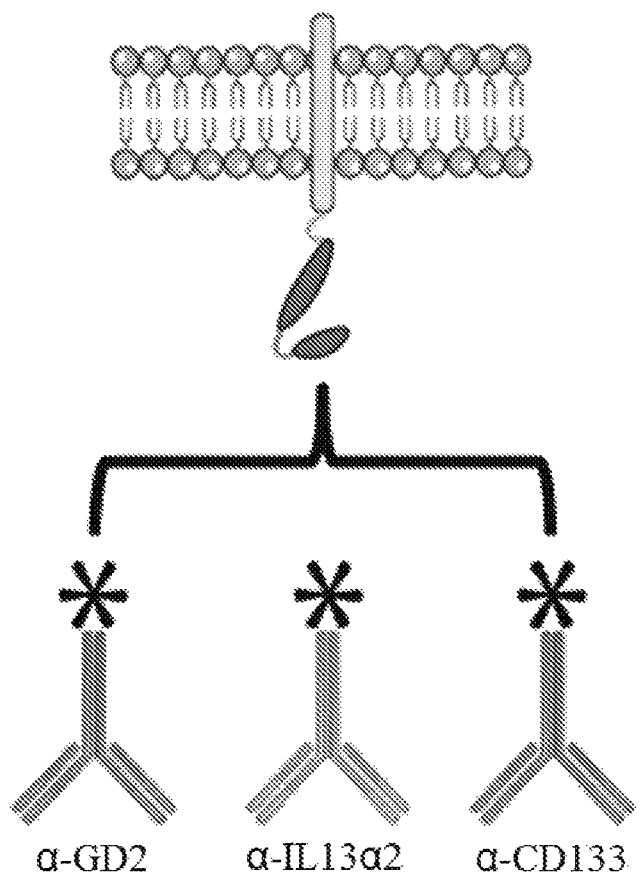
Figure 1C:
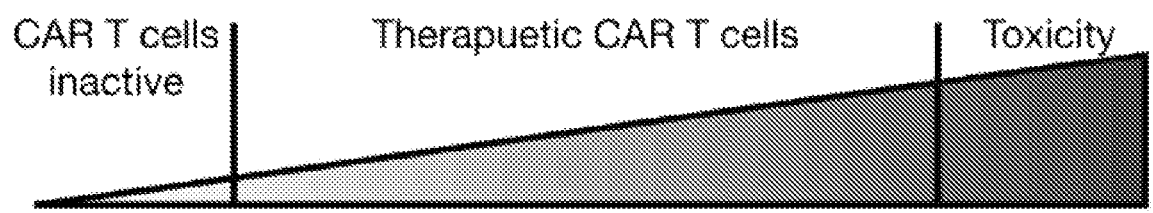
Figure 1D:
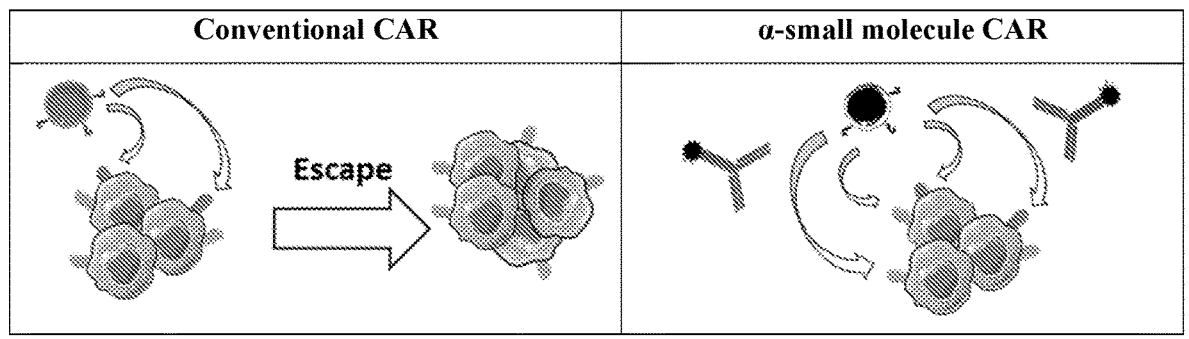
Figure 1E:
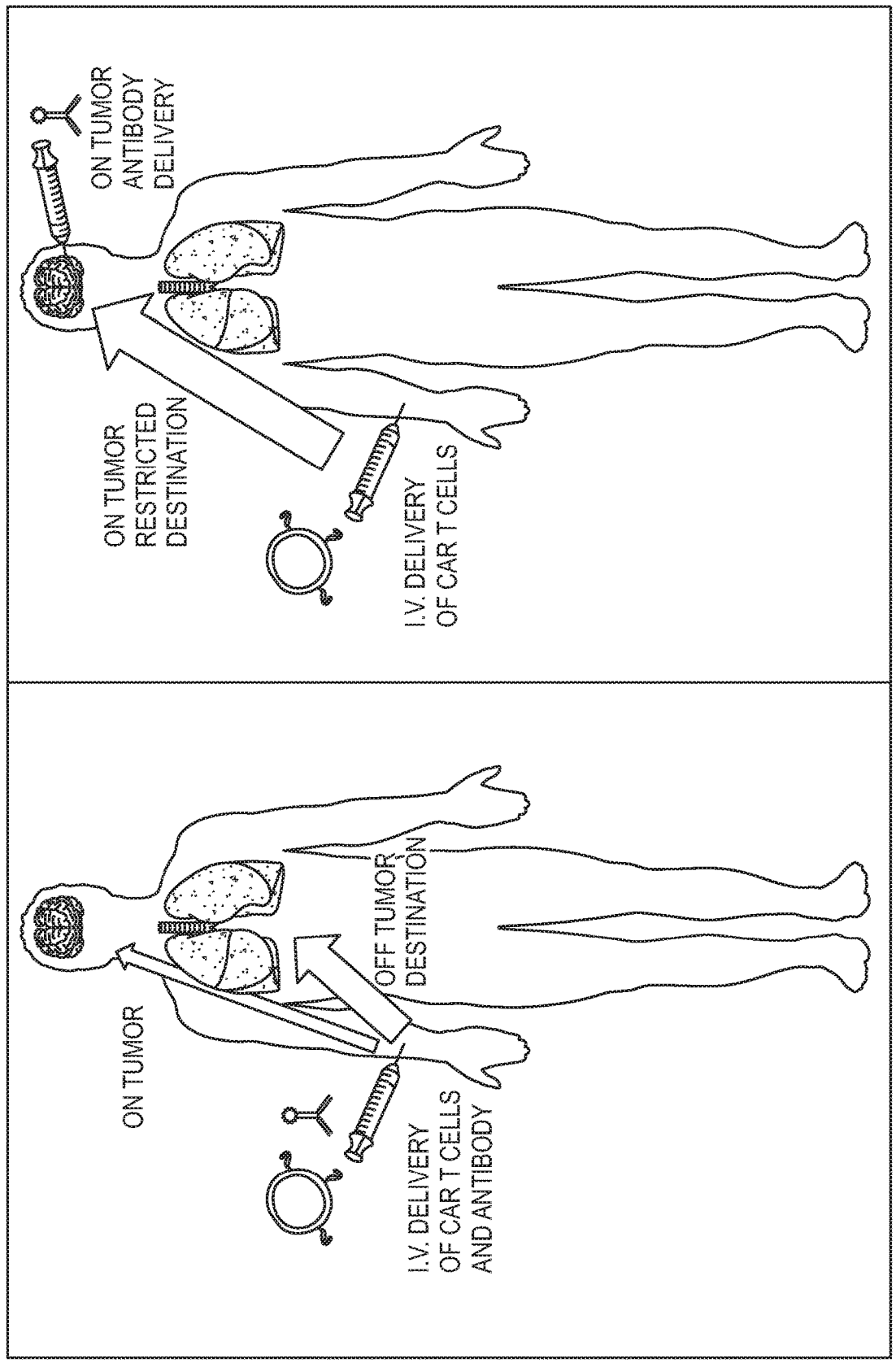

In some embodiments, the targeting ligand binds a brain tumor associated antigen. For example, tumor associated antigens present on GBM cells include ACVR1, EGFRvIII, IL13Rα2 and HER2. For example, FIG. 1B schematically illustrates a multiplexing approach to treat brain cancer that simultaneously targets EGFRvIII, IL13Rα2 and HER2. Other proteins that have been implicated in brain cancers and which may be targeted by the bifunctional compounds of the present invention include EphA2, CSPG4, GD2, PDGFRα and GRP78. Antibodies and/or functional fragments thereof that bind brain tumor associated antigens are known in the art. See, e.g., Table 1, above, which inter alia, describes antibodies and/or fragments thereof that bind ACVR1, PDGFRα, GD2 and EphA2. Targeting moieties that bind PDGFRα may include scFvs based on Olaratumab (and binding variants thereof).

In some embodiments, the targeting ligand binds to HER2 on HER2+ malignancies such as breast, lung, colorectal, brain, ovarian, and pancreatic cancer. Representative targeting ligands that bind HER and which may be useful in the present invention include Trastuzumab and Pertuzumab which bind the extracellular domains IV and II, respectively, of HER, and their HER-binding fragments (e.g., scFvs).

An antibody fragment that binds EGFRvIII, is described in O'Rourke, et al., Sci. Transl. Med. 9(399):eaaa0984 (2017). Other antibodies or fragments thereof that bind EGFRvIII are commercially available siltuximab and mAb DH8.3 (Novus Biologicals). Further representative examples of amino acid or gene sequences that encode scFvs targeting EGFRvIII that might be useful in the present invention are found in U.S. Patent Application Publication 2015/0259423.

An antibody fragment that binds IL13Rα2 is described in Brown, et al., N. Engl J Med. 375(26):2561-2569 (2016). Other antibodies or fragments thereof that bind IL13Rα2 are commercially available from Abnova and Millipore.

An antibody fragment that binds HER2 is described in Ahmed, et al., JAMA Oncol. 3(8): 1049-1101 (2017). Other antibodies or fragments thereof that bind HER2 are commercially available, including trastuzumab and FRP5. Further representative examples of amino acid or gene sequences that encode scFvs targeting HER2 that might be useful in the present invention are found in U.S. Patent Application Publication 2011/0313137.

Another example of an antibody fragment that binds EphA2 is described in Chow, et al., Mol Ther. 21(3):629-637 (2013). Yet other antibodies or fragments thereof that bind EphA2 are commercially available from Thermo Fisher (mAb4H5 and mAb 1C11A12) and RND Systems. Further representative examples of amino acid or gene sequences that encode for scFvs targeting EphA2 that might be useful in the present invention are described in U.S. Patent Application Publication 2010/436783.

An antibody fragment that binds CSPG4 is described in Pellegatta, et al., Sci Transl Med, 10:eaao2731 (2018). Another antibody that binds CSPG4 is described in Fenton et al., Oncol Res. 22(2):117-21 (2015). Other antibodies or fragments thereof that bind CSPG4 are commercially available bevacizumab and Creative Biolabs mAb 225.28. Yet other antibodies or fragments thereof that bind CSPG4 are commercially available from Aviva Systems Biology. Further representative examples of amino acid or gene sequences that encode scFvs targeting CSPG4 that might be useful in the present invention are described in U.S. Pat. No. 9,801,928 and U.S. Patent Application Publication 2019/0008940.

Another example of an antibody fragment that binds GD2 is described in Mount et al., Nat Med. 24:572-579 (2018). Other antibodies or fragments thereof that bind GD2 include Dinutuximab, mAb 3F8, mAb 14g2a, and mAb 14.18. Further representative examples of amino acid or gene sequences that encode scFvs targeting GD2 that might be useful in the present invention are described in U.S. Pat. No. 4,675,287.

Another example of an antibody fragment that binds PDGFRα is described in Brennan et al., PLoS One, 4(11): e7752 (2009). Other antibodies or fragments thereof that bind PDGFRα are commercially available from Abcam, LifeSpan Bio, Santa Cruz (sc-338) and Thermo Fisher (mAb APA5). Further representative examples of amino acid or gene sequences that encode scFvs targeting PDGFRα that might be useful in the present invention are described in U.S. Patent Application Publication 2012/0027767.

An antibody fragment that binds GRP78 is described in Kang et al., Sci Rep. 6:34922 (2016). Other antibodies or fragments thereof that bind GRP78 are commercially available from Thermo Fisher (PA1-014A) and Abcam (N-20). Further representative examples of amino acid or gene sequences that encode scFvs targeting GRP78 that might be useful in the present invention are described in U.S. Pat. No. 10,259,884.

Other proteins that have been implicated in brain cancers and which may be targeted by the bifunctional compounds of the present invention include neural cell adhesion molecule (NCAM), cluster of differentiation 276 (CD276), and neuroectodermal stem cell marker (Nestin).

An antibody that binds NCAM is described in Modak et al., Cancer Res. 61:4048-4054 (2001). Other antibodies or fragments thereof that bind NCAM are mAb UJ13A and mAb ERIC-1. Further representative examples of amino acid or gene sequences that encode scFvs targeting NCAM that might be useful in the present invention are described in U.S. Pat. No. 7,402,560.

An antibody that binds CD276 is described in Majzner et al., Clin Cancer Res. 25(8): 2560-2574 (2019). Other antibodies or fragments thereof that bindCD276 are commercially available from Creative Biolabs (mAb 8H9). Further representative examples of amino acid or gene sequences that encode scFvs targeting CD276 that might be useful in the present invention are described in U.S. Patent Application Publication 2018/0186890.

Antibodies or fragments thereof that bind Nestin are commercially available from Abcam (ab6142) and Novus Biologicals (NB100-1604). Antibodies or fragments thereof that bind 111-Tubulin are available from Abcam (2G10) and RND Systems (mAB 1195).

Another example of an antibody fragment that binds CD38 is described in Mihara et al., J Hematol Oncol. 10:1-4 (2017). Other antibodies or fragments thereof that bind CD38 include commercially available antibodies from Miltenyi (REA572 and REA671), Biolegend (HIT2 and HB-7). Further representative examples of amino acid or gene sequences that encode scFv's targeting CD38 that might be useful in the present invention are described in U.S. Pat. No. 9,249,226.

Another example of an antibody fragment that binds CS-1 is described in Chu et al., Blood, 122:14 (2013). Other antibodies or fragments thereof that bind CS-1 are commercially available and include REA150 (Miltenyi) or 162.1 (Biolegend). Further representative examples of amino acid or gene sequences that encode scFvs targeting CS-1 that might be useful in the present invention are described in International Publication Number WO 2004/100898 A2.

Another example of an antibody fragment that binds CD138 is described in Sun et al., Oncotarget 10(24): 2369-2383 (2019). Other antibodies or fragments thereof that bind CD138 are commercially available and include 44F9 (Miltenyi) or DL-101 and MI15 (Biolegend). Further representative examples of amino acid or gene sequences that encode scFvs targeting CD138 that might be useful in the present invention are described in International Publication Number WO 2009/080829 A1.

Another example of an antibody fragment that binds CD20 is described in Wang et al., Clin Immunol., 155(2): 160-75 (2014). Other antibodies or fragments thereof that bind CD20 are commercially available and include LT20 and REA780 (Miltenyi) or 2H7 and SA271G2 (Biolegend). Further representative examples of amino acid or gene sequences that encode scFvs targeting CD20 that might be useful in the present invention are described in International Publication Number WO 2004/056312 A2.

Another example of an antibody fragment that binds BCMA is described in Raje et al., N Engl J Med. 380(18): 1726-1737 (2019). Other antibodies or fragments thereof that bind BCMA are commercially available and include REA315 (Miltenyi) and 19F2 (Biolegend). Further representative examples of amino acid or gene sequences that encode scFvs targeting BCMA that might be useful in the present invention are described in International Publication Number WO 2010/104949 A2 and WO 2003/014294 A2.

Another example of an antibody fragment that binds CD19 is described in Lee et al., Lancet. 385(9967):517-528 (2015). Other antibodies or fragments thereof that bind CD19 are commercially available and include LT19, REA675 (Miltenyi) or 4G7, HIB19, SJ25C1 (Biolegend). Further representative examples of amino acid or gene sequences that encode scFvs targeting CD19 that might be useful in the present invention are described in International Publication Number WO 2005/052004 A2.

Another example of an antibody fragment that binds CD22 is described in Haso et al., Blood 121(7):1165-1174 (2013). Other antibodies or fragments thereof that bind CD22 are commercially available and include REA340 (Miltenyi) or HIB22 and S-HCL-1 (Biolegend). Further representative examples of amino acid or gene sequences that encode scFvs targeting CD22 that might be useful in the present invention are described in U.S. Pat. No. 5,484,892.

Another example of an antibody fragment that binds CD30 is described in Ramos et al., Blood 132:680 (2018). Other antibodies or fragments thereof that bind CD30 are commercially available and include REA1085 and Ki-2 (Miltenyi) or BY88 (Biolegend). Further representative examples of amino acid or gene sequences that encode scFvs targeting CD30 that might be useful in the present invention are described in U.S. Pat. No. 7,090,843.

Another example of an antibody fragment that binds CD40 is described in Hussein et al., Haematologica 95:845-848 (2010). Other antibodies or fragments thereof that bind CD40 are commercially available and include REA733 and HB14 (Miltenyi) or 5C3 or HB14 (Biolegend). Further representative examples of amino acid or gene sequences that encode scFvs targeting CD40 that might be useful in the present invention are described in International Patent Applications WO 2012/075111 A1 and WO 2016/069919 A1.

Another example of an antibody fragment that binds CD70 is described in Shaffer et al., Blood 117:4304-14 (2011). Other antibodies or fragments thereof that bind CD70 are commercially available and include REA292 (Miltenyi) or 113-16 (Biolegend). Further representative examples of amino acid or gene sequences that encode scFvs targeting CD70 that might be useful in the present invention are described in International Patent Application WO 2004/073656 A2.

Another example of an antibody fragment that binds CD74 is described in Kaufman et al., Br J Haematol. 163:478-486 (2013). Other antibodies or fragments thereof that bind CD74 are commercially available and include 5-329 and REA1103 (Miltenyi) and LN2 (Biolegend). Further representative examples of amino acid or gene sequences that encode scFvs targeting CD74 that might be useful in the present invention are described in International Patent Application WO 2003/074567 A2.

Bifunctional compounds of the present invention may be synthesized in accordance with methods known in the art. See, e.g., WO2010/008519. For example, the synthetic antigens can be derivatized to possess chemical groups that react with primary amines (e.g., the N-terminal amine or lysines of polypeptides) or with sulfhydryl groups (e.g., cysteines of polypeptides), the polypeptides making up the targeting moieties of the bifunctional compounds. The bifunctional compounds may be prepared by conjugating the targeting moiety to the synthetic antigen (or pro-antigen) using techniques such as chemical coupling and chemical cross-linkers. In some embodiments, the synthetic antigen may be conjugated to the targeting moiety via a linker. Some of the factors that may make linkers necessary include: the necessity to recreate the microenvironment used to raise an antibody to the unmasked pro-antigen (i.e. the tag) which is used to engineer a CAR-T cell, the necessity to expose the small molecule to the solvent and make it accessible to the extracellular tag-binding domain of a CAR-T cell, and particularly hydrophobic small molecules may benefit from the use of a hydrophilic/polar linker e.g. polyethylene glycol (PEG). Linkers can vary in length, but shorter linkers are preferable because tags that are proximal to the target cell can better elicit a CAR-T cell response against the target cell. Representative examples of hydrophobic/nonpolar linkers include aliphatic linkers such as glycine, aminoheptanoic acid, aminohexanoic acid, aminopentanoic acid and aminotetranoic acid. Representative examples of polar linkers include polyethylene glycol moieties with for example, 1-12 repeating units (e.g., 2, 4, 6, 8, 10, or 12 repeating units).

For example, 6-aminofluorescein can be reacted with a maleimido-PEG-N-hydroxysuccinimide ester (NHS ester) to form compound (1) as shown in Scheme 1:

Scheme 1

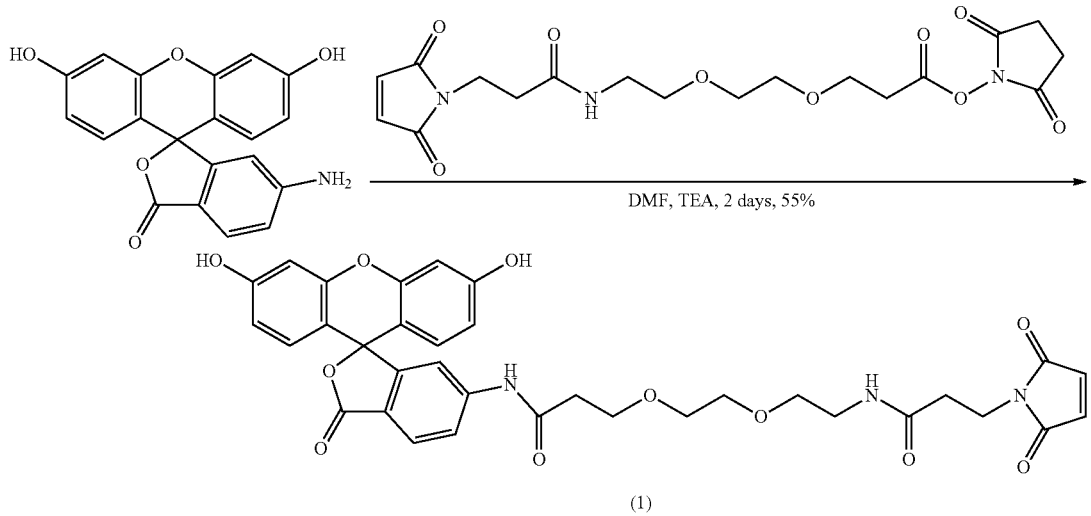

(1)

The maleimide fluorescein derivative, compound (1), in turn reacts with sulfhydryl groups of targeting moieties to form a stable conjugate via a thioether bond as shown in Scheme 2:

Scheme 2

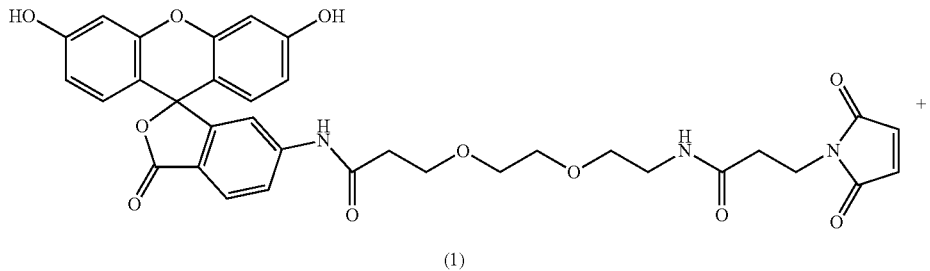

(1)

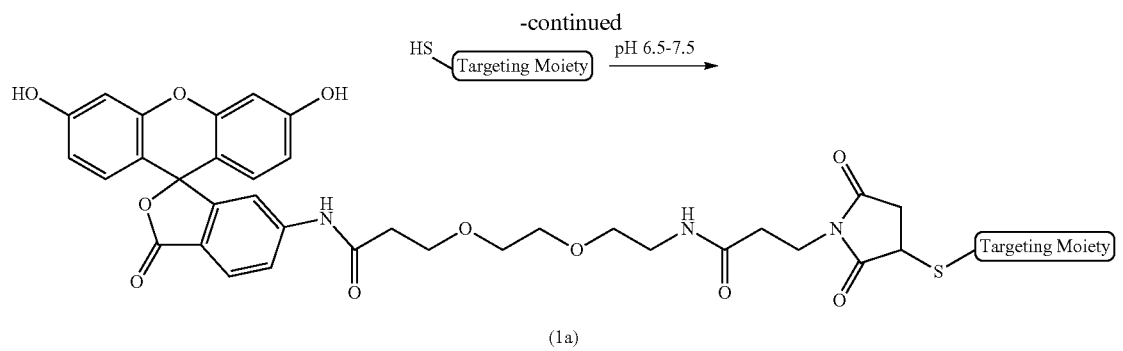
(1a)
15
Representative examples of the synthesis of the bifunctional compounds having a masked pro-antigen are shown in Schemes 3 and 4:

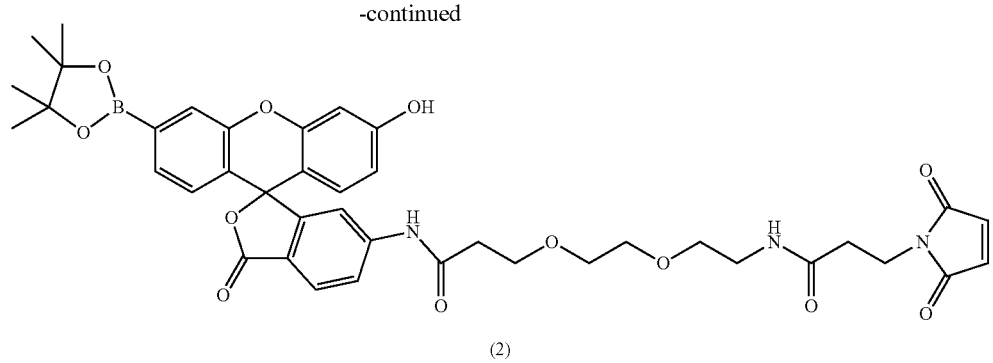
(2)
Scheme 4
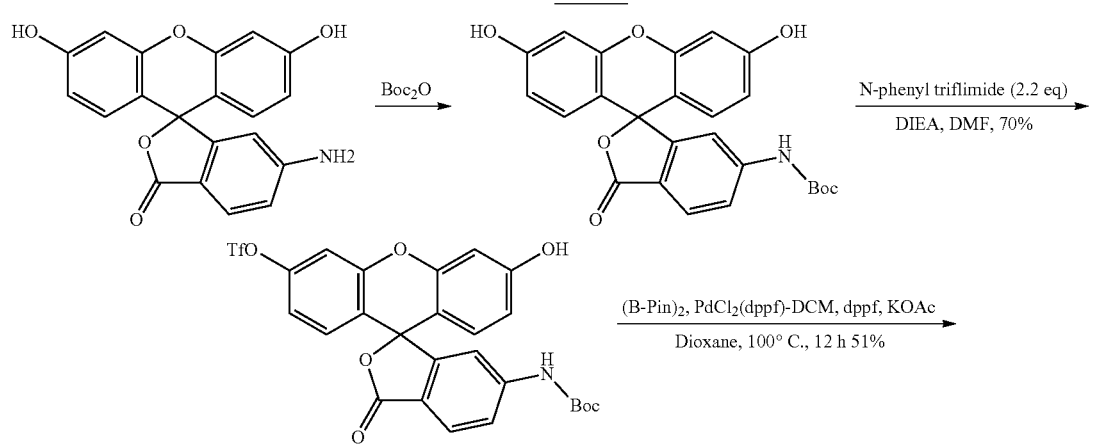
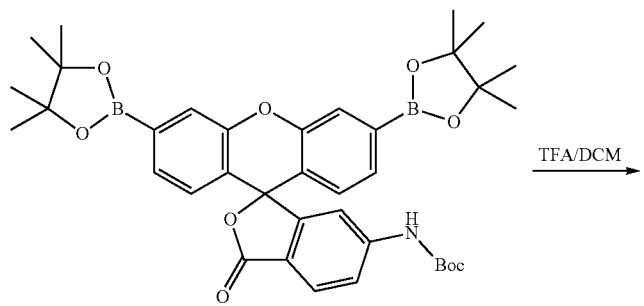
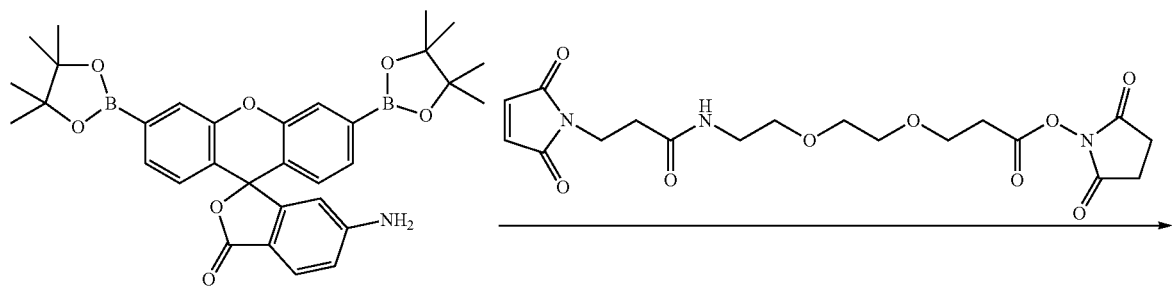

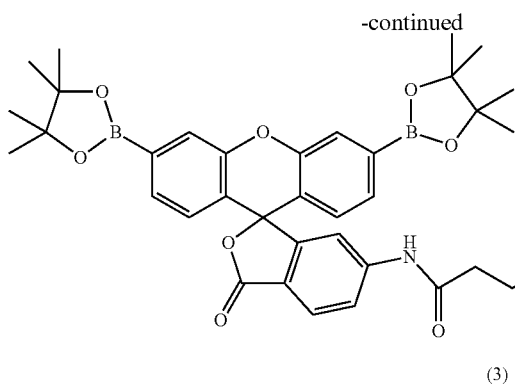

(3)

Each of compounds (2) and (3) can then be used in place of compound (1) as shown in Scheme 2 to generate the bifunctional compounds of the invention.

Another representative example of the synthesis of the bifunctional compounds having a masked pro-antigen using NHS-ester derivatives of fluorescein is shown in Scheme 5:

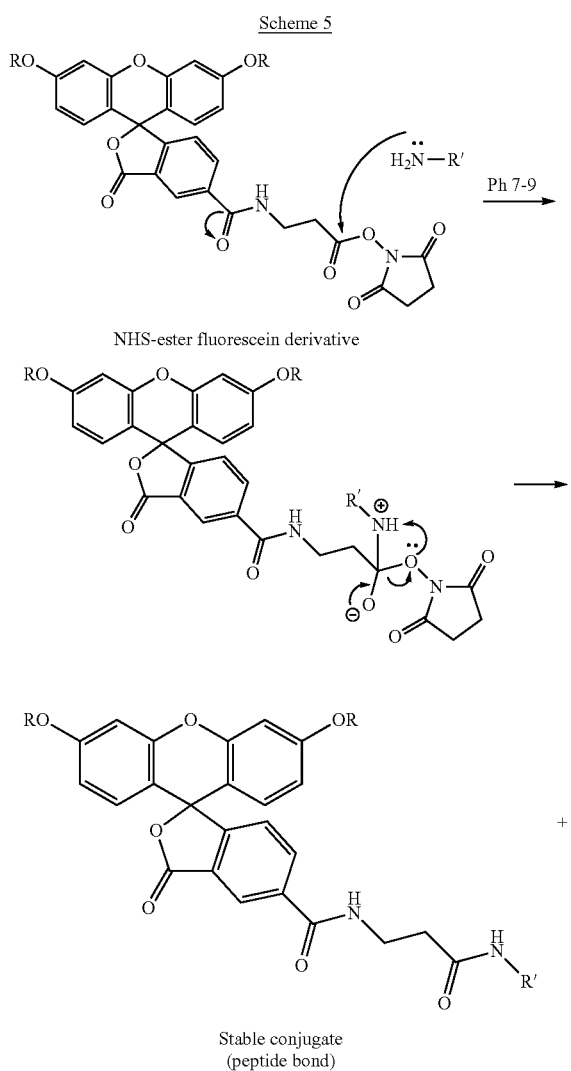

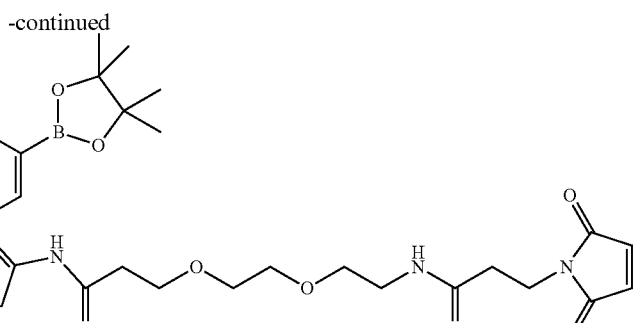

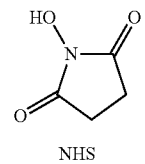

NHS wherein OR is replaced with a boronic ester and R' is a targeting moiety.

As described herein, the bifunctional compounds may be in the form of a free acid or free base, or a pharmaceutically acceptable salt. As used herein, the term "pharmaceutically acceptable" in the context of a salt refers to a salt of the compound that does not abrogate the biological activity or properties of the compound, and is relatively non-toxic, i.e., the compound in salt form may be administered to a subject without causing undesirable biological effects (such as dizziness or gastric upset) or interacting in a deleterious manner with any of the other components of the composition in which it is contained. The term "pharmaceutically acceptable salt" refers to a product obtained by reaction of the compound described herein with a suitable acid or a base. Examples of pharmaceutically acceptable salts of the compounds described herein include those derived from suitable inorganic bases such as Li, Na, K, Ca, Mg, Fe, Cu, Al, Zn and Mn salts. Examples of pharmaceutically acceptable, nontoxic acid addition salts are salts of an amino group formed with inorganic acids such as hydrochloride, hydrobromide, hydroiodide, nitrate, sulfate, bisulfate, phosphate, isonicotinate, acetate, lactate, salicylate, citrate, tartrate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, 4-methylbenzenesulfonate or p-toluenesulfonate salts and the like. Certain compounds described herein can form pharmaceutically acceptable salts with various organic bases such as lysine, arginine, guanidine, diethanolamine or metformin. Suitable base salts include aluminum, calcium, lithium, magnesium, potassium, sodium, or zinc, salts.

As disclosed in various structures herein, bifunctional compounds described herein may be in the form of a stereoisomer, which as known in the art refers to isomers of individual compounds that differ only in the orientation of their atoms in space. Thus, the term stereoisomer includes mirror image isomers (enantiomers) of compounds, mixtures of mirror image isomers (physical mixtures of the enantiomers, and racemates or racemic mixtures) of compounds, geometric (cis/trans or E/Z, R/S) isomers of compounds and isomers of compounds with more than one chiral center that are not mirror images of one another (diastereoisomers). Compounds described herein may be in the form of individual isomers and substantially free of other isomers, or the form of a mixture of various isomers, e.g., racemic mixtures of stereoisomers.

Pharmaceutical Compositions

The pharmaceutical composition comprises a therapeutically effective amount of the bifunctional compound and a pharmaceutically acceptable carrier. In some embodiments, the pharmaceutical composition may further include another (e.g, a second) bifunctional compound comprising the first synthetic antigen covalently linked to a second targeting moiety that binds a different epitope of the same (e.g, a first) tumor associated antigen, or a pharmaceutically acceptable salt or stereoisomer thereof. Thus, the composition may include two or more bifunctional compounds, all of which bind the same tumor associated antigen but wherein at least two of the bifunctional compounds bind different epitopes on the same tumor associate antigen. In other embodiments, the pharmaceutical composition may further include another (e.g, a second) bifunctional compound comprising the synthetic antigen covalently linked to a second targeting moiety that binds a different tumor associated antigen (e.g, different from the first), or a pharmaceutically acceptable salt or stereoisomer thereof. Thus, the composition may include two or more bifunctional compounds, all of which bind different tumor associated antigens and wherein at least two of the bifunctional compounds bind different epitopes on different tumor associated antigen.

A second key aspect of the present invention pertains to the use of therapeutically effective amounts of a plurality of subpopulations of bifunctional compounds, wherein each subpopulation has specificity for a different tumor associated antigen but wherein all subpopulations have the same specificity for the CAR T cells (e.g., all bifunctional compounds contain the same synthetic antigen). Thus, in some embodiments, the pharmaceutical composition contains therapeutically effective amounts of a plurality of subpopulations of bifunctional compounds, wherein in each subpopulation, the synthetic antigen (or pro-antigen) is the same but the respective targeting moieties are different in that they bind a different tumor associated antigen that is present on a tumor cell. Thus, the pharmaceutical composition may contain a first subpopulation of bifunctional compounds having a synthetic antigen (or pro-antigen) covalently linked to a first targeting moiety that specifically binds a first tumor associated antigen, and a second subpopulation of bifunctional compounds each having the synthetic antigen (or pro-antigen) covalently linked to a second targeting moiety that specifically binds a second tumor associated antigen, wherein the first and second tumor associated antigens are different.

In some embodiments, the first and second targeting moieties specifically bind a brain tumor associated antigen. In some embodiments, the brain tumor associated antigen is selected from GD2, IL13Rα2, HER2, PDGFRα, EGFRvIII, CSPG4, EphA2, CD133, GRP78, NCAM, CD276 and Nestin, wherein the first and second targeting moieties bind different epitopes on the same tumor associated antigen or different brain tumor associated antigens. In some embodiments, the plurality of subpopulations of bifunctional compounds are designed to target two or more brain tumor associated antigens selected from GD2, IL13Rα2, HER2, PDGFRα, EGFRvIII, CSPG4, EphA2, and CD133. In some embodiments, the plurality of subpopulations targets two or more of IL13Rα2, EGFRvIII and HER2, and in some other embodiments, the plurality of subpopulations targets two or more of GD2, PDGFRα and CD133. In yet further embodiments, the plurality of subpopulations of bifunctional compounds targets EphA2 and CSPG4.

In some embodiments, the first and second targeting moieties specifically bind a hematologic tumor associated antigen. In some embodiments, the hematologic tumor associated antigen is selected from CD38, CS1, BCMA, CD20, CD19, CD22, CD30, CD138, CD40, CD56, CD70, and CD74, wherein the first and second targeting moieties bind different epitopes on the same tumor associated antigen or different hematologic tumor associated antigens. In some embodiments, the plurality of subpopulations of bifunctional compounds are designed to target two or more hematologic tumor associated antigens selected from CD38, CS1, BCMA, CD20, CD19, CD22, CD30, CD138, CD40, CD56, CD70, and CD74. In some embodiments, the plurality of subpopulations targets two or more of CD38, CS1, and BCMA, and in some other embodiments, the plurality of subpopulations targets two or more of CD19, CD20, and CD22. In yet further embodiments, the plurality of subpopulations targets CD30, CD40, CD56, CD70, CD74, and CD138.

In some embodiments, the pharmaceutical compositions may vary from one administration to another. Thus, embodiments of the invention may include a first composition as described above, and a second composition which differs from the first composition in that the targeting moiety of any one or more subpopulations binds to a different epitope of the same tumor associated antigen. This additional feature may mitigate against antigen loss/escape or ameliorate toxicities.

CAR T Cells

The CAR T cell is engineered so as to bind the synthetic antigen or unmasked pro-antigen, neither of which is naturally occurring on any normal or cancer cell. Thus, by uncoupling tumor cell targeting from tumor cell killing, a CAR T cell with a single specificity (to the synthetic antigen or unmasked pro-antigen) can simultaneously target a plurality of tumor associated antigens.

Effector cells may be used in the methods of the present invention. The effector cells may be autologous, syngeneic or allogeneic, with the selection dependent on the disease to be treated and the means available to do so. Suitable populations of effector cells that may be used in the methods include any immune cells with cytolytic activity, such as T cells. Exemplary subpopulations of T cells include those expressing CD3$^+$ such as CD3$^+$CD8$^+$ T cells, CD3$^+$CD4+ T cells, and NKT cells. Although in some embodiments the T cells are HLA-A2+ peripheral blood mononuclear cells (PBMC), they can be of any HLA background from PBMCs and utilized in an autologous, syngeneic or allogeneic system. T cells may also be isolated from any source, including from a tumor explant of the subject being treated or intratumoral T cells of the subject being treated. For the sake of convenience, the effector cells are hereinafter referred to as T cells, but it should be understood that any reference herein to T cells, unless otherwise indicated, is a reference to all effector cell types as defined herein.

The genetically engineered T cells used in the present invention have binding specificity for a particular unmasked pro-antigen (also referred to herein as a tag) that is conjugated to a targeting moiety (such as an antibody or functional fragment thereof) that binds to a tumor-associated antigen. Additional features of the CAR may include an activation domain that induces efficient target lysis upon T cell binding and activation, and the ability to substitute or replace the scFv portion of the CAR with one having specificity to any one of the unmasked pro-antigens or tags of the present invention. In view of the design and specificity of the CAR T cells, they may be referred to as universal CAR-T cells or Binary Activated T cells (BAT-CARs").

The BAT-CAR polypeptides typically include three domains. The first domain is an extracellular ligand or a tag-binding domain; the second domain is transmembrane (TM) domain; and the third domain is the T cell activation domain.

Extracellular Ligand

The first domain is typically present at the amino terminal end of the BAT-CAR polypeptide, and thus external to the T cell, which permits the tag-binding domain unfettered access to the tagged protein that is bound to the target cell. The tag-binding domain is typically an antibody or an antigen-binding fragment thereof. In some embodiments, the antibodies are human or humanized antibodies, or antigen-binding fragments thereof.

The tag-binding domain is designed to specifically bind the synthetic antigen that is covalently linked to the targeting moiety that binds the target cells (e.g., the cancer cells). For example, when the synthetic antigen is fluorescein or a fluorescein derivative which is derivatized with a protecting group, the tag-binding domain specifically binds the uncaged or unmasked fluorescein or a fluorescein derivative but not the caged molecule. Examples of such binding moieties are known in the art, e.g., 4M5.3 ScFv, disclosed in Midelfort et al. J. Mol. Biol. 343:685-701 (2004) and 2D12.5, 2D12.5ds, or C8.2.5, disclosed in Orcutt et al. Nucl. Med. Biol. 38(2):223-233(2011).

The type of antibody may be polyclonal, monoclonal, chimeric or humanized. The antibodies may be obtained from any species of animal, e.g., a human, simian, mouse, rat, rabbit, guinea pig, horse, cow, sheep, goat, pig, dog or cat. Nor is there a limitation on the particular class of antibody that may be used, including $IgG_1$, $IgG_2$, $IgG_3$, $IgG_4$, IgM, $IgA_1$, $IgA_2$, IgD and IgE antibodies. Antibody fragments, which also may be used, include single-chain variable fragment (scFv), single chain antibodies, $F(ab')_2$ fragments, Fab fragments, and fragments produced by a Fab expression library, provided that the antibody fragments retain the ability to bind the selected tag.

BAT-CARs of the present invention may be produced using commercially-available extracellular ligands, at least to the extent that the synthetic antigens are known. Alternatively, antibodies and fragments thereof that specifically bind the synthetic antigen can be prepared using standard techniques, e.g., continuous cell lines in culture for monoclonal antibody production. Representative techniques include the hybridoma technique originally described by Koehler and Milstein (Nature 256:495-497 (1975)), the human B-cell hybridoma technique (Kosbor et al., Immunol Today 4:72 (1983); Cote et al., Proc Natl. Acad. Sci 80:2026-2030 (1983)), and the EBV-hybridoma technique (Cole et al., *Monoclonal Antibodies and Cancer Therapy*, Alan R. Liss Inc, New York N.Y., pp 77-96 (1985)). Techniques developed for the production of "chimeric antibodies," i.e., the splicing of mouse antibody genes to human antibody genes to obtain a molecule with appropriate antigen specificity and biological activity, can also be used (Morrison et al., Proc Natl. Acad. Sci 81:6851-6855 (1984); Neuberger et al., Nature 312:604-608(1984); Takeda et al., Nature 314:452-454 (1985)). As known in the art, a humanized antibody or antibody fragment has one or more amino acid residues, typically from a variable domain of an antibody from a nonhuman source. Humanized antibodies or antibody fragments may contain one or more CDRs from nonhuman immunoglobulin molecules, and framework regions that are derived completely or mostly from human germline. Techniques for humanizing antibodies or antibody fragments are well known, and include CDR grafting, veneering or resurfacing, and chain shuffling. See, also, Jones et al., Nature 321:522-525 (1986); Riechmann et al., Nature 332:323-327 (1988); Verhoeyen et al., Science 239: 1534-1536 (1988)).

In some embodiments, the tag-binding domain of the BAT-CAR-T is a single-chain variable fragment (scFv). A scFv includes the variable regions of the heavy (VH) and light chains (VL) of an antibody, and typically includes up to about 50, e.g., about 10 amino acid residues. The linker can either connect the N-terminus of the VH with the C-terminus of the VL, or vice versa. ScFvs can be prepared according to methods known in the art (see, e.g., Bird et al., Science 242:423-426 (1988) and Huston et al., Proc. Natl. Acad. Sci. USA 85:5879-5883 (1988)). In some embodiments, the linker sequence includes amino acids glycine and serine, and in some cases, sets of glycine and serine repeats such as $(Gly_4Ser)_n$, where n is an integer equal to or greater than 1. The length and amino acid composition of the linker may be varied e.g., to achieve optimal folding and interaction between the VH and VL to create a functional epitope. See, e.g., Hollinger et al., Proc Natl Acad. Sci. U.S.A. 90:6444-6448 (1993).

Other types of antibody fragments having specificity for unmasked pro-antigens that may be useful in the present invention include Fv, Fab, and $(Fab')_2$ fragments. See, e.g., U.S. Pat. No. 4,946,788.

The second domain is a transmembrane (TM) domain, which allows the BAT-CAR to be anchored into the cell membrane of the T cell. The BAT-CAR can be designed to include a transmembrane domain that is attached to the extracellular domain of the CAR. The transmembrane domain may be derived from the same protein or from a different protein from which the other domains of the CAR (e.g., signaling domain, costimulatory domain and hinge domain) are derived. The transmembrane domain may be derived from a natural or from a recombinant source. Where the source is natural, the domain may be derived from any membrane-bound or transmembrane protein. Representative examples of transmembrane domains that may be useful in the present invention include the transmembrane regions of the alpha, beta or zeta chain of the T-cell receptor, CD28, CD27, CD3 epsilon, CD45, CD4, CD5, CD8, CD9, CD16, CD22, CD33, CD37, CD64, CD80, CD86, CD134, CD137, CD154.

In some embodiments, the transmembrane domain is attached to the extracellular region of the CAR, e.g., the antigen binding domain of the CAR, via a hinge, such as a hinge from a human protein. Sources of hinge domains include human Ig (immunoglobulin) hinges (e.g., an IgG4 hinge, an IgD hinge), and a CD8 (e.g., CD8a hinge).

The third domain of the BAT-CAR is the T cell activation domain, also known as the intracellular signaling domain, which aids in T cell activation upon binding of the CAR to the tagged protein that is bound to the target cell. An intracellular signaling domain is generally responsible for activation of at least one of the normal effector functions of the effector cell in which the CAR has been introduced. Examples of intracellular signaling domains for use in the CAR of the invention include the cytoplasmic sequences of the T cell receptor (TCR) and co-receptors that act in concert to initiate signal transduction following antigen receptor engagement. Signals generated through the TCR alone are insufficient for full activation of T cells; thus, a secondary or costimulatory signal is also required. Thus, T cell activation is mediated by two distinct classes of cytoplasmic signaling sequences, namely those that initiate antigen-dependent primary activation through the TCR (i.e., the primary intracellular signaling domains) and those that act in an antigen-independent manner to provide a secondary or costimulatory signal (i.e., the secondary cytoplasmic or costimulatory domain). The primary signaling domain regulates primary activation of the TCR complex either in a stimulatory way, or in an inhibitory way. Primary intracellular signaling domains that act in a stimulatory manner may contain signaling motifs known as immunoreceptor tyrosine-based activation motifs (ITAMs). Representative examples of ITAM-containing primary intracellular signaling domains that may be suitable for use in the present invention include those of CD3ζ, common FcRγ (FCER1G), Fc-γ RIIa, FcR-β (Fc-ε R1b), CD3γ, CD3δ, and CD3ε. In some embodiments, the BAT-CARs include an intracellular signaling domain that contains the primary signaling domain of CD3ζ.

The intracellular signaling domain of the BAT-CAR may also include at least one other intracellular signaling or co-stimulatory domain. A costimulatory molecule is a cell surface molecule other than an antigen receptor or its ligands that is required for an efficient response of lymphocytes to an antigen. Representative examples of co-stimulatory domains that may be useful in the BAT-CARs of the present invention include CD27, CD28, 4-1BB (CD137), OX40, CD30, CD40, PD-1, ICOS, HVEM (LIGHTR), lymphocyte function-associated antigen-1 (LFA-1), CD2, CD7, LIGHT, NKG2C, and B7-H3. CD27 co-stimulation, for example, has been demonstrated to enhance expansion, effector function, and survival of human CART cells in vitro and augments human T cell persistence and antitumor activity in vivo (Song, et al., Blood 119(3):696-706 (2012)).

The intracellular signaling domain may be designed to include one or more, e.g., 1, 2, 3, 4, 5, or more costimulatory signaling domains, which may be linked to each other in a specified or random order, optionally via a linker molecule. Polypeptide linkers that are about 1-10 amino acids in length may join consecutive intracellular signaling sequences. Examples of such linkers include doublets such as Gly-Ser, and single amino acids, e.g., Ala and Gly. Combinations that may constitute the T-cell activation domain may be based on the cytoplasmic regions of CD28, CD137 (4-1BB), OX40 and HVEM, which serve to enhance T cell survival and proliferation; and CD3 CD3ζ and FcRε. which induce T cell activation. For example, CD3ζ, which contains 3 ITAMs, is the most commonly used intracellular domain component of CARs, transmits an activation signal to the T cell after antigen is bound. However, to provide additional co-stimulatory signaling, CD28 and OX40 domains can be used with CD3ζ which enable the BAT-CAR T cells to transmit the proliferative/survival signals.

A representative example of a polynucleotide that encodes an anti-FL CAR-CD28-4-1BB-CD3ζ has the sequence designated as SEQ ID NO:1:

```
                                              (SEQ ID NO: 1)
ATGGCTCTGCCTGTGACAGCTCTGCTGCTGCCTCTGGCTCTGCTTCTGCA

TGCCGCCAGACCTGACGTGGTCATGACACAGACACCTCTGAGCCTGCCTG

TGTCTCTGGGAGATCAGGCCAGCATCAGCTGCAGATCTAGCCAGAGCCTG
```

-continued
```
GTGCACAGCAACGGCAACACCTACCTGCGGTGGTATCTGCAGAAGCCCGG

CCAGTCTCCTAAGGTGCTGATCTACAAGGTGTCCAACAGAGTGTCCGGCG

TGCCCGATAGATTTTCTGGCAGCGGCTCTGGCACCGACTTCACCCTGAAG

ATCAATAGAGTGGAAGCCGAGGACCTGGGCGTGTACTTCTGTAGCCAGTC

TACCCACGTGCCATGGACCTTTGGCGGCGGAACAAAGCTGGAAATCAAGA

GCAGCGCCGACGACGCCAAGAAGGACGCCGCTAAGAAGGATGACGCCAAA

AAAGACGATGCCAAAAAGGATGGCGGCGTGAAGCTGGACGAAACAGGCGG

AGGACTTGTTCAGCCTGGCGGAGCCATGAAGCTGAGCTGTGTGACCAGCG

GCTTCACCTTCGGCCACTACTGGATGAACTGGGTCCGACAGAGCCCTGAG

AAAGGCCTGGAATGGGTCGCCCAGTTCAGAAACAAGCCCTACAACTACGA

AACCTACTACAGCGACAGCGTGAAGGGCAGATTCACCATCAGCCGGGACG

ACAGCAAGTCCAGCGTGTACCTGCAGATGAACAACCTGCGCGTGGAAGAT

ACCGGCATCTACTACTGTACCGGCGCCAGCTACGGCATGGAATATCTCGG

CCAGGGCACCAGCGTGACCGTGTCTACAACAACCCCTGCTCCTCGGCCTC

CTACACCAGCTCCTACAATTGCCAGCCAGCCACTGTCTCTGAGGCCCGAA

GCTTGTAGACCTGCTGCAGGCGGAGCCGTGCATACAAGAGGACTGGATTT

CGCCTGCGACTTCTGGGTGCTCGTGGTTGTTGGCGGAGTGCTGGCTTGTT

ACTCCCTGCTGGTTACCGTGGCCTTCATCATCTTTTGGGTCCGAAGCAAG

CGGAGCCGGCTGCTGCACAGCGACTACATGAACATGACCCCTAGACGGCC

CGGACCTACCAGAAAGCACTACCAGCCTTACGCTCCTCCTAGAGACTTCG

CCGCCTACAGATCCAAGCGGGGCAGAAAGAAGCTGCTGTACATCTTCAAG

CAGCCCTTCATGCGGCCCGTGCAGACCACACAAGAGGAAGATGGCTGCTC

CTGCAGATTCCCCGAGGAAGAAGAAGGCGGCTGCGAGCTGAGAGTGAAGT

TCAGCAGATCCGCCGACGCTCCTGCCTATCAGCAGGGACAGAACCAGCTG

TACAACGAGCTGAACCTGGGGAGAAGAGAAGAGTACGACGTGCTGGACAA

GCGGAGAGGCAGAGATCCTGAGATGGGCGGAAAGCCCCAGCGGAGAAAGA

ATCCTCAAGAGGGCCTGTATAATGAGCTGCAGAAAGACAAGATGGCCGAG

GCCTACAGCGAGATCGGAATGAAGGGCGAGCGCAGAAGAGGCAAGGGACA

CGATGGACTGTACCAGGGCCTGAGCACCGCCACCAAGGATACCTATGATG

CCCTGCACATGCAGGCCCTGCCACCTAGATGATGA
```

T cells may be engineered to express BAT-CARs in accordance with known techniques. Generally, a polynucleotide vector is constructed that encodes the BAT-CAR and the vector is transfected into a population of T cells. The cells are then grown under conditions promoting expression of the polynucleotide encoding the BAT-CAR by the T cells. Successful transfection (or transduction which refers to viral-mediated gene integration) and display of BAT-CARs by T cells may be conducted via standard techniques.

In some embodiments, T cells may be engineered to produce BAT-CARs by first constructing a retroviral vector encoding a selected BAT-CAR. Retroviral transduction may be performed using known techniques (e.g., Johnson, et al. Blood 114:535-546 (2009)). The surface expression of BAT-CAR on transduced T cells may be determined, for example, by flow cytometry.

Populations of BAT-CAR T cells may be formulated for administration to a subject using known techniques. Formulations including populations of BAT-CAR-expressing T cells may include one or more pharmaceutically acceptable excipients. Excipients included in the formulations may have different purposes depending, for example, on the nature of the tag-binding domain, the subpopulation of T cells used, and the mode of administration. Representative examples of excipients include saline, buffered saline, dextrose, water-for-infection, glycerol, ethanol, and combinations thereof, stabilizing agents, solubilizing agents and surfactants, buffers and preservatives, tonicity agents, bulking agents, and lubricating agents. The formulations including populations of BAT-CAR T cells are typically prepared and cultured in the absence of any non-human components such as animal serum (e.g., bovine serum albumin).

Systems and Kits

A further aspect of the present invention is directed to a system comprising the plurality of subpopulations of bifunctional compounds and the CAR T cells, which may be autologous, allogeneic or syngeneic.

Any of the compositions described herein may be comprised in a kit. A kit may include:
a) therapeutically effective amounts of a plurality of subpopulations of bifunctional compounds, wherein each bifunctional compound in a first subpopulation comprises a first synthetic antigen covalently linked to a first targeting moiety that specifically binds a first tumor associated antigen, and wherein each bifunctional compound in a second subpopulation comprises the first synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens, and wherein each subpopulation of bifunctional compounds administered to the patient contains the first synthetic antigen but specifically binds a different solid tumor associated antigen; wherein the plurality of subpopulations of bifunctional compounds is disposed in the same or separate containers; and
b) printed instructions for co-administering to a cancer patient the therapeutically effective amounts of a plurality of subpopulations of bifunctional compounds a therapeutically effective number of CAR-T cells, wherein the CAR-T cells comprise an extracellular ligand that specifically binds the synthetic antigen.

In some embodiments, the kit may further include one or more cells for use in cell therapy and/or the reagents to generate one or more cells for use in cell therapy that harbors recombinant expression vectors may be comprised in a kit or system. In yet other embodiments, a kit further includes a therapeutically effective number of allogeneic CAR-T cells. In any of the above-described embodiments, a kit optionally includes a reagent that cleaves a protecting group that is contained in a pro-antigen (e.g., an ROS/RNS-generating agent). The kit components are provided in one or more suitable container means.

Some components of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit, the kit also will generally contain a second, third or other additional container into which the additional components may be separately placed. However, various combinations of components may be comprised in a vial. The kits of the present invention also will typically include a means for containing the components in close confinement for commercial sale. Such containers may include injection or blow molded plastic containers into which the desired vials are retained.

When the components of the kit are provided in one and/or more liquid solutions, the liquid solution is an aqueous solution, with a sterile aqueous solution being particularly useful. In some cases, the container means may itself be a syringe, pipette, and/or other such like apparatus, from which the formulation may be applied to an infected area of the body, injected into an animal, and/or even applied to and/or mixed with the other components of the kit.

However, the components of the kit may be provided as dried powder(s). When reagents and/or components are provided as a dry powder, the powder can be reconstituted by the addition of a suitable solvent. It is envisioned that the solvent may also be provided in another container means. The kits may also comprise a second container means for containing a sterile, pharmaceutically acceptable buffer and/or other diluent.

In particular embodiments, there are one or more apparati in the kit suitable for extracting one or more samples from an individual. The apparatus may include a syringe, scalpel, and so forth.

In some embodiments, the kit may further include, by way of a separate container, a second anti-cancer agent that may be formulated therein with a pharmaceutically acceptable carrier.

Methods

Methods of the present invention are directed to method of treating cancer. The method comprises comprising co-administering to a subject in need thereof, a) a plurality of subpopulations of bifunctional molecules wherein the plurality comprises a1) a therapeutically effective amount of a first subpopulation of bifunctional compounds comprising a synthetic antigen covalently linked to a first targeting moiety that specifically binds a first tumor associated antigen; and a2) a therapeutically effective amount of a second subpopulation of bifunctional compounds comprising the synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens; and b) a therapeutically effective number of CAR-T cells, wherein the CAR-T cells comprise an extracellular ligand that specifically binds the synthetic antigen. As used herein, the term "co-administering" as it pertains to the plurality of subpopulations of the bifunctional compounds includes administration during the same treatment regimen. They may be administered simultaneously or sequentially (e.g., after the patient is no longer responsive to the combination of the CAR T cells and the first subpopulation of bifunctional compounds.

As used herein, the terms "treat", "treating", and "treatment" have their ordinary and customary meanings, and include one or more of blocking, ameliorating, or decreasing in severity and/or frequency a symptom of cancer in a subject. In some embodiments, the subject receiving treatment is a human. In other embodiments, the subject is a non-human animal, e.g., a non-human primate, bird, horse, cow, goat, sheep, a companion animal, such as a dog, cat or rodent, or other mammal.

Cancers that may be amenable to treatment with the treatment modalities of the present invention are characterized by presence of solid or hematologic tumors. Broadly, they include both adult and pediatric alike adenomas, carcinomas, sarcomas, and hematologic malignancies like multiple myelomas, leukemias, and lymphomas. The cancers may be vascularized, or not yet substantially vascularized, or non-vascularized tumors.

Cancers to be treated include primary tumors and secondary or metastatic tumors e.g., metastasized from lung, breast, brain or prostate, as well as recurrent or refractory tumors. Recurrent tumors encompass tumors that appear to be inhibited by treatment with such agents, but which recur up to five years, or even up to ten years, or longer, after treatment is discontinued. Refractory tumors are tumors that were unresponsive or resistant to treatment with one or more conventional, approved or experimental therapies for the particular tumor type.

The therapeutic methods of the present invention may be "first-line", i.e., an initial treatment in patients who not yet undergone any anti-cancer treatment, either alone or in combination with other treatments. The therapeutic methods of the present invention may also be advantageously used as a "second-line" therapy in the sense that they are administered to patients who have undergone at least one prior anti-cancer treatment regimen, e.g., chemotherapy, radioimmunotherapy, toxin therapy, prodrug-activating enzyme therapy, antibody therapy, surgical therapy, immunotherapy, radiation therapy, targeted therapy or any combination thereof either alone or in combination with other treatments. In some cases, the prior therapy may have been unsuccessful or partially successful but where the patient became intolerant to the particular treatment, and particularly in cases where the front line therapy is no longer effective on account of antigen loss/escape. Methods of the present invention may also be used as an adjuvant treatment, e.g., to inhibit reoccurrence of cancer in patients with no currently detectable disease or after surgical removal of tumor.

Representative examples of cancers characterized by solid tumors which may be treated in accordance with the present invention include breast (including HER2+ and metastatic), colorectal (e.g., colon), esophageal, bile duct, lung (including small cell and non-small cell lung tumors, adenocarcinoma of the lung and squamous carcinoma of the lung), liver, epidermoid tumors, squamous tumors such as head and neck tumors, epithelial squamous cell cancer, thyroid, cervical, ovarian, neuroendocrine tumors, pheochromacytomas, cancer of the peritoneum, hepatoblastoma, hepatocellular carcinoma, bladder cancer, hepatoma, endometrial or uterine carcinoma, salivary gland carcinoma, kidney or renal cancer, bone cancer, soft tissue sarcoma (including embryonal and alveolar rhabdomyosarcoma, rectal, pancreatic, prostate, gastrointestinal (gastric and stomach), alveolar soft part sarcoma and clear cell sarcoma), cholangiocarcinoma, gallbladder carcinoma, myeloma, vulval cancer, penile carcinoma, retinal, androgen-dependent tumors, androgen-independent tumors, Kaposi's sarcoma, synovial sarcoma, vasoactive intestinal peptide secreting tumor, central nervous system (CNS) neoplasms, melanoma, Wilm's cancer, Ewing's cancer, osteosarcoma, PNT, rhabdoid, retinoblastoma, adrenal cancer, adrenal tumors, leiomyosarcoma, and rhabdomyosarcoma, including, embryonal rhabdomyosarcoma, alveolar rhabdomyosarcoma, botryoid rhabdomyosarcoma, pleomorphic rhabdomyosarcoma, multiple myeloma (MM), acute lymphoblastic leukemias (ALL), acute myeloid leukemias (AML), acute lymphoblastic leukemia (ALL), chronic lymphocytic leukemia (CLL), chronic myeloid leukemia (CML), Non-Hodgkin lymphoma (NHL), Hodgkin lymphoma, and Large granular lymphocytic (LGL) leukemia.

Representative examples of high ROS/RNS-generating cancers that may be particularly amenable to treatment with bifunctional compounds that contain a pro-antigen bearing one or more boronic ester protecting groups that are reactive to ROS/RNS (e.g., boronic esters) include pancreatic cancer, prostate cancer, Kaposi's sarcoma, liver cancer, breast cancer, cholangiocarcinoma, gastric cancer, lung adenocarcinoma, pancreatic ductal adenocarcinoma, mammary carcinoma, carcinoma of the lung, thyroid carcinoma and sarcoma, melanoma, carcinoma of the kidney, stomach, colon, liver, pancreas and bladder, neuroblastoma, carcinoma of the prostate, ovarian carcinoma, human papilloma virus (HPV)-positive cervix carcinoma, osteogenic sarcoma, Ewing sarcoma, rhabdomyosarcoma, fibrosarcoma, chondrosarcoma, and neuroendocrine tumors (Bauer, et al., Anticancer Res. 34:1467-1482 (2014)).

In some embodiments, the modalities of the present invention are used to treat brain cancer. Representative examples of brain cancers include DIPG, capillary hemangioblastomas, meningiomas, and cerebral metastases, gliomas, glioblastomas multiforme (GBM) and neuroblastomas, medulloblastomas and ependymomas.

In some embodiments, the modalities of the present invention are used to treat hematological cancers. Representative examples of hematological cancers include multiple myeloma (MM), acute lymphoblastic leukemias (ALL), acute myeloid leukemias (AML), acute lymphoblastic leukemia (ALL), chronic lymphocytic leukemia (CLL), chronic myeloid leukemia (CML), Non-Hodgkin lymphoma (NHL), Hodgkin lymphoma, and Large granular lymphocytic (LGL) leukemia.

Representative examples of gliomas that may be treatable with the modalities of the present invention include recurrent high-grade gliomas, including glioblastoma, anaplastic astrocytoma and anaplastic oligodendroglioma, and high-grade pediatric gliomas such as DIPG.

Representative examples of glioblastomas that may be treatable with the modalities of the present invention include grade II (low-grade astrocytoma), grade III (anaplastic astrocytoma), and grade IV (glioblastoma) glioblastomas and glioblastoma multiforme (GBM).

Treatment of brain cancer with modalities of the present invention may, in some embodiments, entail simultaneous targeting of two or more brain tumor associated antigens selected from GD2, IL13Rα2, HER2, PDGFRα, EGFRvIII, CSPG4, EphA2, and CD133. In some embodiments, treatment of brain cancer may entail simultaneous targeting of IL13Rα2, EGFRvIII and HER2. In some other embodiments, treatment of brain cancer may entail simultaneous targeting of GD2, PDGFRα and CD133. In some other embodiments, treatment of brain cancer may entail simultaneous targeting of EphA2 and CSPG4. In some embodiments, multiple targeting is done in a sequential manner.

Treatment of hematological cancer with modalities of the present invention may, in some embodiments, entail simultaneous targeting of two or more hematologic tumor associated antigens selected from CD38, CS1, BCMA, CD20, CD19, CD22, CD30, CD138, CD40, CD56, CD70, and CD74. In some embodiments, treatment of hematological cancer may entail simultaneous targeting of CD38, CS1 and BCMA. In some other embodiments, treatment of hematological cancer may entail simultaneous targeting of CD19, CD20, and CD22. In some other embodiments, treatment of hematological cancer may entail simultaneous targeting of CD30, CD40, CD56, CD70, CD74, and CD138. In some embodiments, multiple targeting is done in a sequential manner.

The formulation contains the BAT-CAR T cells in a number that is effective for the treatment of the specific cancer. Thus, therapeutically effective populations of BAT-CAR T cells are administered to subjects. The number of BAT-CAR T cells administered to a subject will vary between wide limits, depending upon the location, type, and severity of the cancer, the age and condition of the individual to be treated, etc. A physician will ultimately determine appropriate dosages to be used. In general, formulations are administered that contain from about $1 \times 10^4$ to about $1 \times 10^{10}$ BAT-CAR T cells. In some embodiments, the formulation contains from about $1 \times 10^5$ to about $1 \times 10^9$ BAT-CAR T cells, from about $5 \times 10^5$ to about $5 \times 10^8$ BAT-CAR T cells, or from about $1 \times 10^6$ to about $1 \times 10^7$ BAT-CAR T cells.

The formulation of BAT-CAR T cells may be administered to a subject in need thereof in accordance with acceptable medical practice. An exemplary mode of administration is intravenous injection. Other modes include intratumoral, intradermal, subcutaneous (s.c., s.q., sub-Q, Hypo), intramuscular (i.m.), intraperitoneal (i.p.), intra-arterial, intramedullary, intracardiac, intra-articular (joint), intrasynovial (joint fluid area), intracranial (including convection-enhanced delivery), intraspinal, and intrathecal (spinal fluids). Any known device useful for parenteral injection or infusion of the formulations can be used to affect such modes of administration. Such formulations may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives.

The bifunctional compounds and the BAT-CAR T cells are co-administered to the subject, which for purposes of the present invention includes administration during the same treatment regimen. The compounds may be administered to a subject prior to, or concurrent (e.g., simultaneous) with, or after administration of the BAT-CAR T cells, such that the compounds will bind the target cells and the BAT-CAR cells will bind the unmasked pro-antigen or tag. In some embodiments, the bifunctional compounds will be protected with a mask and the BAT-CAR cells will only bind to the compound once the antigen is unmasked.

Formulations containing the bifunctional compounds may be administered to a subject in an amount which is effective for treating the specific cancer. The compounds may be formulated for administration to a subject using techniques known to the skilled artisan. Formulations of the compounds may include a pharmaceutically acceptable carrier, which may be selected based on factors such as the nature of the targeting moiety, the pro-antigen, and the mode of administration. Representative examples of generally used carriers include saline, buffered saline, dextrose, water-for-infection, glycerol, ethanol, and combinations thereof, stabilizing agents, solubilizing agents and surfactants, buffers and preservatives, tonicity agents, bulking agents, and lubricating agents.

In general, the therapeutically effective amount of the bifunctional compound administered to a subject will vary between wide limits, depending upon the location, source, identity, extent and severity of the cancer, the age and condition of the individual to be treated, etc. A physician will ultimately determine appropriate dosages to be used. Typically, formulations may contain from about 0.1 mg/kg to about 100 mg/kg body weight of the compound, and in some embodiments from about 1 mg/kg to about 10 mg/kg body weight of the compound, taking into account the routes of administration, symptoms, etc. Generally, the dosage of a compound of the present application administered to a subject to treat a disease or disorder such as cancer is in the range of 0.01 to 500 mg/kg, e.g., in the range of 0.1 mg/kg to 100 mg/kg, of the subject's body weight. For example, the dosage of compound administered to a subject may be in the range of 0.1 mg/kg to 50 mg/kg, or 1 mg/kg to 50 mg/kg, of the subject's body weight, more preferably in the range of 0.1 mg/kg to 25 mg/kg, or 1 mg/kg to 25 mg/kg, of the patient's body weight. In another example, the dosage of a compound of the invention administered to a subject to prevent, treat, and/or manage cancer in a patient is 500 mg/kg or less, preferably 250 mg/kg or less, 100 mg/kg or less, 95 mg/kg or less, 90 mg/kg or less, 85 mg/kg or less, 80 mg/kg or less, 75 mg/kg or less, 70 mg/kg or less, 65 mg/kg or less, 60 mg/kg or less, 55 mg/kg or less, 50 mg/kg or less, 45 mg/kg or less, 40 mg/kg or less, 35 mg/kg or less, 30 mg/kg or less, 25 mg/kg or less, 20 mg/kg or less, 15 mg/kg or less, 10 mg/kg or less, 5 mg/kg or less, 2.5 mg/kg or less, 2 mg/kg or less, 1.5 mg/kg or less, or 1 mg/kg or less of a subject's body weight.

The bifunctional compounds may be administered to a subject in need thereof in accordance with acceptable medical practice. An exemplary mode of administration is intravenous injection. Other modes include intratumoral, intradermal, subcutaneous (s.c., s.q., sub-Q, Hypo), intramuscular (i.m.), intraperitoneal (i.p.), intra-arterial, intramedullary, intracardiac, intra-articular (joint), intrasynovial (joint fluid area), intracranial, intraspinal, and intrathecal (spinal fluids). Any known device useful for parenteral injection or infusion of the formulations can be used to effect administration of the bifunctional compound.

In embodiments wherein in the bifunctional compound contains a pro-antigen that contains a protecting group that is removable by ROS/RNS, activation of the pro-antigen may, in some embodiments of cancer treatment, may be achieved simply due to the elevated levels of ROS/RNS in the tumor microenvironment. However, not all tumors naturally produce elevated quantities of ROS/RNS. Thus, in some embodiments of the present invention, the methods further entail localized administration of one or more agents, at or proximate to the tumor site, so as to elevate the ROS/RNS levels in order to activate or unmask the pro-antigen. In some embodiments, quantities of ROS/RNS in the microenvironment of a tumor may be advantageously increased by radiation. The radiation may be administered in the form of an external beam, or via brachytherapy or administration of radionuclides. Representative examples of radionuclides that can increase levels of ROS/RNS when delivered to a tumor microenvironment include gallium-68, lutetium-177, carbon-11, indium-111 and yttrium-90. In other embodiments, levels of ROS/RNS may be increased by administration of lanthanide nanoparticles. Use of such nanoparticles may be advantageous in that they reduce the amount of radiation that is required to generate increased ROS/RNS levels. In some embodiments, lanthanide nanoparticles may be preferentially taken up by certain brain cells, e.g., microglial cells, resulting in increased ROS/RNS in these cells, thus making them a preferential target for the BAT-CAR-T cells.

As an alternative or in conjunction with radiation, the present methods may entail administration of an ROS/RNS-generating agent. Such agents are known in the art. See, e.g., U.S. Patent Application Publication Nos. 2014/0228290; and 2006/0235080.

In some embodiments, the ROS/RNS generating agents are inhibitors of CD44. This protein, along with splice variants thereof, is often found overexpressed on tumor and tumor-initiating cells. Representative examples of tumors expressing or overexpressing CD44 or CD44 variants include cholangiocarcinoma, gastric cancer, glioblastoma, lung adenocarcinoma, stem and stem-like cancer cells, breast cancer, pancreatic ductal adenocarcinoma and neuroendocrine tumors. CD44 functions as a cysteine/glutamine antiporter, and pumps glutamine out of the cell and pumps in cysteine, which results in intracellular production of glutathione, which aids the tumor cell in dealing with elevated ROS/RNS. In contrast to tumor cells, normal cells do not require extra glutathione due to the fact that the endogenous levels of antioxidants in normal cells are able to handle normal levels of ROS/RNS.

Administration frequencies of formulations containing populations of BAT-CAR-T cells and formulations of the compounds, and optionally the ROS/RNS generating agents will vary depending on factors that may include the disease being treated, the structure of the BAT-CAR-T cells and the compounds, and the modes of administration. Each formulation may be independently administered 4, 3, 2 or once daily, every other day, every third day, every fourth day, every fifth day, every sixth day, once weekly, every eight days, every nine days, every ten days, bi-weekly, monthly and bi-monthly. The duration of treatment will also vary, and be based for example, on the disease being treated and will be best determined by the attending physician. However, continuation of treatment is contemplated to last for a number of days, weeks, or even months.

The methods of the present application may entail independent or co-administration of the compounds, the BAT-CAR-T cells and optionally the ROS/RNS-generating agent to the subject in a single, one-time dose, or in multiple doses (e.g., 2, 3, 4, 5, 6, 7, 8, 10, 15, 20, or more doses). Thus, the frequency of co-administration may range from once up to about once every eight weeks. In another example, the frequency of administration ranges from about once a week up to about once every six weeks. In some embodiments, the frequency of administration ranges from about once every three weeks up to about once every four weeks. In other embodiments, the BAT-CAR-T cells may be administered in a single, one-time dose, while the frequency of administration of the bifunctional compounds and optionally the ROS/RNS-generating agents may range from a single dose to once every day to once every week up to about once every 4-6 weeks. Thus, in other embodiments, BAT-CAR-T cells are administered more than once, i.e., in multiple doses (e.g., 2, 3, 4, 5, 6, 7, 8, 10, 15, 20, or more doses).

In some embodiments, the methods entail simultaneous administration of a plurality of pharmaceutical compositions each comprising a therapeutically effective amount of a bifunctional compound and a pharmaceutically acceptable carrier, wherein in each composition the targeting moiety binds to a different tumor associated antigen. In some other embodiments, the simultaneous administration entails use of a single pharmaceutical composition that contains a plurality (two or more) of subpopulations of bifunctional compounds, wherein in each subpopulation, the synthetic antigen may be the same but the respective targeting moieties bind a different tumor associated antigen that is present on a tumor cell. Thus, the pharmaceutical composition may contain a first subpopulation of bifunctional compounds having a first targeting moiety that specifically binds a first tumor associated antigen, and a second subpopulation of bifunctional compounds each having a second targeting moiety that specifically binds a second tumor associated antigen, wherein the first and second targeting moieties bind different tumor associated antigens. In other embodiments, the plurality of subpopulations of bifunctional compounds contain a third, fourth, fifth etc. subpopulations of bifunctional compounds, each of which binds a different tumor associated antigen that is present on a tumor cell.

Some embodiments entail sequential administration of either type of composition, wherein in at least one such sequential administration, at least one of the compositions or subpopulations of bifunctional compounds is modified so as to substitute a targeting moiety that binds a different epitope on the same tumor associated antigen relative to that of a prior administration. Thus, embodiments of the invention may include a first administration of the "single" composition and at least a second administration which differs from the first in that the targeting moiety of any one or more subpopulations binds to a different epitope of the same tumor associated antigen. This additional feature may mitigate against antigen loss/escape or ameliorate toxicities.

Combination Therapy

In certain embodiments, the inventive methods of treating cancer may be part of a combination therapy wherein the subject is also treated with another anti-cancer agent. An "anti-cancer" agent is capable of negatively affecting cancer in a subject, for example, by killing cancer cells, inducing apoptosis in cancer cells, reducing the growth rate of cancer cells, reducing the incidence or number of metastases, reducing tumor size, inhibiting tumor growth, reducing the blood supply to a tumor or cancer cells, promoting an immune response against cancer cells or a tumor, preventing or inhibiting the progression of cancer, or increasing the lifespan of a subject with cancer. More generally, these other compositions would be provided in a combined amount effective to kill or inhibit proliferation of the cell. This process may involve contacting the cancer cells with the expression construct and the agent(s) or multiple factor(s) at the same time. This may be achieved by contacting the cell with a single composition or pharmacological formulation that includes both agents, or by contacting the cell with two distinct compositions or formulations, at the same time, wherein one composition includes the expression construct and the other includes the second agent(s).

Tumor cell resistance to chemotherapy and radiotherapy agents represents a major problem in clinical oncology. One goal of current cancer research is to find ways to improve the efficacy of chemo- and radiotherapy by combining it with other therapies. In the context of the present invention, it is contemplated that cell therapy could be used similarly in conjunction with chemotherapeutic, radiotherapeutic, or immunotherapeutic intervention, as well as pro-apoptotic or cell cycle regulating agents.

Alternatively, the present inventive therapy may precede or follow the other agent treatment by intervals ranging from minutes to weeks. In embodiments where the other agent and present invention are applied separately to the individual, one would generally ensure that a significant period of time did not expire between the times of each delivery, such that the agent and inventive therapy would still be able to exert an advantageously combined effect on the cell. In such instances, it is contemplated that one may contact the cell with both modalities within about 12-24 h of each other and, more preferably, within about 6-12 h of each other. In some situations, it may be desirable to extend the time period for treatment significantly, however, where several d (2, 3, 4, 5, 6 or 7) to several wk (1, 2, 3, 4, 5, 6, 7 or 8) lapse between the respective administrations.

It is expected that the treatment cycles would be repeated as necessary. It also is contemplated that various standard therapies, as well as surgical intervention, may be applied in combination with the inventive cell therapy.

Chemotherapy

Cancer therapies also include a variety of combination therapies with both chemical and radiation based treatments. Combination chemotherapies include, for example, abraxane, altretamine, docetaxel, herceptin, methotrexate, novantrone, zoladex, cisplatin (CDDP), carboplatin, procarbazine, mechlorethamine, cyclophosphamide, camptothecin, ifosfamide, melphalan, chlorambucil, busulfan, nitrosurea, dactinomycin, daunorubicin, doxorubicin, bleomycin, plicomycin, mitomycin, etoposide (VP16), tamoxifen, raloxifene, estrogen receptor binding agents, taxol, gemcitabien, navelbine, farnesyl-protein tansferase inhibitors, transplatinum, 5-fluorouracil, vincristin, vinblastin and methotrexate, or any analog or derivative variant of the foregoing and also combinations thereof.

In specific embodiments, chemotherapy for the individual is employed in conjunction with the invention, for example before, during and/or after administration of the invention Radiotherapy Other factors that cause DNA damage and have been used extensively include what are commonly known as gamma-rays, X-rays, and/or the directed delivery of radioisotopes to tumor cells. Other forms of DNA damaging factors are also contemplated such as microwaves and UV-irradiation. It is most likely that all of these factors effect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

Immunotherapy

Immunotherapeutics generally rely on the use of immune effector cells and molecules to target and destroy cancer cells. The immune effector may be, for example, an antibody specific for some marker on the surface of a tumor cell. The antibody alone may serve as an effector of therapy or it may recruit other cells to actually effect cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a tumor cell target. Various effector cells include cytotoxic T cells and NK cells.

Immunotherapy other than the inventive therapy described herein may be used as part of a combined therapy, in conjunction with the present cell therapy. Common tumor markers that may be targeted such as by monoclonal antibodies include PD-1, PD-L1, CTLA4, carcinoembryonic antigen, prostate specific antigen, urinary tumor associated antigen, fetal antigen, tyrosinase (p97), gp68, TAG-72, HMFG, Sialyl Lewis Antigen, MucA, MucB, PLAP, estrogen receptor, laminin receptor, erb B and p155.

Genes

In yet another embodiment, the secondary treatment is a gene therapy in which a therapeutic polynucleotide is administered before, after, or at the same time as the present invention clinical embodiments. A variety of expression products are encompassed within the invention, including inducers of cellular proliferation, inhibitors of cellular proliferation, or regulators of programmed cell death.

Surgery

Approximately 60% of persons with cancer will undergo surgery of some type, which includes preventative, diagnostic or staging, curative and palliative surgery. Curative surgery is a cancer treatment that may be used in conjunction with other therapies, such as the treatment of the present invention, chemotherapy, radiotherapy, hormonal therapy, gene therapy, immunotherapy and/or alternative therapies.

Curative surgery includes resection in which all or part of cancerous tissue is physically removed, excised, and/or destroyed. Tumor resection refers to physical removal of at least part of a tumor. In addition to tumor resection, treatment by surgery includes laser surgery, cryosurgery, electrosurgery, and miscopically controlled surgery (Mohs surgery). It is further contemplated that the present invention may be used in conjunction with removal of superficial cancers, precancers, or incidental amounts of normal tissue.

Upon excision of part of all of cancerous cells, tissue, or tumor, a cavity may be formed in the body. Treatment may be accomplished by perfusion, direct injection or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

Other Agents

It is contemplated that other agents may be used in combination with the present invention to improve the therapeutic efficacy of treatment. These additional agents include immunomodulatory agents, agents that affect the upregulation of cell surface receptors and GAP junctions, cytostatic and differentiation agents, inhibitors of cell adhesion, or agents that increase the sensitivity of the hyperproliferative cells to apoptotic inducers. Immunomodulatory agents include tumor necrosis factor; interferon alpha, beta, and gamma; IL-2 and other cytokines; F42K and other cytokine analogs; or MIP-1, MIP-1beta, MCP-1, RANTES, and other chemokines. It is further contemplated that the upregulation of cell surface receptors or their ligands such as Fas/Fas ligand, DR4 or DR5/TRAIL would potentiate the apoptotic inducing abilities of the present invention by establishment of an autocrine or paracrine effect on hyperproliferative cells. Increases intercellular signaling by elevating the number of GAP junctions would increase the anti-hyperproliferative effects on the neighboring hyperproliferative cell population. In other embodiments, cytostatic or differentiation agents can be used in combination with the present invention to improve the anti-hyperproliferative efficacy of the treatments. Inhibitors of cell adhesion are contemplated to improve the efficacy of the present invention. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with the present invention to improve the treatment efficacy.

In some embodiments, wherein the present invention is used to treat brain cancer, e.g., DIPG or GBM, one or more additional active agents may be included as part of the overall therapy. For example, in the case of DIPG, the therapy may also include radiation therapy. In the case of GBM, the therapy may also include chemotherapy with temozolomide. Representative examples of additional agents known for use in treatment of brain cancer, and which may be used in concert with the present invention, include carmustine, BiCNU, procarbazine, Matulane, lapatinib ditoysylate, terameprocol, indoximod, melphalan, carboplatin, etoposide phosphate, mibefradil dihydrochloride, OKN-007, AQ4N, and nelfinavir mesylate.

These and other aspects of the present invention will be further appreciated upon consideration of the following examples, which are intended to illustrate certain particular embodiments of the invention but are not intended to limit its scope, as defined by the claims.

EXAMPLES

Example 1: Titratable Activation of CAR T Cells Using Different Small Molecules Healthy donor peripheral blood mononuclear cells (PBMCs) were harvested and transduced as described elsewhere (Newrzela et al., Methods Mol Biol. (2009)) with a retroviral vector expressing third generation CARs against either the fluorescein molecule (4M5.3 scFv-CD8a hinge-CD28 transmembrane-CD28 intracellular domain-41BB intracellular domain-CD3z intracellular domain) or against the 4-[(6-methylpyrazin-2-yl) oxy] benzoic acid molecule ($\alpha$MPOB scFv-CD8a hinge-CD28 transmembrane-CD28 intracellular domain-41BB intracellular domain-CD3z intracellular domain). Positively transduced cells, which co-expressed the reporter gene, were purified with FACS (BD FACSAria™ II, BD Biosciences, New Jersey (USA)) and co-incubated for four hours at 37° C., 5% C02 and protected from light with CTV-labelled BT145 GBM tumor cells or EL4 lymphoma cells (CellTrace™ Violet, ThermoFisher Scientific). These tumor cells were coated with anti-GD2 or anti-mouse H-2$K^b$ antibody labelled with either fluorescein (FITC) or MPOB. The assay started when CAR Ts (effector cells, E) and tumor cells (target cells, T) were incubated at E:T ratios between 0.5:1 to 20:1, in duplicates or triplicates. After co-incubation, all the cells were stained with eBioscience™ Fixable Viability Dye eFluor™ 780 (Invitrogen™, Massachusetts (USA) and fixed with a 1:1 dilution of Fixation Buffer (BioLegend®, California (USA)) in sterile PBS/5% FBS. The percentage of dead target cells was counted according to the following formula: killing efficiency=[(% dead cells)$_{sample}$–(% dead cells)$_{control}$]/[100–(% dead cells)$_{control}$]×100. For control, cells stained with the appropriate targeting antibody but without CAR T cells were used.

Figure 2A:
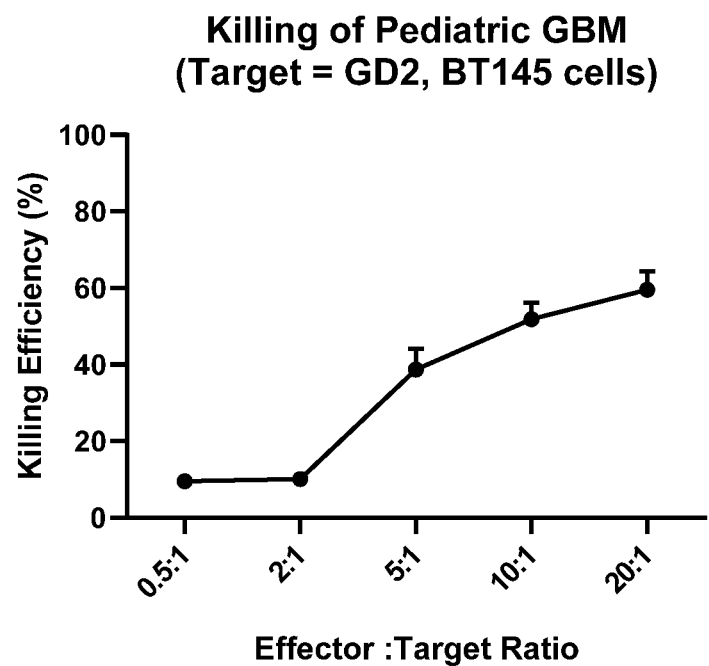
FIG. 2A-FIG. 2H is a series of line and bar graphs showing the flexibility of CART Cells using small molecule.
Figure 2B:
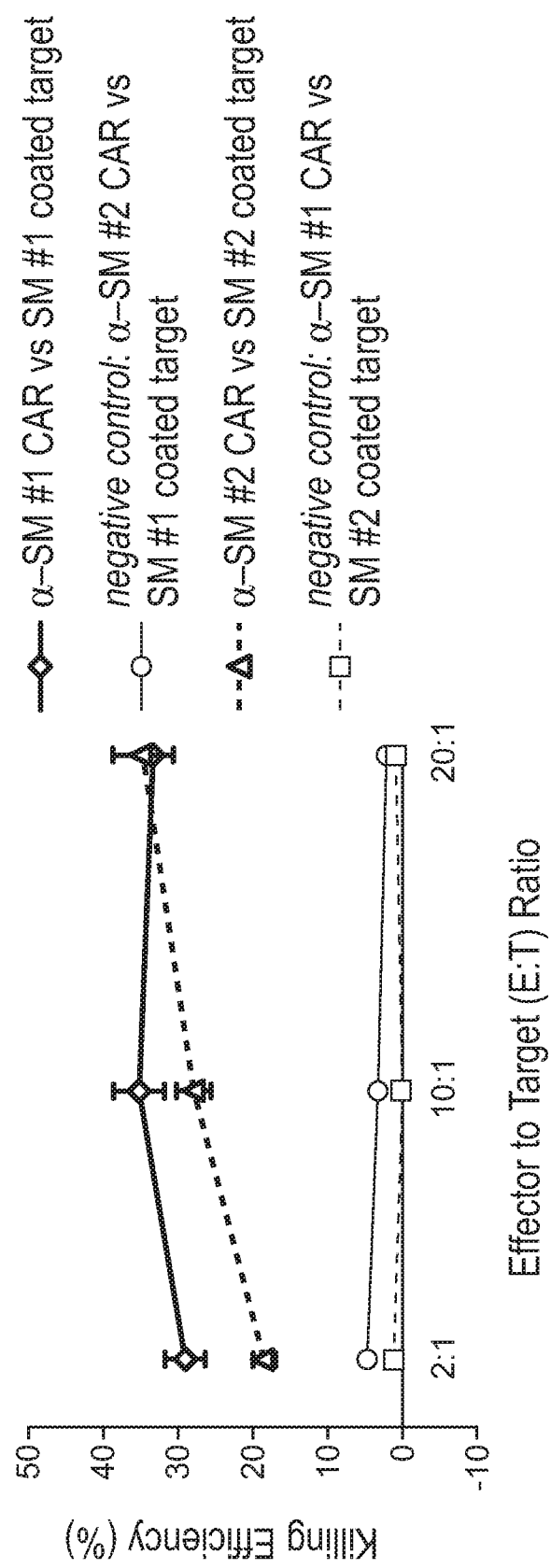

The results clearly showed that human T cells can be engineered with different CAR constructs to kill their tumor target with equivalent efficiency and specificity. These results, also, demonstrated that CAR T cells can be designed with specificities against different small molecules (FIG. 2A-FIG. 2B).

Figure 2C:
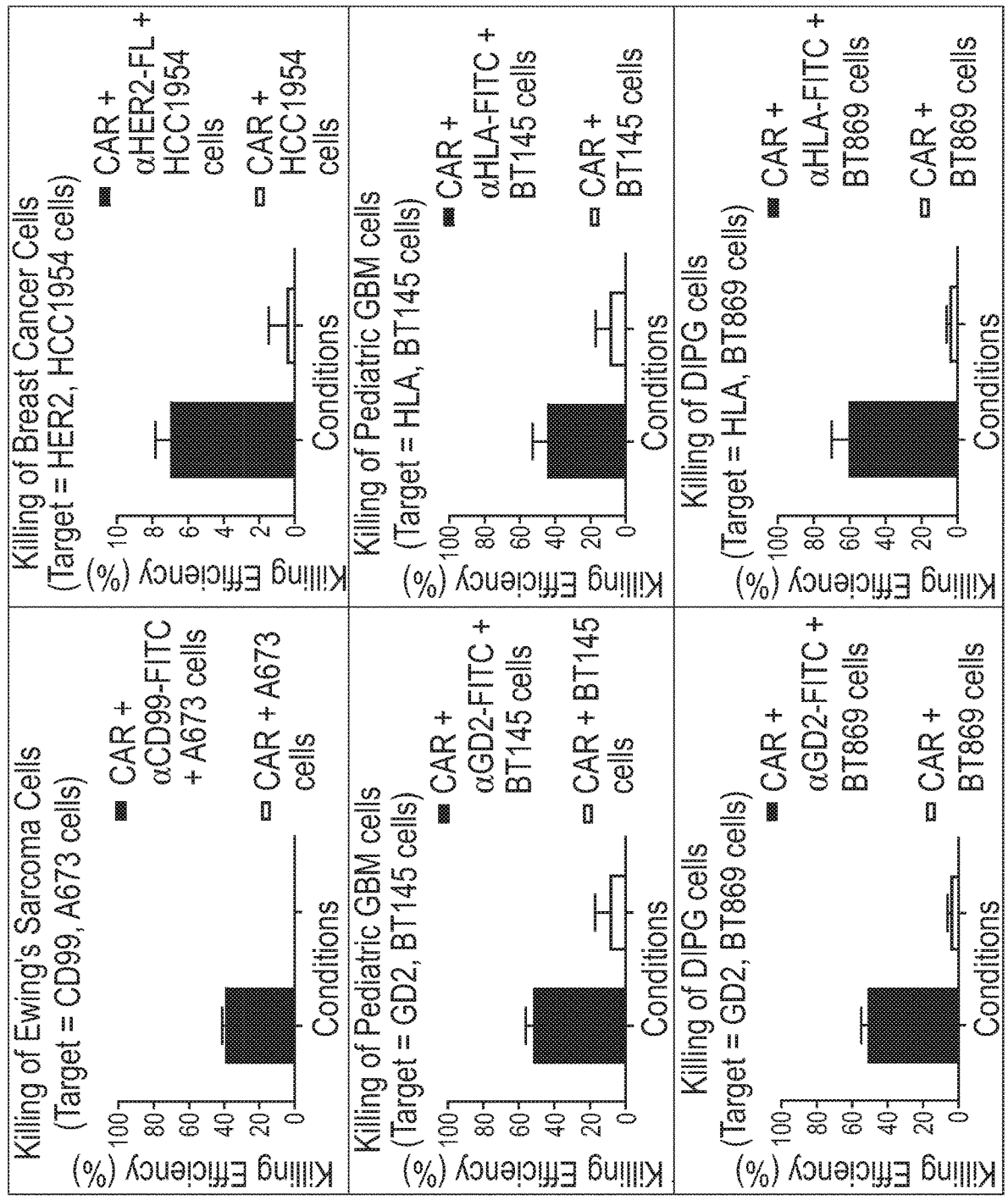
Figure 2D:
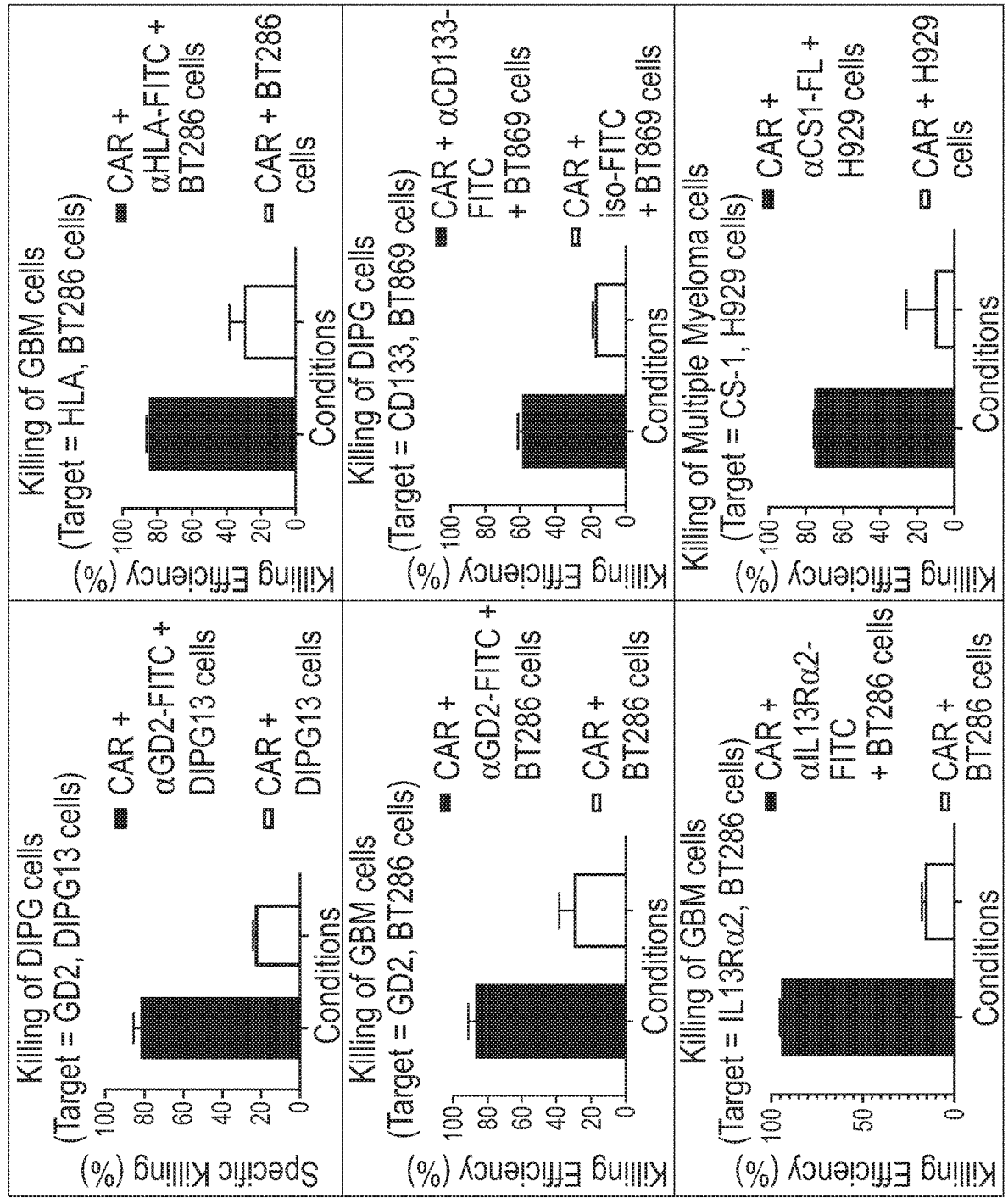
Figure 2E:
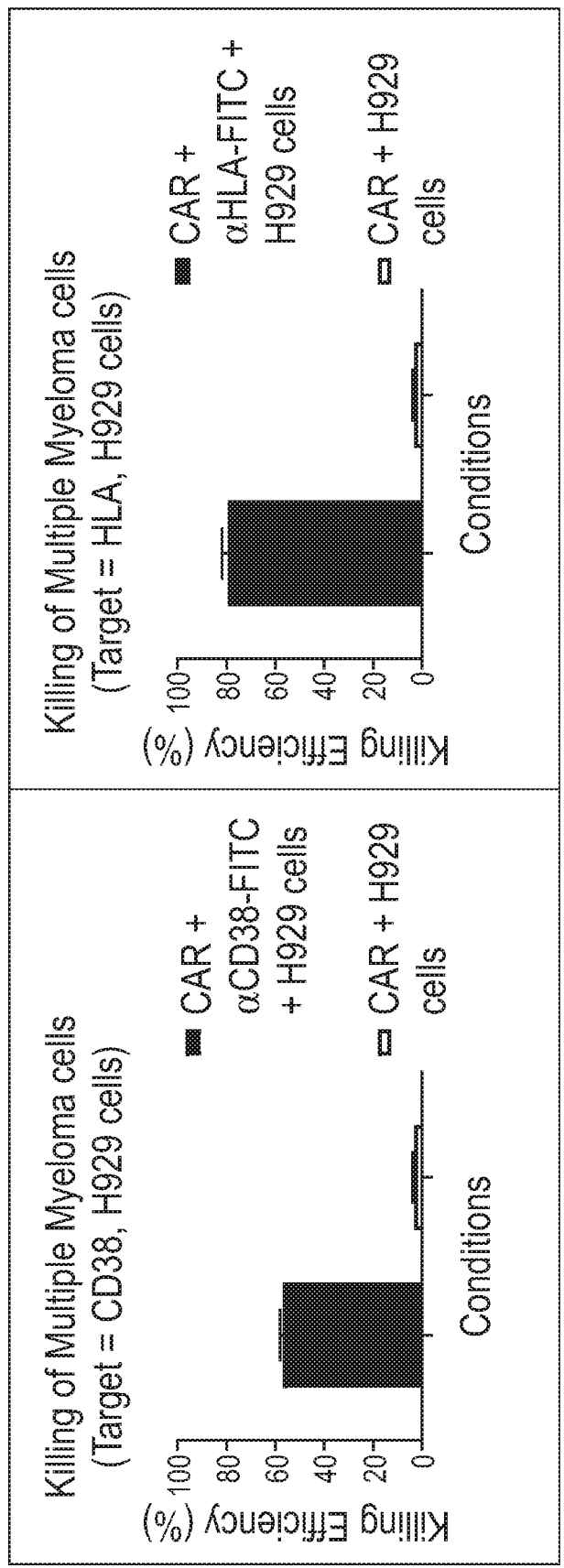

Example 2: Identification and Validation of Targets for Specific CAR T Cells CAR T cells were assayed for their killing properties as described in the Example 1. In this case, CARs were co-incubated with cells derived from different tumor types: A673 (Ewing's Sarcoma Cells), HCC1954 (Breast Cancer Cells), BT145 and BT286 (GBM cells), BT869 and DIPG13 (DIPG cells) and H929 (MM cells). The surface antigens targeted were HLA, CD99, HER2, GD2, CD133, IL13R$\alpha$2, CS-1 and CD38. The data demonstrated that human T cells engineered with a third-generation anti-fluorescein CAR T cells (see example 1) efficiently killed fluorescein-coated tumor targets independently of the type of cancer and of the surface antigen targeted (FIG. 2C-FIG. 2E).

Example 3: Titratable Activation of CAR T Cells Using Small Molecules

Figure 2F:
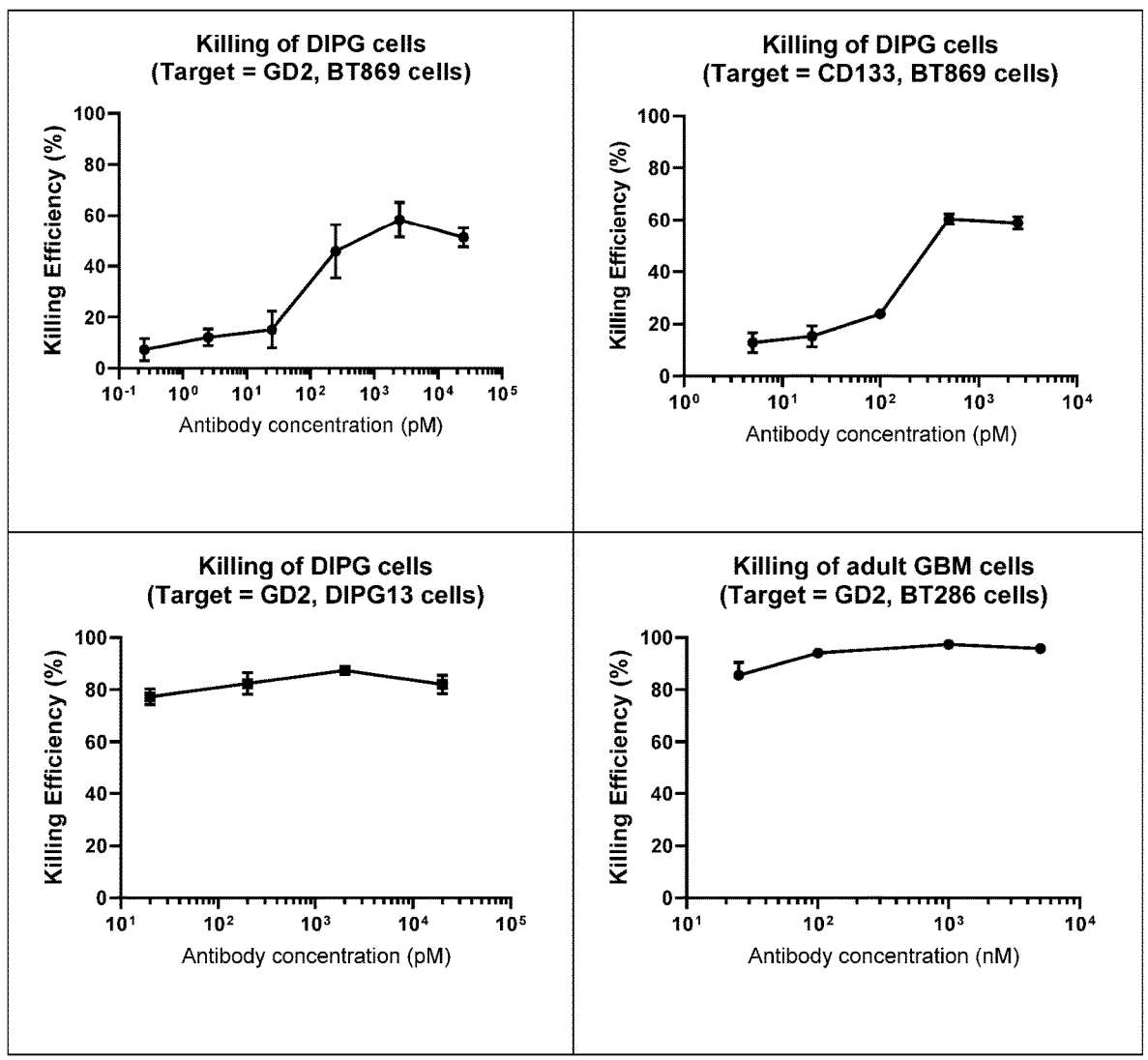
Figure 2G:
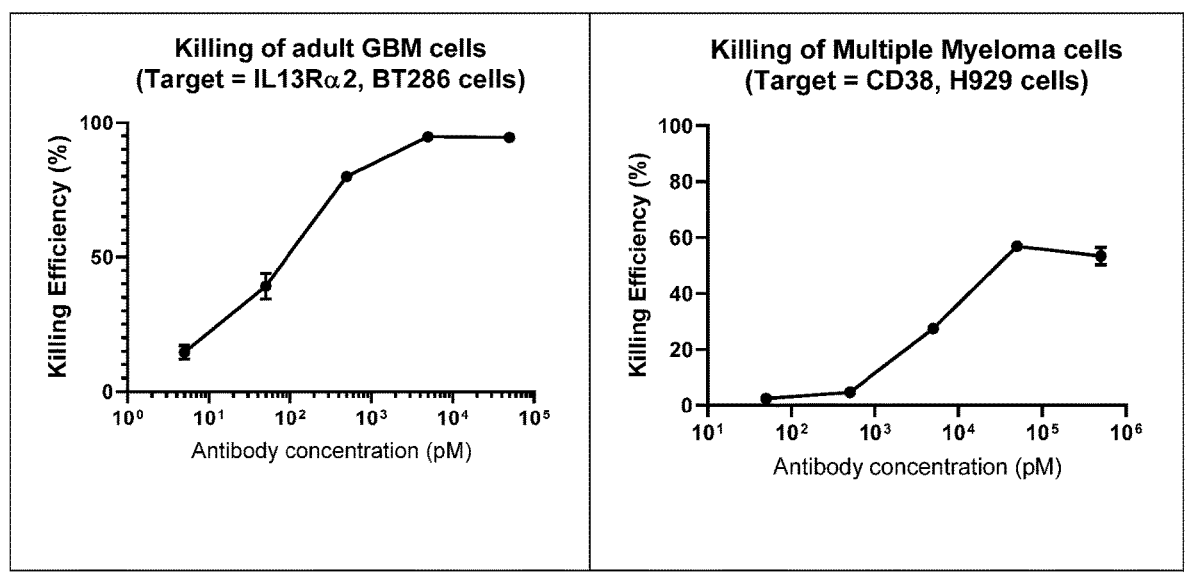

CART cells were prepared for a co-incubation killing assay as described in the Example 1. DIPG, GBM or MM cells were co-incubated with anti-fluorescein third generation CAR T and increasing concentrations of fluorescein-labelled antibodies against GD2, CD133, IL13R$\alpha$2 and CD38. The results demonstrated the sensitivity and flexibility of the present invention as a function of the amount of antigen coated. The CAR T cells showed plateau killing efficiencies over 2-4 orders of magnitude and a titratable response over four orders of magnitude. This indicated that the present invention can operate at variable antibody concentrations and its activity can be modulated to optimize a therapeutic response to control efficacy versus toxicity (FIG. 2F-FIG. 2G).

Figure 2H:
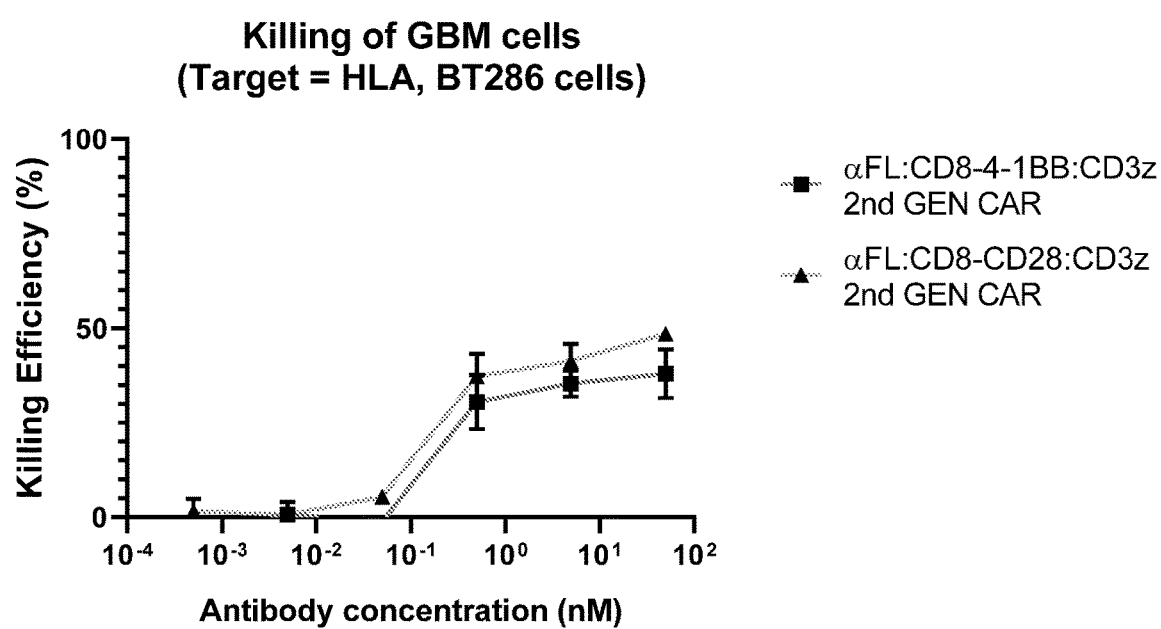

Example 4: Titratable Activation of Different Generations of CAR T Cells Using Small Molecules CART cells were prepared for a co-incubation killing assay as described in the Example 1. GBM cells coated with increasing concentrations of an anti-human HLA antibody conjugated to FITC were coincubated with two different second generation CAR T cells (4M5.3 scFv-CD8a hinge-CD28 transmembrane-CD28 intracellular domain-CD3z intracellular domain and 4M5.3 scFv-CD8a hinge-CD28 transmembrane-41BB intracellular domain-CD3z intracellular domain). The results demonstrated that it is possible to dose CAR T cell response independently of the CAR generation (FIG. 2H).

Figure 2I:
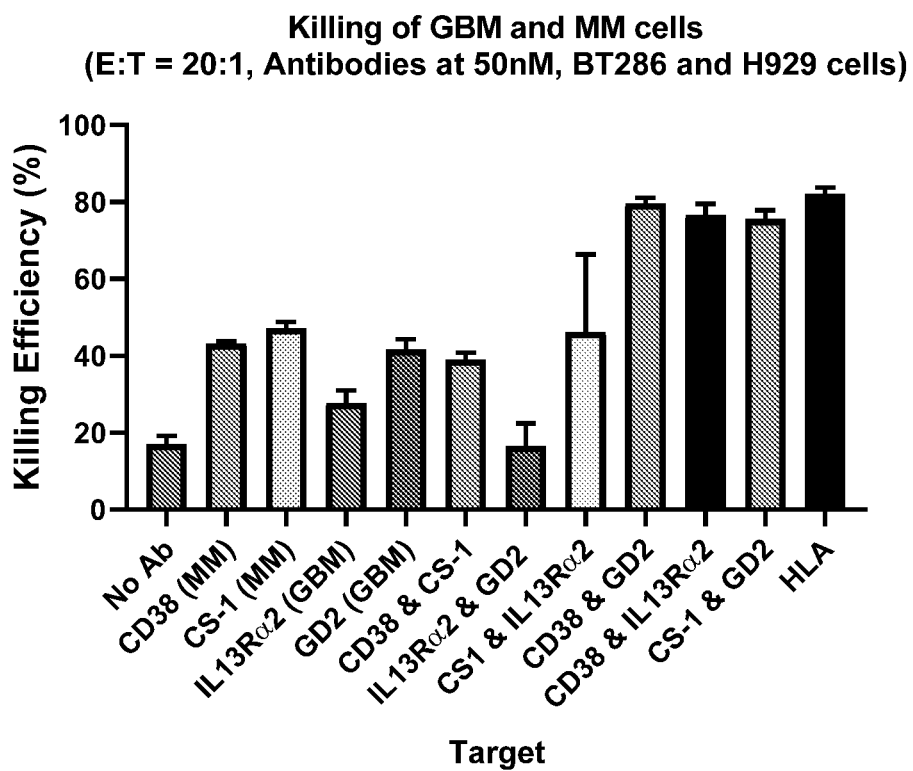
Figure 3A:
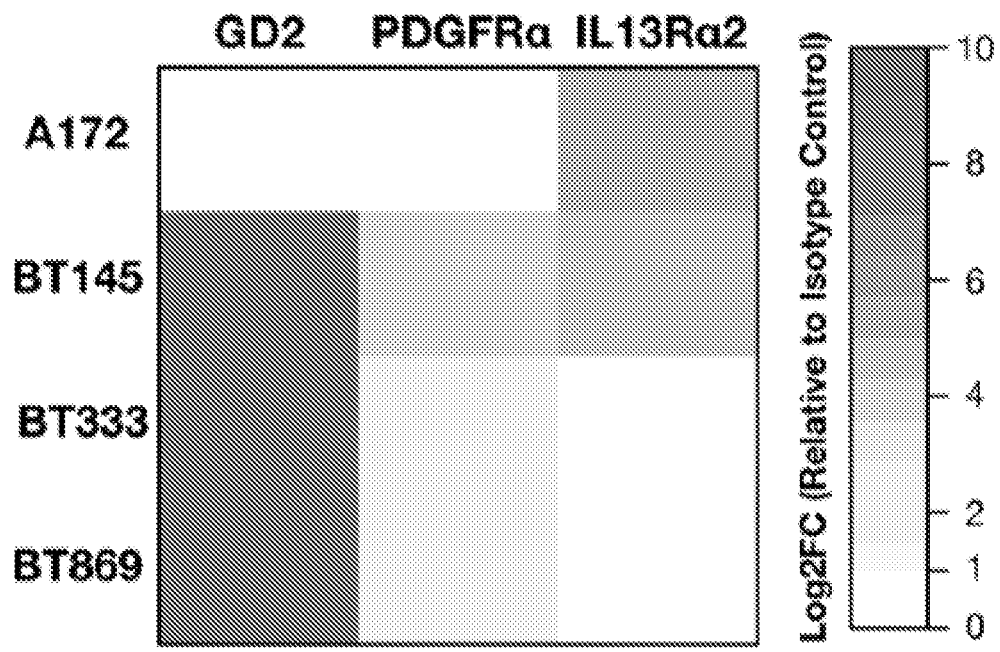
FIG. 3A-FIG. 3B are heat maps showing expression levels of indicated proteins.
Figure 3B:
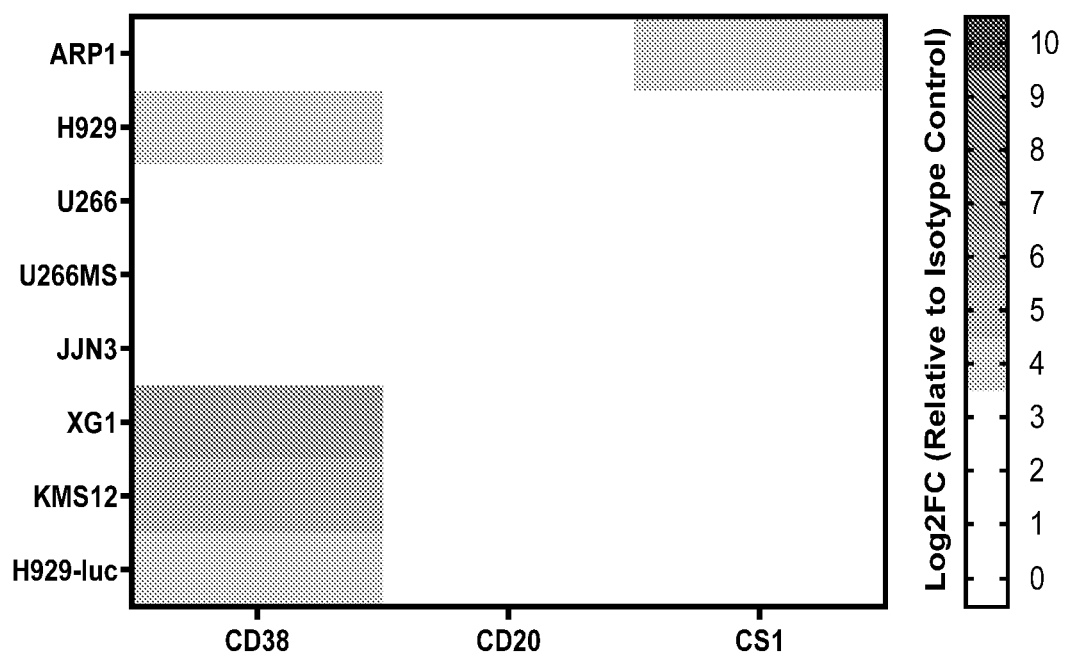

CART cells were prepared for a co-incubation killing assay as described in the Example 1. Anti-fluorescein third generation CAR T cell were co-incubated, at 20:1 ratio, with cells deriving from a GBM or a MM tumor that did not share the same tumor antigens. The data demonstrates the easiness of retargeting of the same CAR T cell against different tumor antigens by simply exchanging the fluorescein-labelled tumor targeting moiety: when only a MM targeting antibody is present (either anti-CD38 or anti-CS-1), only MM cells are killed (FIG. 2I). Similarly, when only a GBM targeting moiety is present (either anti-GD2 or anti-IL13R$\alpha$2), only brain cells are targeted. Only when at least one antibody specific for each line is present the maximum killing of the cells is obtained. In agreement with the data, when the tumor-specific antibodies are substituted with an antibody against the ubiquitous HLA molecules, all the cells are targeted and killed. As a result, highly heterogeneous tumors can be targeted using the present invention (FIG. 2I).

Example 5: Identification and Validation of Targets for FL-Specific CAR T Cells Tumor cell lines (GBM: A172; MM: ARP1, H929, U266, U266MS, JJN3, XG1, KMS12, H929-luc) and patient derived cultures (GBM: BT145 and BT333; DIPG: BT869) were profiled for a set of targets of interest and the staining intensity was measured via flow cytometry. Approximately 100,000 cells of the target cell line were aliquoted in the wells of a U-bottom 96-well plate and resuspended in a solution of 1 μg of tumor targeting antibody in 100 μl FACS buffer (sterile filtered PBS, 5% FBS). The cells were incubated with the antibody for 20 minutes at 4° C., in the dark. After incubation, the cells were washed with FACS buffer and fixed with a 1:1 dilution of Fixation Buffer (BioLegend®, California (USA)) in sterile PBS, 5% FBS. Each antibody/fluorophore combination was analyzed together with its matched isotype control. To each tumor marker, it was attributed a score calculated according to the formula log 2((MFI)$_{sample}$–(MFI)$_{isotype}$). The score was approximated to the first decimal and the color code was attributed by the GraphPad® software.

The results demonstrated the great variability of tumor antigens among cell lines and patient derived cultures, especially brain tumors. Not only were "canonical" tumor nonubiquitous, but their level of expression varied. The present invention may provide a solution by way of a next-generation CAR T cell platform that can efficiently adapt to antigens having intra- and inter-patient variability.

Example 6: Titratable Activation of CAR T Cells Only to Unmasked Small Molecules Human α-fluorescein CAR T cells were co-cultured with the human CD99+ Ewing Sarcoma cell line (A673) coated with anti-CD99 or a negative control antibody at an effector to target ratio of 20:1 for approximately 4 hrs, as described in the Example 1. A673 tumor cells were coated with commercially available αCD99-FITC, with its matched isotype, or with αCD99 antibody coupled to caged-fluorescein either as is (Caged FL) or pretreated after pretreatment with 365 nm UV light (Uncaged FL). A673 tumor cells were specifically killed when targeted via unmasked anti-CD99 fluorescein, but not if the cage on the anti-CD99 antibody was still intact. No statistically significant difference was observed between A673 cells targeted with caged anti-CD99 fluorescein and the negative control antibody (IgG isotype control FITC). Statistical significance was calculated using the Kruskal-Wallis one-way analysis of variance, plus preselected pairwise comparisons (*$p<0.05$). This experiment was performed with 4 replicates.

Figure 4A:
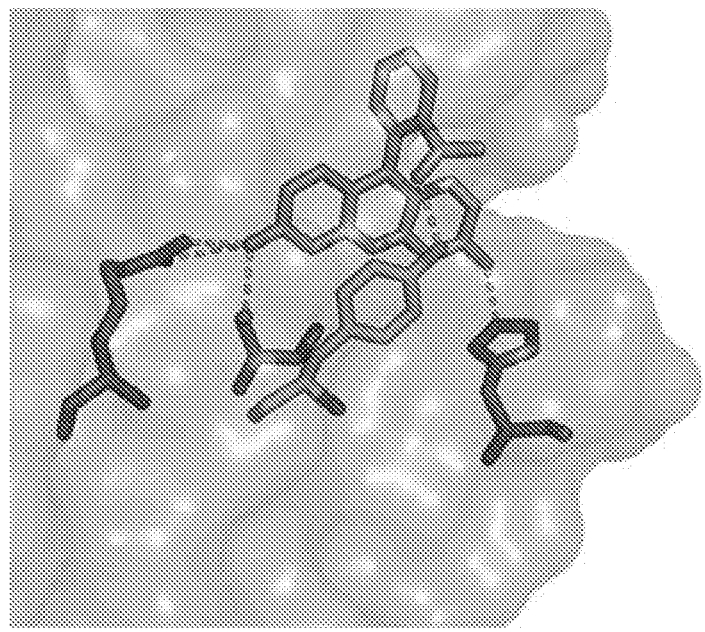
FIG. 4A-FIG. 4B are a chemical model and a bar graph, respectively, which show that a small molecule antigen can be protected for site-specific CAR T cell activity.
Figure 4B:
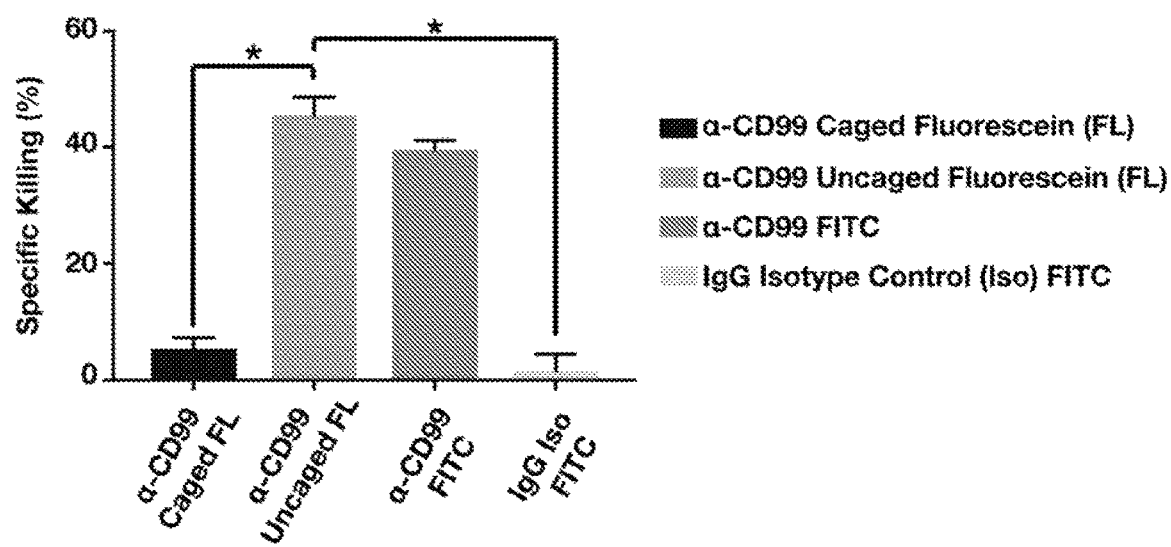

The results are shown in FIG. 4B with specific in vitro cytotoxicity of human third generation anti-fluorescein CAR-T cells to the unmasked fluorescein derivative. The results show that CAR-T cells specifically killed unmasked fluorescein derivatives but did not kill targets bound by protected fluorescein derivatives.

All patent publications and non-patent publications are indicative of the level of skill of those skilled in the art to which this invention pertains. All these publications (including any specific portions thereof that are referenced) are herein incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A bifunctional compound comprising a first synthetic antigen covalently linked to a first targeting moiety that binds a first tumor associated antigen, or a pharmaceutically acceptable salt or stereoisomer thereof,
wherein the synthetic antigen comprises a removable protecting group,
wherein the synthetic antigen can bind a CAR-T cell after removal of the removable protecting group, and
wherein the synthetic antigen is 4-[(6-methylpyrazin-2-yl) oxy] benzoate (MPOB) anthraquinone-2-carboxylate (AQ), tetraxetan (DOTA), or a peptidic, glysodic or nucleotidic antigen.

2. The bifunctional compound of claim 1, wherein the targeting moiety specifically binds a hematologic tumor associated antigen.

3. The bifunctional compound of claim 2, wherein the targeting moiety specifically binds a hematologic tumor associated antigen selected from the group consisting of CD38, CS1, BCMA, CD20, CD19, CD22, CD30, CD138, CD40, CD56, CD70, and CD74.

4. The bifunctional compound of claim 1, wherein the removable protecting group is a boronic ester group or a photocleavable group.

5. A pharmaceutical composition comprising a therapeutically effective amount of the bifunctional compound or pharmaceutically acceptable salt or stereoisomer thereof of claim 1, and a pharmaceutically acceptable carrier, wherein the bifunctional compound is a first bifunctional compound, further comprising a second bifunctional compound comprising the first synthetic antigen covalently linked to a second targeting moiety that binds the first tumor associated antigen or a pharmaceutically acceptable salt or stereoisomer thereof, and
a pharmaceutically acceptable carrier.

6. A pharmaceutical composition comprising a therapeutically effective amount of the bifunctional compound or pharmaceutical acceptable salt of stereoisomer of claim 1.

7. A pharmaceutical composition, comprising a therapeutically effective amount of a first bifunctional compound comprising a first synthetic antigen covalently linked to a first targeting moiety, or a pharmaceutically acceptable salt or stereoisomer thereof, and
a second bifunctional compound comprising the first synthetic antigen covalently linked to a second targeting moiety, or a pharmaceutically acceptable salt or stereoisomer thereof,
wherein the first and second targeting moieties specifically bind different tumor associated antigens,
wherein the synthetic antigen linked to the first or second targeting moiety contains a removable protecting group,
wherein the synthetic antigen containing the removable protecting group can bind a CAR-T cell after removal of the removable protecting group,
wherein the synthetic antigen is 4-[(6-methylpyrazin-2-yl) oxy] benzoate (MPOB) anthraquinone-2-carboxylate (AQ), tetraxetan (DOTA), or a peptidic, glysodic or nucleotidic antigen, and
a pharmaceutically acceptable carrier.

8. The pharmaceutical composition of claim 7, wherein the first and second targeting moieties specifically bind a hematologic tumor associated antigen selected from the group consisting of CD38, CS1, BCMA, CD20, CD19, CD22, CD30, CD138, CD40, CD56, CD70, and CD74.

9. The pharmaceutical composition of claim 8, wherein the each of the first and second targeting moieties specifically bind a hematologic tumor associated antigen selected from the group consisting of CD38, CS1, and BCMA, or wherein each of the first and second targeting moieties specifically bind a hematologic tumor associated antigen selected from the group consisting of CD19, CD20, and CD22, or wherein each of the first and second targeting moieties specifically bind a hematologic tumor associated antigen selected from the group consisting of CD30, CD40, CD56, CD70, CD74, and CD138.

10. A method of treating cancer, comprising co-administering to a subject in need thereof,
a) a plurality of subpopulations of bifunctional molecules wherein the plurality comprises a1) a therapeutically effective amount of a first subpopulation of bifunctional compounds comprising a synthetic antigen covalently linked to a first targeting moiety that specifically binds a first tumor associated antigen; and a2) a therapeutically effective amount of a second subpopulation of bifunctional compounds comprising the synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens;

wherein the synthetic antigen of the first or second subpopulations comprises a removable protecting group;

wherein the synthetic antigen comprising the removable protecting group can bind a CAR-T cell after removal of the removable protecting group; and b) a therapeutically effective number of CAR-T cells, wherein the CAR-T cells comprise an extracellular ligand that specifically binds the synthetic antigen, wherein the subject is human.

11. The method of claim 10, wherein the therapeutically effective amounts of the plurality of subpopulations of bifunctional compounds are administered simultaneously in a single composition or in different compositions.

12. The method of claim 10, wherein the therapeutically effective amounts of the plurality of subpopulations of bifunctional compounds are administered sequentially.

13. The method of claim 10, further comprising at least one subsequent administration of the therapeutically effective amounts of the first and/or second subpopulations of the bifunctional compounds, wherein in at least one subsequent administration of the first and/or second subpopulation of bifunctional compounds, the first targeting moiety binds a different epitope on the same tumor associated antigen relative to the first targeting moiety in a prior administration, and wherein the second targeting moiety binds a different epitope on the same tumor associated antigen relative to the second targeting moiety in a prior administration.

14. The method of claim 10, further comprising co-administering a third subpopulation of bifunctional compounds comprising the synthetic antigen covalently linked to a third targeting moiety which binds a different tumor associated antigen relative to the first and second targeting moieties.

15. The method of claim 10, wherein the subject has hematological cancer, and wherein the first and second targeting moieties specifically bind different hematologic tumor associated antigens.

16. The method of claim 15, wherein the each of the first and second targeting moieties specifically bind a hematologic tumor associated antigen selected from the group consisting of CD38, CSI, BCMA, CD20, CD19, CD22, CD30, CD138, CD40, CD56, CD70, and CD74.

17. The method of claim 16, wherein the each of the first and second targeting moieties specifically bind a hematologic tumor associated antigen selected from the group consisting of CD38, CS1, and BCMA, or wherein each of the first and second targeting moieties specifically bind a hematologic tumor associated antigen selected from the group consisting of CD19, CD20, and CD22, or wherein each of the first and second targeting moieties specifically bind a hematologic tumor associated antigen selected from the group consisting of CD30, CD40, CD56, CD70, CD74, and CD138.

18. The method of claim 15, wherein the hematologic cancer is multiple myeloma (MM), acute myeloid leukemias (AML), acute lymphoblastic leukemia (ALL), chronic lymphocytic leukemia (CLL), chronic myeloid leukemia (CML), Non-Hodgkin lymphoma (NHL), Hodgkin lymphoma, or Large granular lymphocytic (LGL) leukemia.

19. The method of claim 10, wherein prior to a) and b) the subject received a first line cancer treatment, wherein the first line cancer treatment became ineffective as a result of antigen escape.

20. A kit, comprising:
a) therapeutically effective amounts of a plurality of subpopulations of bifunctional compounds,
wherein each bifunctional compound in a first subpopulation comprises a first synthetic antigen covalently linked to a first targeting moiety that specifically binds a first tumor associated antigen, and wherein each bifunctional compound in a second subpopulation comprises the first synthetic antigen covalently linked to a second targeting moiety that specifically binds a second tumor associated antigen, or a pharmaceutically acceptable salt or stereoisomer thereof, wherein the first and second targeting moieties specifically bind different tumor associated antigens, and wherein each subpopulation of bifunctional compounds administered to the patient contains the first synthetic antigen but specifically binds a different tumor associated antigen;
wherein the plurality of subpopulations of bifunctional compounds is disposed in the same or separate containers,
wherein the first or second synthetic antigen contains a removable protecting group;
wherein the synthetic antigen containing the removable protecting group can bind a CAR-T cell after removal of the removable protecting group; and
wherein the synthetic antigen is 4-[(6-methylpyrazin-2-yl) oxy] benzoate (MPOB), anthraquinone-2-carboxylate (AQ), tetraxetan (DOTA), or a peptidic, glysodic or nucleotidic antigen; and
b) printed instructions for co-administering to a cancer patient the therapeutically effective amounts of a plurality of subpopulations of bifunctional compounds and a therapeutically effective number of CAR-T cells, wherein the CAR-T cells comprise an extracellular ligand that specifically binds the synthetic antigen.

* * * * *

SEQUENCE LISTING

```
<160> NUMBER OF SEQ ID NOS: 1

<210> SEQ ID NO 1
<211> LENGTH: 1635
<212> TYPE: DNA
<213> ORGANISM: Artificial Sequence
<220> FEATURE:
<223> OTHER INFORMATION: Synthetic Polynucleotide

<400> SEQUENCE: 1
atggctctgc ctgtgacagc tctgctgctg cctctggctc tgcttctgca tgccgccaga        60
cctgacgtgg tcatgacaca gacacctctg agcctgcctg tgtctctggg agatcaggcc       120
agcatcagct gcagatctag ccagagcctg gtgcacagca acggcaacac ctacctgcgg       180
tggtatctgc agaagcccgg ccagtctcct aaggtgctga tctacaaggt gtccaacaga       240
gtgtccggcg tgcccgatag attttctggc agcggctctg gcaccgactt caccctgaag       300
atcaatagag tggaagccga ggacctgggc gtgtacttct gtagccagtc tacccacgtg       360
ccatggacct ttggcggcgg aacaaagctg gaaatcaaga gcagcgccga cgacgccaag       420
aaggacgccg ctaagaagga tgacgccaaa aaagacgatg ccaaaaagga tggcggcgtg       480
aagctggacg aaacaggcgg aggacttgtt cagcctggcg gagccatgaa gctgagctgt       540
gtgaccagcg gcttcacctt cggccactac tggatgaact gggtccgaca gagccctgag       600
aaaggcctgg aatgggtcgc ccagttcaga aacaagccct acaactacga aacctactac       660
agcgacagcg tgaagggcag attcaccatc agccgggacg acagcaagtc cagcgtgtac       720
ctgcagatga acaacctgcg cgtggaagat accggcatct actactgtac cggcgccagc       780
tacggcatgg aatatctcgg ccagggcacc agcgtgaccg tgtctacaac aacccctgct       840
```

```
cctcggcctc ctacaccagc tcctacaatt gccagccagc cactgtctct gaggcccgaa    900
gcttgtagac ctgctgcagg cggagccgtg catacaagag gactggattt cgcctgcgac    960
ttctgggtgc tcgtggttgt tggcggagtg ctggcttgtt actccctgct ggttaccgtg   1020
gccttcatca tcttttgggt ccgaagcaag cggagccggc tgctgcacag cgactacatg   1080
aacatgaccc ctagacggcc cggacctacc agaaagcact accagcctta cgctcctcct   1140
agagacttcg ccgcctacag atccaagcgg ggcagaaaga agctgctgta catcttcaag   1200
cagcccttca tgcggcccgt gcagaccaca caagaggaag atggctgctc ctgcagattc   1260
cccgaggaag aagaaggcgg ctgcgagctg agagtgaagt tcagcagatc cgccgacgct   1320
cctgcctatc agcagggaca gaaccagctg tacaacgagc tgaacctggg gagaagagaa   1380
gagtacgacg tgctggacaa gcggagaggc agagatcctg agatgggcgg aaagccccag   1440
cggagaaaga atcctcaaga gggcctgtat aatgagctgc agaaagacaa gatggccgag   1500
gcctacagcg agatcggaat gaagggcgag cgcagaagag gcaagggaca cgatggactg   1560
taccagggcc tgagcaccgc caccaaggat acctatgatg ccctgcacat gcaggccctg   1620
ccacctagat gatga                                                    1635
```